United States Patent
Takizawa et al.

(10) Patent No.: US 10,008,862 B2
(45) Date of Patent: Jun. 26, 2018

(54) POWER STORAGE DEVICE, POWER STORAGE SYSTEM, AND CONTROL METHOD OF POWER STORAGE DEVICE

(71) Applicant: Murata Manufacturing Co., Ltd., Kyoto (JP)

(72) Inventors: Shuichi Takizawa, Tokyo (JP); Naoyuki Sugeno, Fukushima (JP); Koji Umetsu, Miyagi (JP); Eiji Kumagai, Fukushima (JP); Bunya Sato, Fukushima (JP); Aniket Khade, Fukushima (JP); Tatsuya Adachi, Fukushima (JP); Atsushi Chinen, Fukushima (JP); Hisato Asai, Fukushima (JP); Kohki Watanabe, Fukushima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 161 days.

(21) Appl. No.: 14/778,980

(22) PCT Filed: Mar. 6, 2014

(86) PCT No.: PCT/JP2014/001230
§ 371 (c)(1),
(2) Date: Sep. 21, 2015

(87) PCT Pub. No.: WO2014/155986
PCT Pub. Date: Oct. 2, 2014

(65) Prior Publication Data
US 2016/0049813 A1 Feb. 18, 2016

(30) Foreign Application Priority Data

Mar. 28, 2013 (JP) .................... 2013-069403
Sep. 6, 2013 (JP) .................... 2013-185237

(51) Int. Cl.
H02J 7/00 (2006.01)
H01M 10/44 (2006.01)
H01M 10/48 (2006.01)
H01M 10/46 (2006.01)

(52) U.S. Cl.
CPC ......... H02J 7/0019 (2013.01); H01M 10/441 (2013.01); H01M 10/46 (2013.01);
(Continued)

(58) Field of Classification Search
USPC ....................................... 320/112
See application file for complete search history.

(56) References Cited

U.S. PATENT DOCUMENTS 7,973,534 B2* 7/2011 Tatebayashi .......... H02J 7/0026
320/116
2002/0047685 A1* 4/2002 Perelle ................ B60L 11/1861
320/119
(Continued)

FOREIGN PATENT DOCUMENTS

JP 04-281339 A 10/1992
JP 2002-095173 A 3/2002
(Continued)

OTHER PUBLICATIONS

Office Action for CN Patent Application No. 201480017315.5, dated Feb. 5, 2018, 03 pages of Office Action and 05 pages of English Translation.

Primary Examiner — Bryce Aisaka
(74) Attorney, Agent, or Firm — Chip Law Group

(57) ABSTRACT

There is provided a power storage device including a plurality of modules each including secondary batteries, a charging switch that controls charging to the secondary batteries, a discharging switch that controls discharging of the secondary batteries, and a voltage measuring unit that measures a voltage of the module, and a switch control unit
(Continued)

that controls one or both of the charging switch and the discharging switch. The modules are connected in parallel. The switch control unit maintains an on state of the discharging switch for at least one of the modules for a predetermined period, and controls the charging switch of the module in which a maximum module charging current estimated based on the voltage of the module is a predetermined value or less, to be in an on state.

15 Claims, 32 Drawing Sheets

(52) U.S. Cl.
CPC ......... *H01M 10/482* (2013.01); *H02J 7/0021* (2013.01); *H02J 7/0024* (2013.01); *Y02T 10/7055* (2013.01)

(56) References Cited

U.S. PATENT DOCUMENTS

| | | | |
|---|---|---|---|
| 2014/0009106 A1* | 1/2014 | Andrea | H02H 9/002 320/107 |
| 2016/0049813 A1 | 2/2016 | Takizawa et al. | |

FOREIGN PATENT DOCUMENTS

| | | |
|---|---|---|
| JP | 2003-244854 A | 8/2003 |
| JP | 2005-176461 A | 6/2005 |
| JP | 2010-220280 A | 9/2010 |

* cited by examiner

FIG. 5
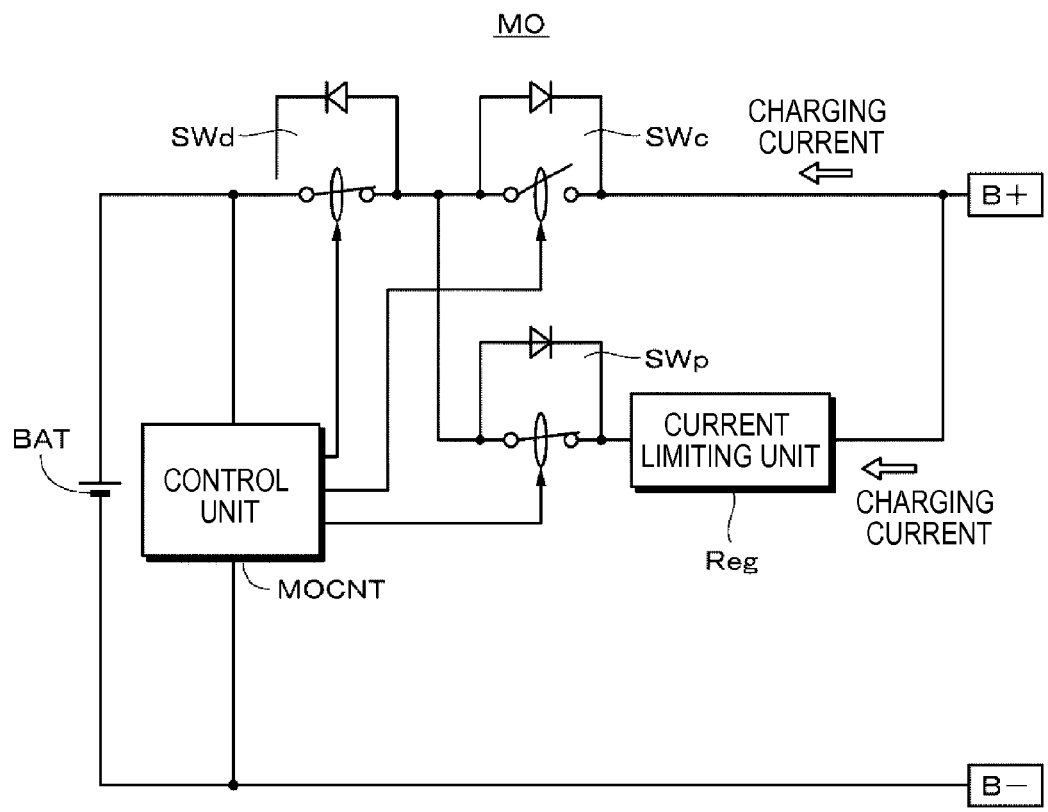
FIG. 6
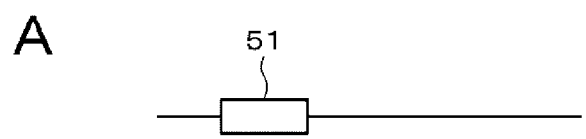
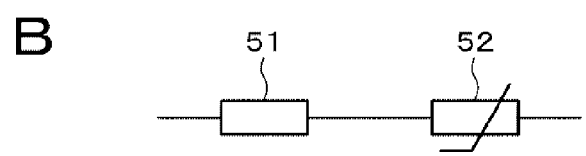

POWER STORAGE DEVICE, POWER STORAGE SYSTEM, AND CONTROL METHOD OF POWER STORAGE DEVICE

TECHNICAL FIELD

The present disclosure relates to a power storage device including secondary batteries, a power storage system, and a control method of the power storage device.

BACKGROUND ART

In recent years, the use of secondary batteries such as lithium-ion batteries are rapidly increasing in, for example, power storage devices and storage batteries for vehicles in which new energy systems such as solar cells and wind power generation are combined. When many power storage elements such as unit batteries (also called battery cells, single cells or cells) are used to generate high power, a configuration in which a plurality of power storage modules are connected in series is employed. A battery block is constituted by connecting a plurality of battery cells, for example, four battery cells, in parallel or in series. Many battery blocks are housed in a sheath case to constitute a power storage module (simply referred to as a module in the following description).

Furthermore, there is known a power storage system including a plurality of modules connected with each other and a common control device disposed to the plurality of modules. Each of the modules has a module controller, and the module controller communicates with the control device via a communication means.

Furthermore, when the power storage system is used as a power source, the module may be sometimes necessary to be switched to a backup module even while current flows. For example, since a power source cannot be switched off in an emergency power source, a power source at a mobile phone base station, and the like, the module is replaced while current flows. Such a mechanism of the device having a structure that allows attachment and removal while a power source remains on is called hot line insertion and removal (a hot swap).

In the hot swap, two modules MO1 and MO2 are connected in parallel via a switch S, as schematically illustrated in FIG. 1. The module MO1 includes a battery unit BAT1 and an internal resistance R1, while the module MO2 includes a battery unit BAT2 and an internal resistance R2. A storage battery module mounted with lithium-ion batteries had a problem that the module cannot be replaced during operation, in contrast to with lead storage batteries.

With respect to switching a power source to a backup power source, there have been proposed technologies disclosed in Patent Literature 1 and Patent Literature 2. In the technology disclosed in Patent Literature 1, outputs from two batteries are connected with a common power source circuit via field effect transistors. When one battery is carelessly removed while power is supplied from the battery to a load, another battery is switched to a state of supplying a power source to the load.

In the technology disclosed in Patent Literature 2, when a load device operating with direct current has a trouble of a power source, direct current backup power is supplied. Battery packs each including a plurality of secondary batteries connected in series are provided so that a voltage required by the load device can be obtained. Each of the battery packs is determined for life limit, and only the battery pack determined as having reached life limit is replaced.

CITATION LIST

Patent Literature

Patent Literature 1: JP 2002-095173 A
Patent Literature 2: JP 2005-176461 A

SUMMARY OF INVENTION

Technical Problem

In the technology disclosed in Patent Literature 1, the removal of a battery immediately leads to a backup by another operating battery. That is, an already operating battery is used for connection. Such a technology disclosed in Patent Literature 1 cannot solve the problem raised when a resting module is newly connected with an operating module. In the technology disclosed in Patent Literature 2, DC-DC converters are used on output sides of the battery packs to adjust a voltage. The DC-DC converters are required in the same number as that of the battery packs. Accordingly, a large-scale circuit configuration is needed, causing a disadvantage in terms of cost.

Therefore, the present disclosure is intended to provide a power storage device, a power storage system, and a control method of the power storage device, in which a hot swap of modules is performed without the occurrence of deterioration or failure of the module.

Solution to Problem

To solve the above-described problem, the present disclosure provides a power storage device including: a plurality of modules each including secondary batteries, a charging switch that controls charging to the secondary batteries, a discharging switch that controls discharging of the secondary batteries, and a voltage measuring unit that measures a voltage of the module; and a switch control unit that controls one or both of the charging switch and the discharging switch. The modules are connected in parallel. The switch control unit maintains an on state of the discharging switch for at least one of the modules for a predetermined period, and controls the charging switch of the module in which a maximum module charging current estimated based on the voltage of the module is a predetermined value or less, to be in an on state.

Advantageous Effects of Invention

The present disclosure can perform a hot swap of modules. A charging switch is switched on when it is estimated that an excessive charging current does not flow through each module during a hot swap. Therefore, the modules can be protected from an excessive current, thereby inhibiting deterioration or failure of the system. Furthermore, a hot swap can also be performed to a power storage system in which a plurality of strings each including a plurality of modules is connected in parallel. It is noted that the effects described herein are not necessarily limiting, and one of the effects described in the present disclosure may be exerted.

BRIEF DESCRIPTION OF DRAWINGS

FIG. 5 is a connection diagram illustrating a configuration of the module according to the first embodiment of the present disclosure.

FIG. 6 is a connection diagram illustrating a specific configuration of a current limiting unit of the module according to the first embodiment of the present disclosure.

DESCRIPTION OF EMBODIMENTS

The embodiments described below are suitable specific examples of this invention, and includes technically preferred various limitations. However, the scope of this invention is not limited to these embodiments, unless limitations to this invention are particularly stated in the description below.

It is noted that the description below will be provided in the following order.

<1. First Embodiment>

<2. Second Embodiment>

<3. Application Example>

<4. Variation>

1. First Embodiment

"Module"

When many power storage elements such as battery cells are used to generate high power, there is adopted a configuration in which a plurality of modules are connected, for example, in series, and a control device (hereinafter, appropriately referred to as a controller) is disposed in common to the plurality of modules. The controller performs management such as charging management, discharging management, and deterioration inhibiting management. Such a configuration is referred to as a power storage device. The controller is constituted by a microcomputer.

In one example, the module is configured to house many battery cells in a metal sheath case. A positive terminal and a negative terminal for connection are derived from the sheath case. Furthermore, a connector for communication is disposed to the sheath case. A plurality of modules each having such a configuration is connected with each other to constitute a power storage device. For example, a plurality of modules is arranged in a rack. For example, one module has 16 battery blocks and outputs (16×3.2 V=51.2 V).

Figure 1:
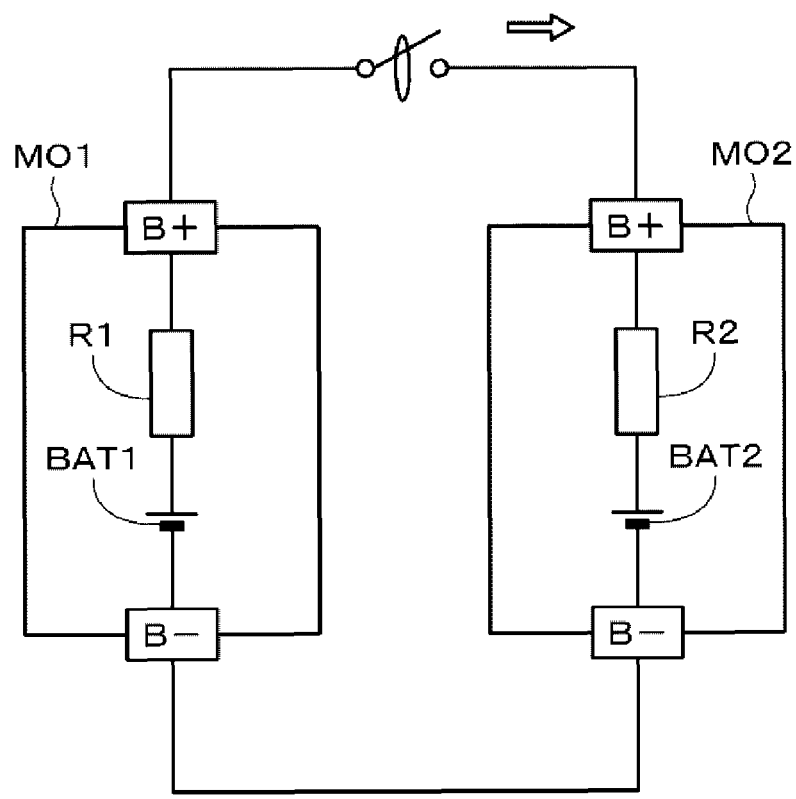
FIG. 1 is a block diagram used for explaining problems caused during a hot swap.
Figure 2:
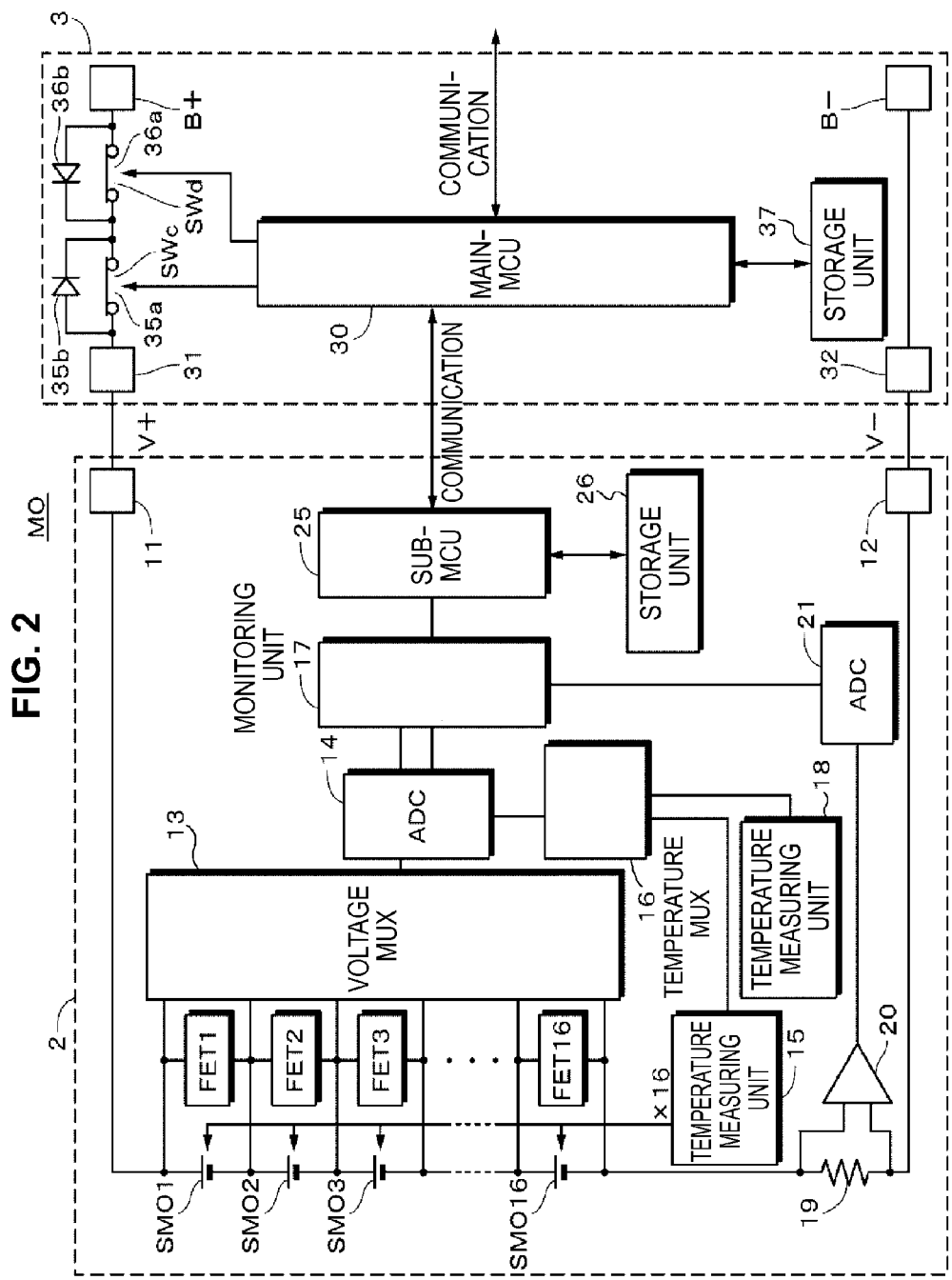
FIG. 2 is a block diagram of an example of a module that can be used in a first embodiment of the present disclosure.

FIG. 2 illustrates one example of an electrical configuration of a module MO. The module MO includes, for example, a power storage unit 2 and a controller 3. Electrical transmission and communication are performed between the power storage unit 2 and the controller 3. Although only one module is illustrated in FIG. 1, a plurality of modules may be connected with each other, and each of the modules may be connected to a higher-level controller. In such a configuration, the positive terminal and negative terminal of the lowest-level module are connected to the controller. Power and control commands are transmitted from a higher-level module through a lower-level module, or reversely, from a lower-level module through a higher-level module.

The controller 3 is connected to a charging device (charging power source) or a load via a power cable and a communication bus. When charging the power storage unit 2, the controller 3 is connected with the charging device. For discharging the power storage unit 2, the controller 3 is connected to the load. Power in the power storage unit 2 is supplied to the load via the controller 3.

An example of the power storage unit 2 will be described. The power storage unit 2 is housed in, for example, a sheath case having a predetermined shape. The sheath case desirably includes a material having high conductivity and emissivity. The use of a material having high conductivity and emissivity allows the sheath case to have excellent heat dissipation properties. The excellent heat dissipation properties can inhibit an increase in temperature inside the sheath case. Furthermore, an opening of the sheath case can be minimized or eliminated, thereby achieving high dust-proof and drip-proof properties. Examples of the material for the sheath case to be used include aluminum or aluminum alloy, copper, and copper alloy.

The power storage unit 2 includes, for example, a battery unit, a positive terminal 11, a negative terminal 12, a switch element, a voltage multiplexer 13, an Analog to Digital Converter (ADC) 14, a temperature measuring unit 15, a temperature multiplexer 16, a monitoring unit 17, a temperature measuring unit 18, a current sensing resistor 19, a current sensing amplifier 20, an ADC 21, a sub-micro control unit 25, and a storage unit 26. The battery unit includes a plurality of batteries, for example, 16 batteries SMO1 to SMO16 connected in series. Each of the batteries SMO1 to SMO16 is a single cell or a plurality of single cells connected in parallel.

The positive side of the power storage unit 2 is connected to the positive terminal 11. The negative side of the battery SMO16 is connected to the negative terminal 12 of the power storage unit 2. The positive terminal 11 is connected to a positive terminal of the controller 3. The negative terminal 12 is connected to a negative terminal of the controller 3. Sixteen Field Effect Transistors (FETs) (FET 1, FET 2, FET 3, FET 4 to FET 16) are disposed to the 16 batteries in a corresponding manner. FET 1 to FET 16 control the balance among cells.

The voltage of each battery in the battery unit is constantly sensed. The sensing of voltage is performed for each battery, for example, with a cycle of 250 milliseconds (ms) during discharging of the power storage unit 2. The voltage (voltage data in analog form) of each battery is supplied to the voltage multiplexer (multiplexer (MUX)) 13. In this example, 16 batteries constitute the battery unit. Therefore, 16 pieces of analog voltage data are supplied to the multiplexer 13.

The voltage multiplexer 13, for example, switches a channel in a predetermined cycle to select one piece of analog voltage data from 16 pieces of analog voltage data. One piece of analog voltage data selected by the voltage multiplexer 13 is supplied to the ADC 14. Then, the voltage multiplexer 13 switches a channel to supply a next piece of analog voltage data to the ADC 14. That is, 16 pieces of analog voltage data are supplied from the voltage multiplexer 13 to the ADC 14 in a predetermined cycle.

It is noted that the switching between channels by the voltage multiplexer 13 is controlled by the sub-micro control unit 25 of the power storage unit 2 or a main-micro control unit 30 of the controller 3.

The temperature measuring unit 15 senses a temperature of each battery. The temperature measuring unit 15 is constituted by an element that senses a temperature, such as a thermistor. The temperatures of the batteries are sensed in a predetermined cycle, for example, both during charging and during discharging. Analog temperature data indicating temperatures of the batteries sensed by the temperature measuring unit 15 is supplied to the temperature multiplexer (MUX) 16. In this example, 16 batteries constitute the battery unit. Therefore, 16 pieces of analog temperature data are supplied to the temperature multiplexer 16.

The temperature multiplexer 16, for example, switches a channel in a predetermined cycle to select one piece of analog temperature data from 16 pieces of analog temperature data. One piece of analog temperature data selected by the temperature multiplexer 16 is supplied to the ADC 14. Then, the temperature multiplexer 16 switches a channel to supply a next piece of analog temperature data to the ADC 14. That is, 16 pieces of analog temperature data are supplied from the temperature multiplexer 16 to the ADC 14 in a predetermined cycle.

It is noted that the switching between channels by the temperature multiplexer 16 is controlled by the sub-micro control unit 25 of the power storage unit 2 or the main-micro control unit 30 of the controller 3.

The ADC 14 converts the analog voltage data supplied from the voltage multiplexer 13 into digital voltage data. The ADC 14 converts the analog voltage data into, for example, 14 to 18 bits of digital voltage data. Various techniques such as a successive approximation technique and a ΔΣ (delta sigma) technique can be adopted as a conversion technique in the ADC 14.

The ADC 14 includes, for example, an input terminal, an output terminal, a control signal input terminal to which a control signal is inputted, and a clock pulse input terminal to which a clock pulse is inputted (it is noted that these terminals are omitted in the diagram). The analog voltage data is inputted to the input terminal. The converted digital voltage data is outputted from the output terminal.

A control signal (control command) supplied from the controller 3, for example, is inputted to the control signal input terminal. The control signal is, for example, an acquisition instructing signal that instructs acquisition of the analog voltage data supplied from the voltage multiplexer 13. The input of the acquisition instructing signal causes the ADC 14 to acquire analog voltage data and convert the acquired analog voltage data into digital voltage data. Thereafter, in response to a clock pulse for synchronization inputted to the clock pulse input terminal, the digital voltage data is outputted via the output terminal. The outputted digital voltage data is supplied to the monitoring unit 17.

Furthermore, the control signal input terminal receives an acquisition instructing signal that instructs acquisition of the analog temperature data supplied from the temperature multiplexer 16. In response to the acquisition instructing signal, the ADC 14 acquires the analog temperature data. The acquired analog temperature data is converted into digital temperature data by the ADC 14. The analog temperature data is converted into, for example, 14 to 18 bits of digital temperature data. The converted digital temperature data is outputted via the output terminal, and the outputted digital temperature data is supplied to the monitoring unit 17. It is noted that the ADC may be separately provided for each of voltage data and temperature data to be processed. A functional block of the ADC 14 may be configured to function as a comparator that compares a voltage or a temperature to a predetermined value.

For example, 16 pieces of digital voltage data or 16 pieces of digital temperature data are transmitted from the ADC 14 to the monitoring unit 17 by time division multiplexing. An identifier for identifying a battery may be described in a header of the transmission data to indicate which battery has the voltage or temperature. It is noted that in this example, digital voltage data, for each battery, acquired in a predetermined cycle and converted into digital data by the ADC 14 corresponds to voltage information. The voltage information may be analog voltage data, or may be the digital voltage data having been subjected to correction processing or the like.

The temperature measuring unit 18 measures a temperature of the power storage unit 2 as a whole. The temperature measuring unit 18 measures a temperature inside the sheath case of the power storage unit 2. Analog temperature data measured by the temperature measuring unit 18 is supplied to the temperature multiplexer 16, and supplied from the temperature multiplexer 16 to the ADC 14. Then, the analog temperature data is converted into digital temperature data by the ADC 14. The digital temperature data is supplied from the ADC 14 to the monitoring unit 17.

The power storage unit 2 includes a current sensing unit that senses a value of a current (load current). The current sensing unit senses a value of a current flowing through 16 batteries. The current sensing unit is constituted by, for example, the current sensing resistor 19 connected between the negative side of 16 batteries and the negative terminal 12, and the current sensing amplifier 20 connected to both ends of the current sensing resistor 19. The current sensing resistor 19 senses analog current data. The analog current data is sensed in a predetermined cycle, for example, both during charging and during discharging.

The sensed analog current data is supplied to the current sensing amplifier 20. The analog current data is amplified by the current sensing amplifier 20. The gain of the current sensing amplifier 20 is set to be, for example, approximately 50 to 100 times. The amplified analog current data is supplied to the ADC 21.

The ADC 21 converts the analog current data supplied from the current sensing amplifier 20 into digital current data. The analog current data is converted into, for example, 14 to 18 bits of digital current data by the ADC 21. Various techniques such as a successive approximation technique and a ΔΣ (delta sigma) technique can be adopted as a conversion technique in the ADC 21.

The ADC 21 includes, for example, an input terminal, an output terminal, a control signal input terminal to which a control signal is inputted, and a clock pulse input terminal to which a clock pulse is inputted (these terminals are omitted in the diagram). Analog current data is inputted to the input terminal. Digital current data is outputted from the output terminal.

A control signal (control command) supplied from the controller 3, for example, is inputted to the control signal input terminal of the ADC 21. The control signal is, for example, an acquisition instructing signal that instructs acquisition of the analog current data supplied from the current sensing amplifier 20. The input of the acquisition instructing signal causes the ADC 21 to acquire analog current data and convert the acquired analog current data into digital current data. Thereafter, in response to a clock pulse for synchronization inputted to the clock pulse input terminal, the digital current data is outputted from the output terminal. The outputted digital current data is supplied to the monitoring unit 17. This digital current data is an example of current information. It is noted that the ADC 14 and the ADC 21 may be combined to be one ADC.

The monitoring unit 17 monitors the digital voltage data and digital temperature data supplied from the ADC 14, and monitors the presence or absence of abnormality in the batteries. For example, when the voltage indicated by the digital voltage data is around 4.2 V that is a rough standard of overcharging, or around 2.0 V to 2.7 V that is a rough standard of overdischarging, the monitoring unit 17 generates an abnormality notifying signal indicating that abnormality exists or can occur. Furthermore, when the temperature of the batteries or the temperature of the power storage unit 2 as a whole is more than a threshold, the monitoring unit 17 also generates an abnormality notifying signal in a similar manner.

Furthermore, the monitoring unit 17 monitors the digital current data supplied from the ADC 21. When the current value indicated by the digital current data is more than a threshold, the monitoring unit 17 generates an abnormality notifying signal. The abnormality notifying signal generated by the monitoring unit 17 is transmitted to the sub-micro control unit 25 by a communication function possessed by the monitoring unit 17.

The monitoring unit 17 transmits the digital voltage data of each of 16 batteries supplied from the ADC 14 and the digital current data supplied from the ADC 21 to the sub-micro control unit 25, while monitoring the presence or absence of abnormality as described above. The digital voltage data of each battery and the digital current data may be directly supplied to the sub-micro control unit 25 without passing through the monitoring unit 17. The transmitted digital voltage data of each battery and the digital current data are inputted to the sub-micro control unit 25. Furthermore, the digital temperature data supplied from the ADC 14 is supplied from the monitoring unit 17 to the sub-micro control unit 25.

The sub-micro control unit 25 is constituted by, for example, a Central Processing Unit (CPU) having a communication function, and controls each unit of the power storage unit 2. For example, when an abnormality notifying signal is supplied from the monitoring unit 17, the sub-micro control unit 25 uses its communication function to notify the main-micro control unit 30 in the controller 3 of abnormality. In response to this notification, the main-micro control unit 30 appropriately executes processing such as termination of charging or discharging. It is noted that the wordings "sub" and "main" of the sub-micro control unit and the main-micro control unit are for convenience of explanation, and do not have a particular meaning.

Bidirectional communication is performed between the sub-micro control unit 25 and the main-micro control unit 30 in accordance with a serial communication standard such as an I2C, a System Management Bus (SMBus), a Serial Peripheral Interface (SPI), and a Controller Area Network (CAN). Communication may be either wired or wireless.

The digital voltage data is inputted from the monitoring unit 17 to the sub-micro control unit 25. For example, the digital voltage data of each battery during discharging of the power storage unit 2 is inputted to the sub-micro control unit 25. Furthermore, the size of a load current (digital current data) when a load is connected to the power storage unit 2 is inputted from the monitoring unit 17 to the sub-micro control unit 25. The digital temperature data indicating the temperature of each battery and the temperature inside the power storage unit 2 is inputted to the sub-micro control unit 25. The sub-micro control unit 25 transmits the inputted digital voltage data of each battery, digital temperature data indicating the temperature of each battery, digital current data, and the like to the main-micro control unit 30.

The storage unit 26 is constituted by a Read Only Memory (ROM), a Random Access Memory (RAM), or the like. The storage unit 26 stores, for example, a program to be executed by the sub-micro control unit 25. The storage unit 26 is further used as a work area when the sub-micro control unit 25 executes processing. The storage unit 26 further stores a history of charging and discharging (appropriately referred to as a charging and discharging history). The charging and discharging history contains information of charging conditions such as a charging rate, charging time and charging frequency, discharging conditions such as a discharging rate, discharging time and discharging frequency, and battery temperatures during charging or discharging.

"Configuration of Controller"

Next, an example of the configuration of the controller 3 will be described. The controller 3 is configured in a resin case, and mounted to, for example, a back panel of a case for the power storage unit 2. The controller 3 manages charging and discharging of the power storage unit 2. Specifically, the controller 3, for example, initiates and terminates charging of the power storage unit 2, initiates and terminates discharging of the power storage unit 2, and sets a charging rate and a discharging rate. The controller 3 communicates with a higher-level controller.

The controller 3 includes the main-micro control unit 30, a positive terminal 31, a negative terminal 32, an external terminal B+, an external terminal B−, a charging switch SWc, a discharging switch SWd, and a storage unit 37. The positive terminal 31 is connected to the positive terminal 11 of the power storage unit 2. The negative terminal 32 is connected to the negative terminal 12 of the power storage unit 2. The external terminal B+ and the external terminal B− are output terminals for extracting power outside.

The main-micro control unit 30 is constituted by, for example, a CPU having a communication function with a higher-level controller, and controls each unit of the controller 3. The main-micro control unit 30 controls charging and discharging of the power storage unit 2. The charging switch SWc is switched on during charging, while the discharging switch SWd is switched on during discharging.

The charging switch SWc includes a switch element 35a, and a diode 35b connected in parallel to the switch element 35a and in a forward direction of a discharging current. The discharging switch SWd includes a switch element 36a, and a diode 36b connected in parallel to the switch element 36a and in a forward direction of a charging current. Examples of the switch elements 35a and 36a may include an Insulated Gate Bipolar Transistor (IGBT), a Metal Oxide Semiconductor Field Effect Transistor (MOSFET), and a relay contact. It is noted that the charging switch SWc and the discharging switch SWd may be inserted in a negative power source line.

The storage unit 37 is constituted by a ROM, a RAM, or the like. The storage unit 37 stores, for example, a program to be executed by the main-micro control unit 30. The storage unit 37 is further used as a work area when the main-micro control unit 30 executes processing. The storage unit 37 may be configured to store a charging and discharging history.

"System Configuration"

Figure 3:
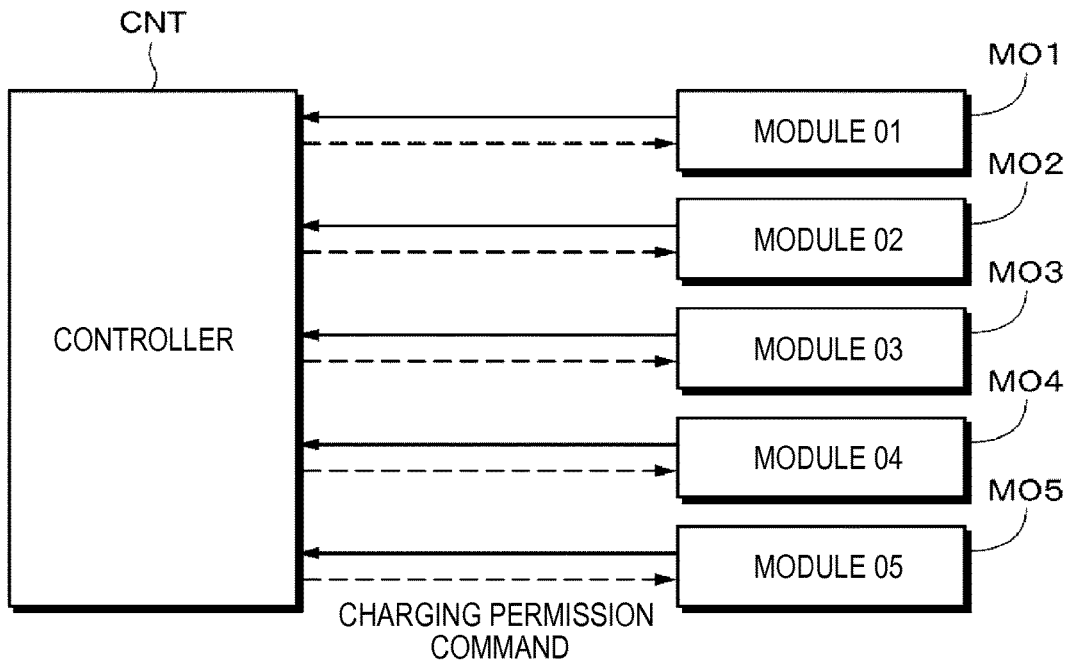
FIG. 3 is a block diagram of an example of a system configuration according to the first embodiment of the present disclosure.

Although only one module MO is illustrated in the configuration of FIG. 2, there is used a configuration in which, for example, five modules MO1 to MO5 are connected in parallel as illustrated in FIG. 3. A common higher-level controller CNT is disposed to these modules MO1 to MO5. The controller CNT collects data from each of the modules. That is, the controller CNT acquires data on a voltage of each battery cell in the battery unit, State Of Charge (SOC) (remaining capacity rate), charging current, discharging current, and battery temperature, through communication.

Then, the controller CNT controls charging permission or charging prohibition. The controller CNT transmits a charging permission command to the module which has been determined that charging is permitted. The module having received the charging permission command switches on its charging switch element. However, when a condition such as overcharging of a battery is satisfied, the charging switch element is switched off. The module not receiving a charging permission command switches off its charging switch element.

Figure 4:
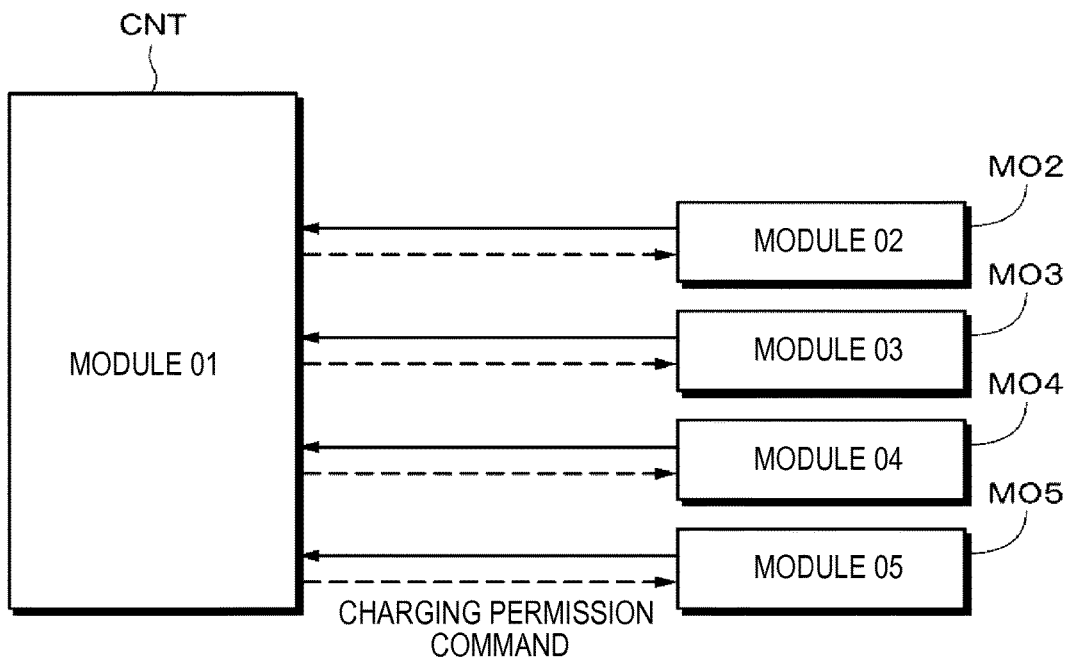
FIG. 4 is a block diagram of another example of a system configuration according to the first embodiment of the present disclosure.

As illustrated in FIG. 4, one module, for example, a module MO1, among a plurality of modules MO1 to MO5 may function as the controller CNT. The module MO1 collects data from the modules MO2 to MO5. That is, the module MO1 acquires data on a module voltage, SOC, charging current, discharging current, and battery temperature, through communication.

Then, the module MO1 controls charging permission or charging prohibition. The module MO1 transmits a charging permission command to the module which has been determined that charging is permitted. The module having received the charging permission command switches on its charging switch element. However, when a condition such as overcharging of a battery is satisfied, the charging switch element is switched off. The module not receiving a charging permission command switches off its charging switch element.

Module According to First Embodiment

Furthermore, in the following description, a configuration illustrated in FIG. 5, simpler than that in FIG. 2, will be used as a configuration of a module MO. In the configuration of FIG. 5, a positive side of a battery unit BAT is derived as a positive external terminal B+ through a discharging switch SWd and a charging switch SWc, while a negative side of the battery unit BAT is derived as a negative external terminal B−. Each of the discharging switch SWd and the charging switch SWc includes a switch element and a diode connected in parallel to the switch element. Examples of the discharging switch SWd, the charging switch SWc, and a pre-charging switch SWp to be used may include an N channel FET, a P channel FET, an IGBT, a bipolar transistor, and an electromagnet-embedded mechanical relay.

The external terminal B+ is connected with a connection point between the discharging switch SWd and the charging switch SWc through a current limiting unit Reg and a pre-charging switch SWp. Since the discharging switch SWd includes the diode in a direction of allowing a charging current to flow, a pre-charging current constantly flows to the battery unit BAT. The pre-charging current passes through the current limiting unit Reg, thereby becoming a relatively small current.

The discharging switch SWd is used to switch a discharging current between energization (on) and interruption (off). The charging switch SWc is used to switch a discharging current between energization (on) and interruption (off). The pre-charging switch SWp is used to switch a charging current (decreased by the current limiting unit Reg) between energization (on) and interruption (off).

The discharging switch SWd, the charging switch SWc, and the pre-charging switch SWp are controlled by a module controller MOCNT. The module controller MOCNT corresponds to the sub-micro control unit 25 and the main-micro control unit 30 in the configuration of FIG. 2. Therefore, although omitted in the drawing, the module controller MOCNT has a function of acquiring data on a voltage of each battery cell in the battery unit BAT, SOC, charging current, discharging current, and battery temperature, and transmitting the acquired data to a higher-level controller CNT. Furthermore, the module controller MOCNT communicates with the controller CNT to control the discharging switch SWd, the charging switch SWc, and the pre-charging switch SWp.

As illustrated in FIG. 6A, the current limiting unit Reg is constituted by, for example, a resistor 51. A charging current is limited by the resistor 51. As illustrated in FIG. 6B, the resistor 51 may be connected with a posistor 52 in series. When a current flowing through the resistor 51 is 1.1 times to 2 times or more of a rated current of the posistor 52, the posistor 52 limits the current. For example, when the initial resistance of the posistor 52 is approximately 4Ω, and a current of approximately 0.6 A flows through the posistor 52 for approximately one minute or longer, the resistance value increases to approximately 5Ω or more. As a result, the current is reduced to 0.5 A or less. This connection enables a charging current to be limited to a predetermined current value or less. Furthermore, this connection can inhibit an excessive current from flowing through the resistor 51 and the temperature of the resistor 51 from becoming abnormally high to cause failure. It is noted that a positive coefficient thermistor may be used in place of the posistor 52.

Figure 7:
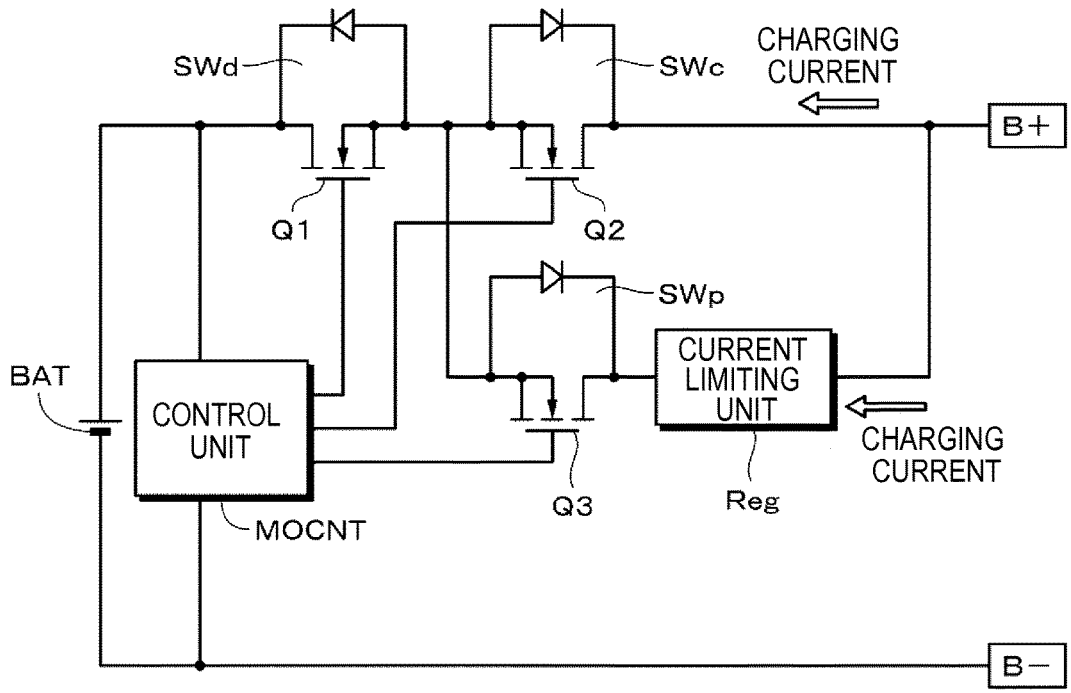
FIG. 7 is a connection diagram illustrating a configuration including an FET in the module according to the first embodiment of the present disclosure.

FIG. 7 illustrates a configuration including FETs Q1, Q2 and Q3 as switch elements for the discharging switch SWd, the charging switch SWc, and the pre-charging switch SWp. The drain of FET Q1 is connected with the positive side of the battery unit BAT; the source of FET Q1 and the source of FET Q2 are connected with each other; and the drain of FET Q2 is connected with the external terminal B+. Furthermore, the drain of FET Q3 is connected with the external terminal B+ via the current limiting unit Reg, and the source of FET Q3 is connected with the sources of FETs Q1 and Q2. The module controller MOCNT supplies control signals to the gates of FETs Q1, Q2 and Q3 to control on/off of these FETs.

"Variation of Module"

Figure 8:
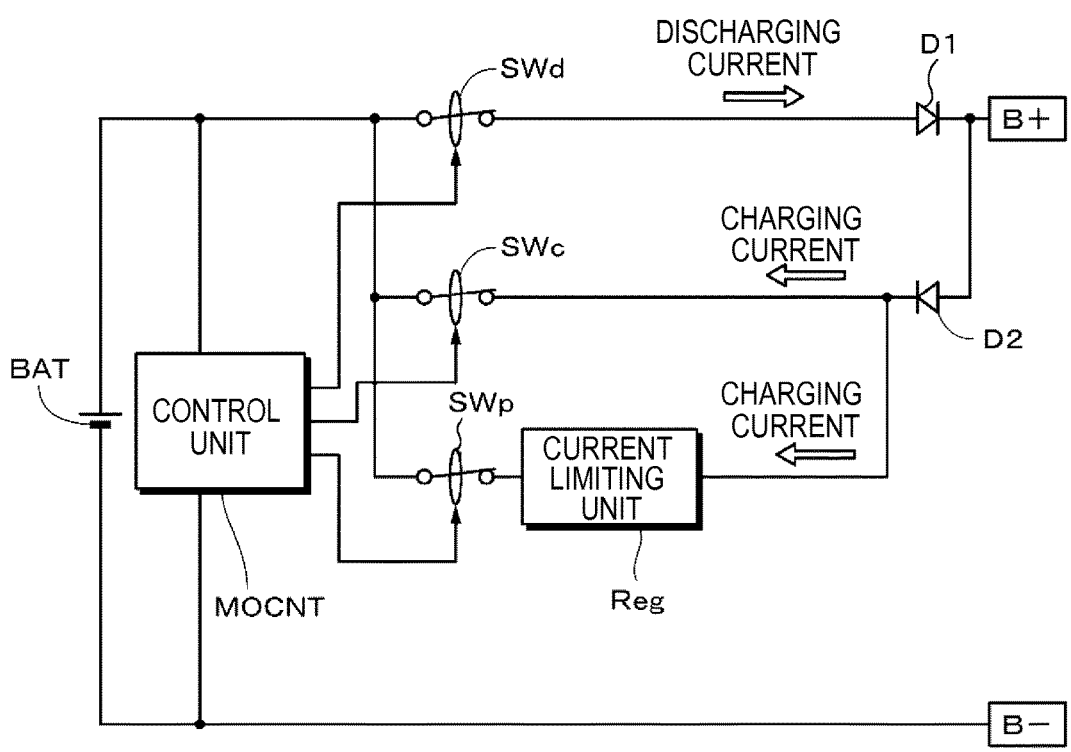
FIG. 8 is a connection diagram illustrating a configuration of another example of the module that can be used in the first embodiment of the present disclosure.

As illustrated in FIG. 8, a module may be configured such that the discharging switch SWd, the charging switch SWc and the pre-charging switch SWp are connected in parallel to the battery unit BAT, and diodes D1 and D2 for preventing a reverse current are connected between the external terminal B+ and these switches. In the configuration illustrated in FIG. 8, the switches are not connected in series, as compared to the configuration illustrated in FIG. 5. Therefore, a loss caused by the resistance component of the switches can be advantageously reduced. However, since voltage drop (approximately 0.7 V) occurs in the diodes D1 and D2, losses caused by the diodes D1 and D2 disadvantageously occur.

"Action During Replacing Operation of Module"

Figure 9:
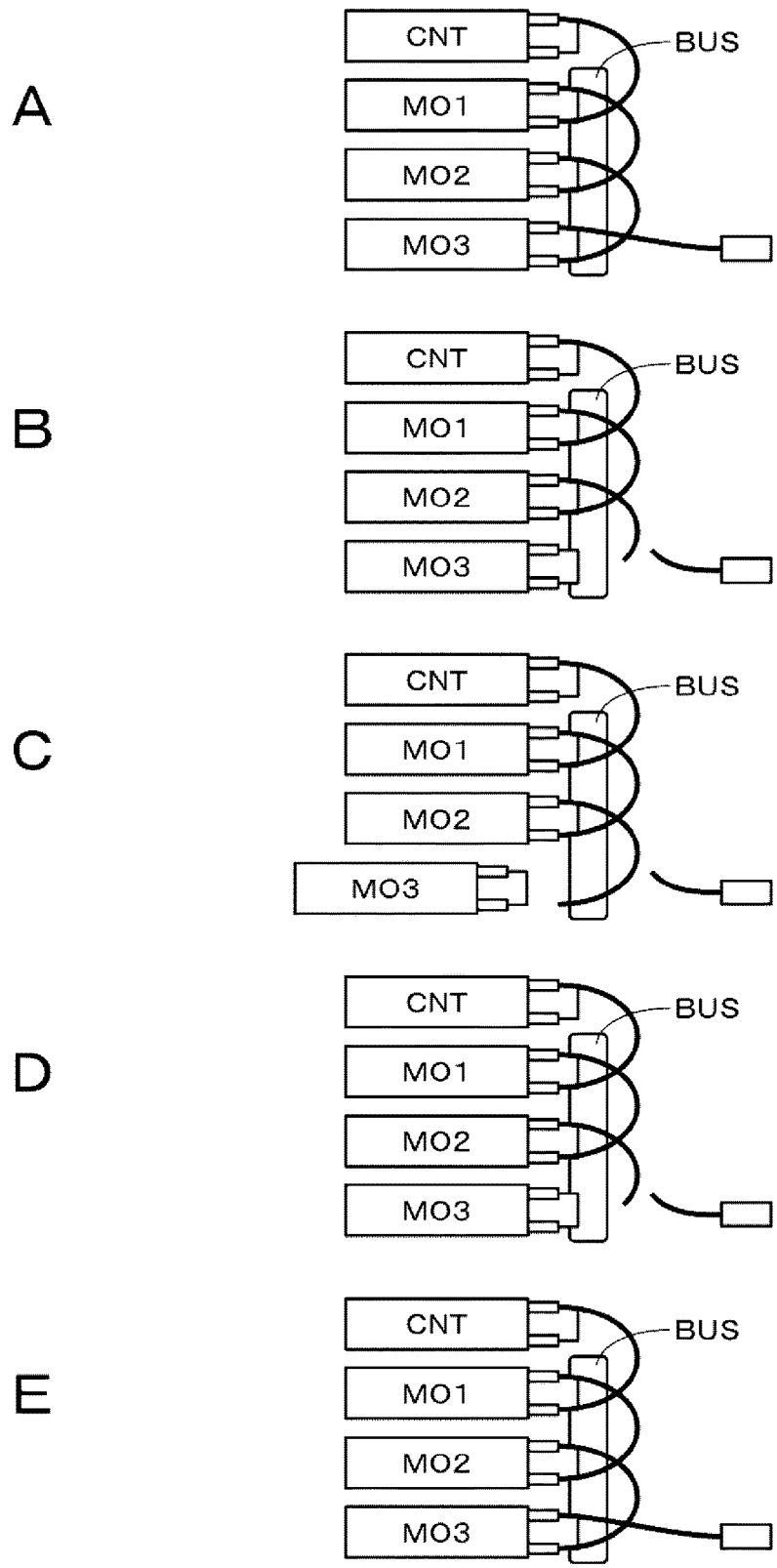
FIG. 9 is a block diagram illustrating an operation process flow and connection relationship during a hot swap.

An example of a hot swap operation of modules will be described with reference to FIG. 9. For example, as illustrated in FIG. 9A, power lines of three modules MO1, MO2 and MO3 are connected in parallel via a bus bar BUS, and the controller CNT and the modules are connected with communication lines (indicated by solid lines). In this normal state, all modules can be discharged, pre-charged, and communicate. For example, when a difference in voltage among all modules is larger than a predetermined judgment voltage value SVA, large current charging is prohibited, and only pre-charging is performed. When a difference in voltage is the judgment voltage value SVA or less, large current charging can be performed.

Next, when replacing one module MO3, two communication cables connected to the module MO3 are detached from the module MO3 as illustrated in FIG. 9B. In this state, the module MO3 can be discharged and pre-charged, but cannot communicate. Prohibited communication prohibits large current charging.

Next, the bus bar BUS is detached from the module MO3 as illustrated in FIG. 9C. The state of the system is similar to the connection state of FIG. 9B. In this state, the module MO3 cannot be discharged, pre-charged, and charged with a large current, and cannot communicate.

Next, a new module MO4 is connected to the bus bar BUS as illustrated in FIG. 9D. In this state, the module MO4 can be discharged and pre-charged, but cannot communicate. Prohibited communication prohibits large current charging.

Next, two communication lines are connected to the newly added module MO4 as illustrated in FIG. 9E to establish communication. In this state, all modules can be discharged, pre-charged, and communicate. For example, when a difference in voltage among all modules is larger than a predetermined judgment voltage value SVA, large current charging is prohibited, and only pre-charging is performed. When a difference in voltage is the judgment voltage value SVA or less, large current charging can be performed.

Hereinafter, a control method for a plurality of modules will be described. For example, as illustrated in FIG. 3, the controller CNT controls a plurality of modules. This control method includes several methods, and three categorized methods will be described.

"Examples of Charging State and Discharging State"

Before describing each control method, a plurality of charging states and discharging states when a charger or a device load CHL is connected to a parallel connection of four modules MO1 to MO4 will be specifically described. It is noted that in FIG. 10 to FIG. 18 described below, the controller CNT is omitted for simplicity. The module controller of each module communicates with the higher-level controller CNT to control charging and discharging of each module.

Figure 10:
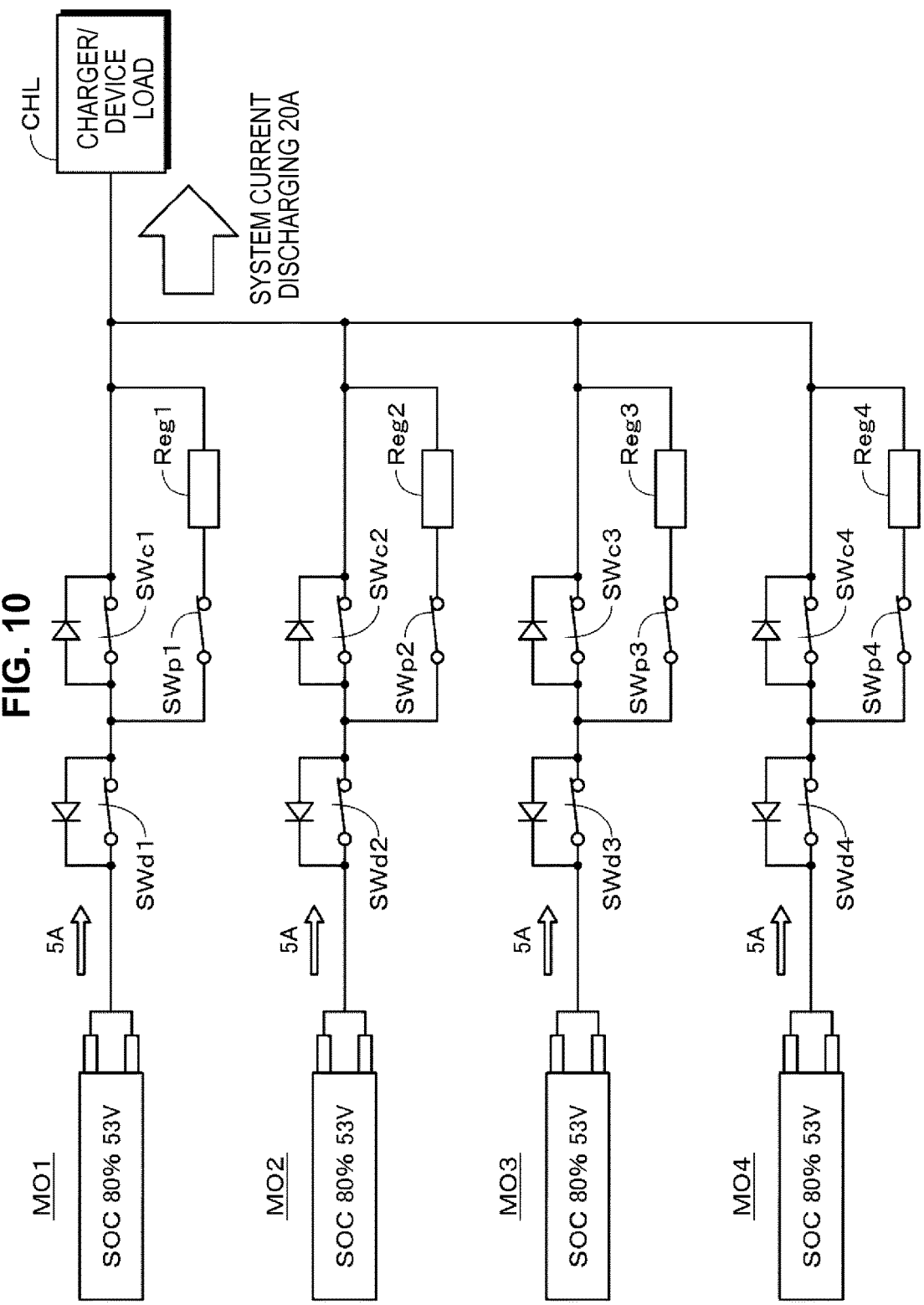
FIG. 10 is a block diagram for explaining an example of an action during discharging, in a power storage device.

In an example illustrated in FIG. 10, the SOC of each module is 80%, and the voltage of each module is 53 V. In this case, the discharging switches SWd1 to SWd4, the charging switches SWc1 to SWc4, and the pre-charging switches SWp1 to SWp4 of all modules are switched on. The charging switches SWc1 to SWc4 may be switched off. When a system current to the charger or the device load CHL is 20 A, an output current of 5 A is supplied from each of the modules. The example of FIG. 10 is in a preferred discharging state.

Figure 11:
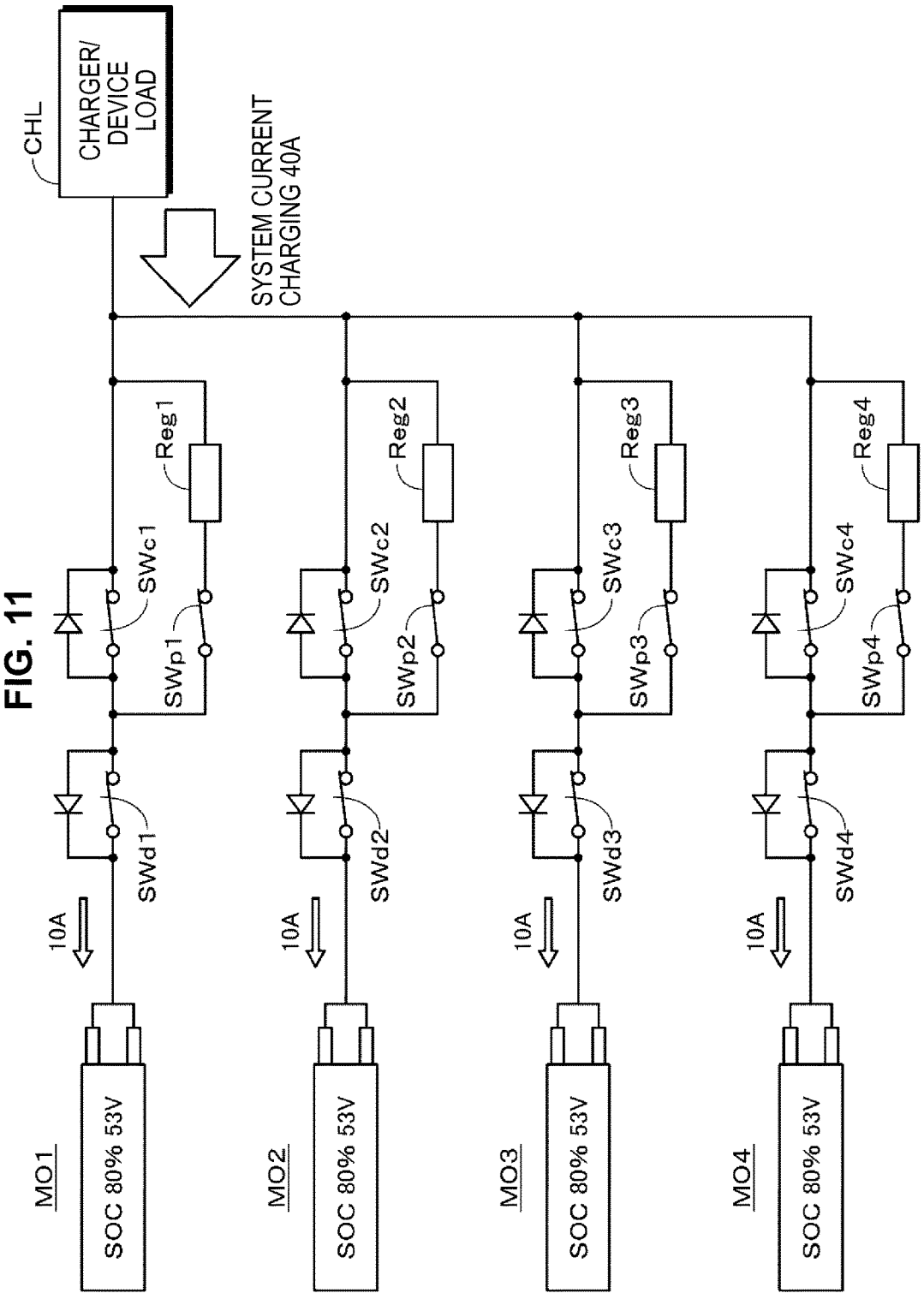
FIG. 11 is a block diagram for explaining an example of an action during charging, in a power storage device.

In an example illustrated in FIG. 11, the SOC of each module is 80%, and the voltage of each module is 53 V. In this case, the discharging switches SWd1 to SWd4, the charging switches SWc1 to SWc4, and the pre-charging switches SWp1 to SWp4 of all modules are switched on. The discharging switches SWd1 to SWd4 may be switched off. When the maximum system current from the charger or the device load CHL is 40 A, a charging current of 10 A is supplied to each of the modules. The example of FIG. 11 is in a preferred charging state.

Figure 12:
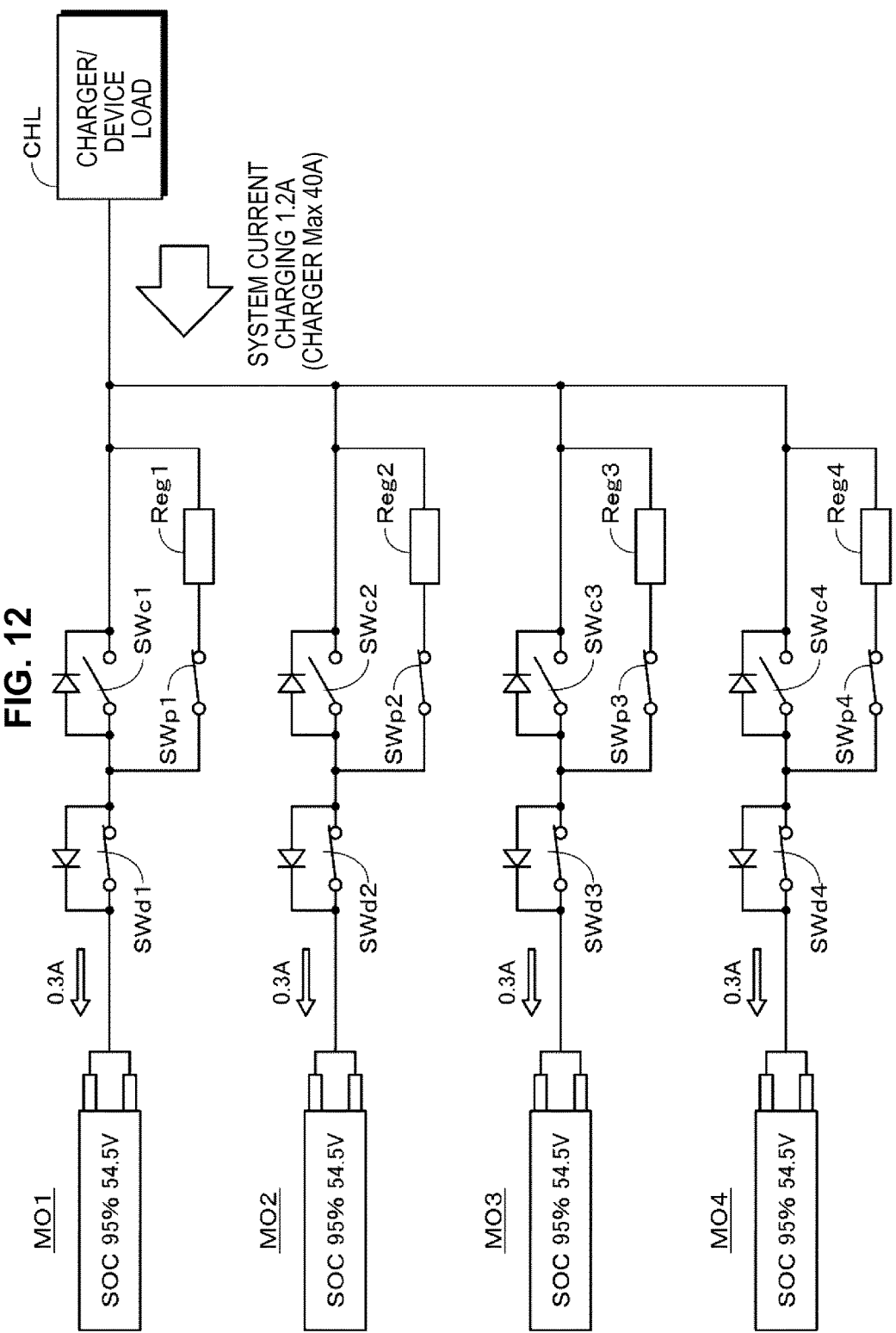
FIG. 12 is a block diagram for explaining an example of an action during charging when a remaining capacity is sufficiently large and a charging switch is off, in a power storage device.

In an example illustrated in FIG. 12, the SOC of each module is 95%, and the voltage of each module is 54.5 V. In this case, the battery unit of each module is almost fully charged, and therefore a charging current is set to be small. That is, the discharging switches SWd1 to SWd4 and the pre-charging switches SWp1 to SWp4 of all modules are switched on. The discharging switches SWd1 to SWd4 may be switched off. The charging switches SWc1 to SWc4 are switched off. The modules are charged with a small charging current through the pre-charging switches SWp1 to SWp4. Therefore, in this example, the system current from the charger or the device load CHL is set to be 1.2 A, so that a charging current of 0.3 A is supplied to each module.

Figure 13:
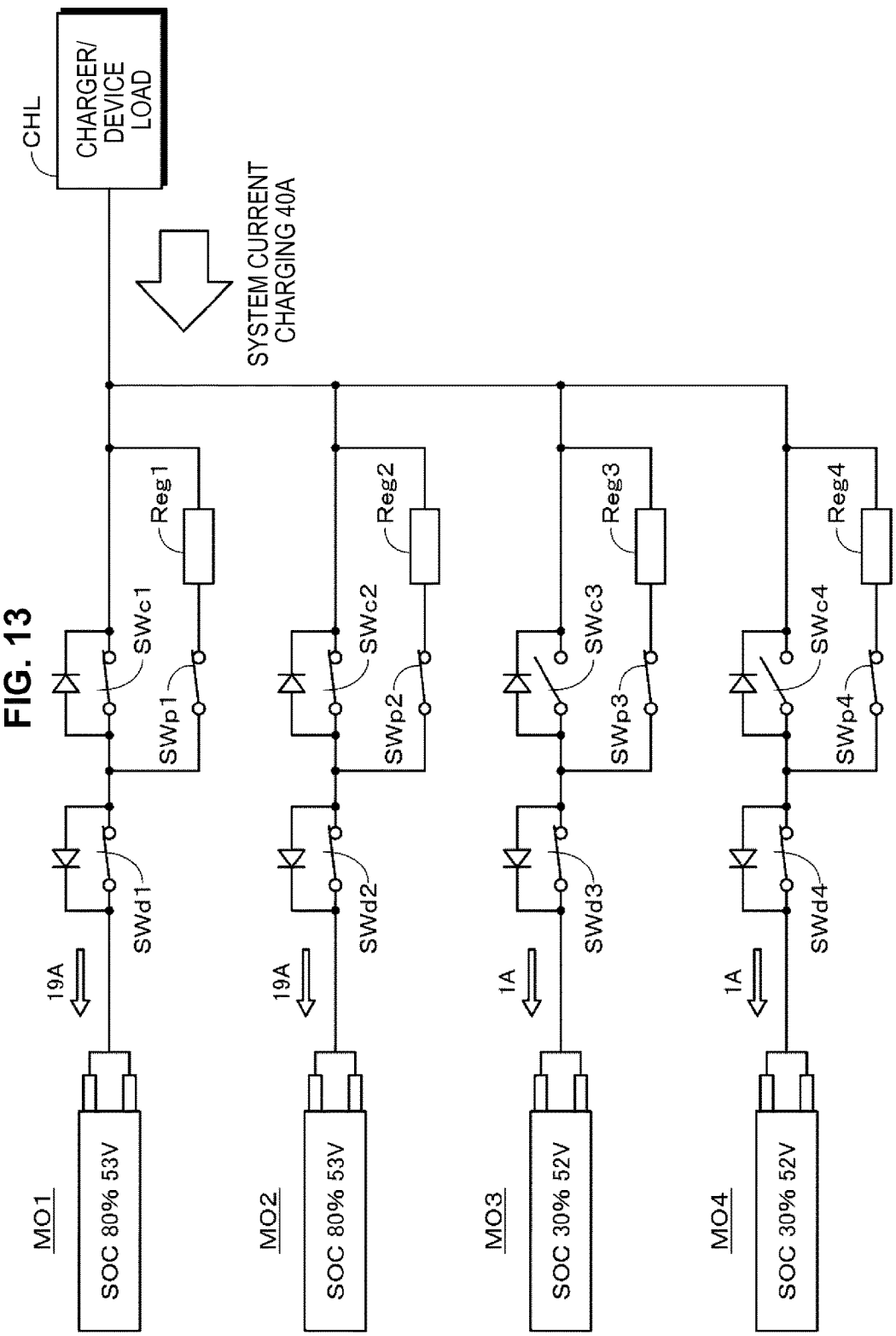
FIG. 13 is a block diagram for explaining an example of an action during charging when the charging switches of two modules each having a sufficiently large remaining capacity are on, in a power storage device.

An example illustrated in FIG. 13 depicts a charging state when modules MO1 and MO2 each have an SOC of 80% and a voltage of 53 V, and modules MO3 and MO4 each have an SOC of 30% and a voltage of 52 V.

For charging in this example, the discharging switches SWd1 to SWd4 are all switched on, and the pre-charging switches SWp1 to SWp4 are all switched on. The charging switches SWc1 and SWc2 of the modules MO1 and MO2 having a large SOC are switched on, and these modules are charged with a large current of 19 A. The charging switches SWc3 and SWc4 of the modules MO3 and MO4 having a small SOC are switched off, and these modules MO3 and MO4 are charged with a small current of 1 A through the pre-charging switches SWp3 and SWp4.

Figure 14:
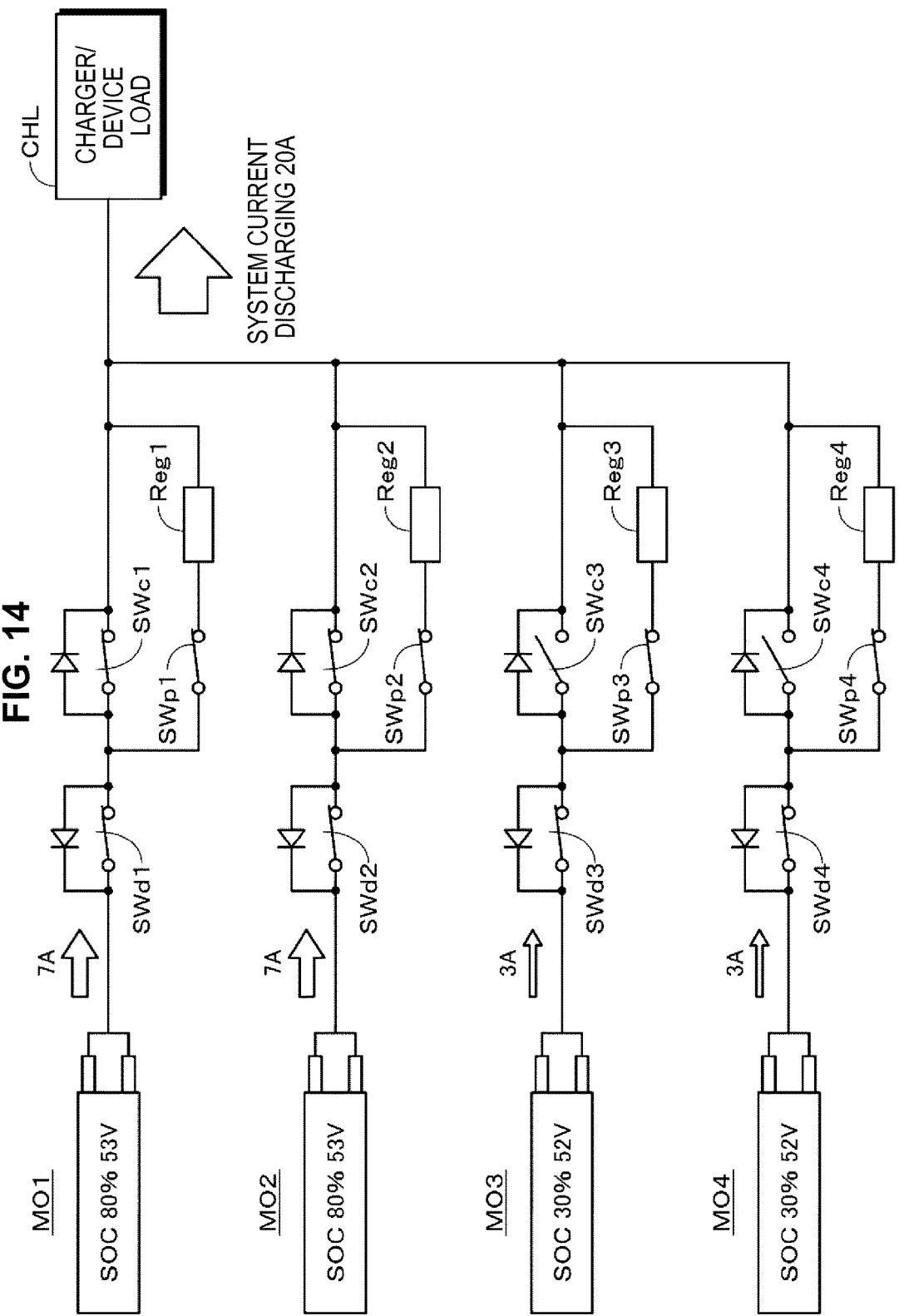
FIG. 14 is a block diagram for explaining an example of an action during discharging when the charging switches of two modules each having a sufficiently large remaining capacity are on, in a power storage device.

An example illustrated in FIG. 14 depicts a charging state when modules MO1 and MO2 each have an SOC of 80% and a voltage of 53 V, and modules MO3 and MO4 each have an SOC of 30% and a voltage of 52 V.

For discharging in this example, the discharging switches SWd1 to SWd4 are all switched on, and the pre-charging switches SWp1 to SWp4 are all switched on. The charging switches SWc1 and SWc2 of the modules MO1 and MO2 having a large SOC are switched on, and a current of 7 A is outputted from these modules MO1 and MO2. The charging switches SWc3 and SWc4 of the modules MO3 and MO4 having a small SOC are switched off, and a small current of 3 A is outputted from these modules MO3 and MO4. The system current comes to be 20 A in total.

Figure 15:
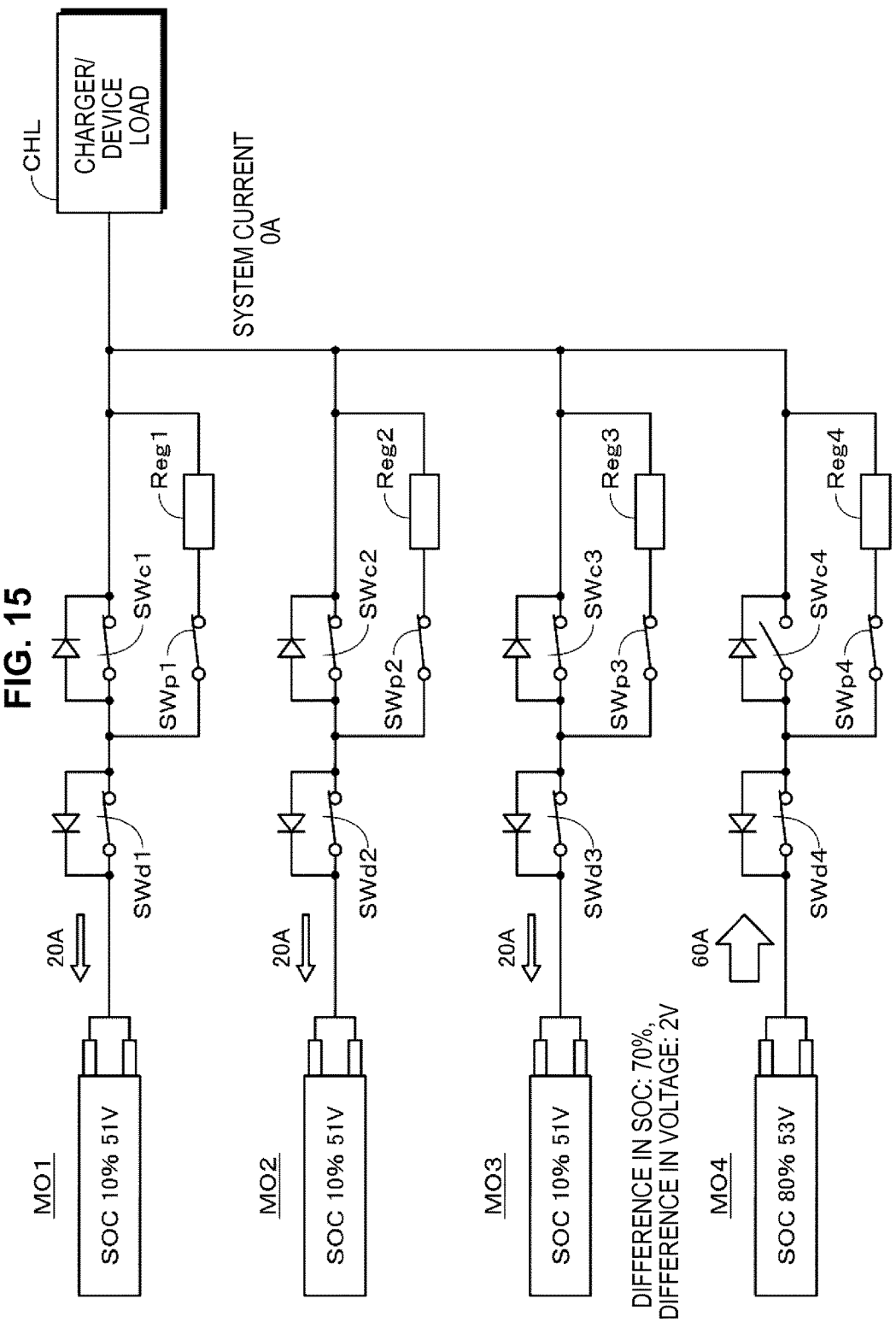
FIG. 15 is a block diagram for explaining an example of an action of an excessive discharging current flowing from one module when the charging switches of three modules each having a small remaining capacity are on without a load, in a power storage device.

In an example illustrated in FIG. 15, modules MO1, MO2 and MO3 each have an SOC of 10% and a voltage of 51 V, and a module MO4 has an SOC of 80% and a voltage of 53 V. The system current is set to be 0 A (that is, no load). Furthermore, each module is set to have a maximum charging current of 24 A and a maximum discharging current of 30 A.

It is assumed that when the difference in SOC is 70% and the difference in voltage is 2 V as described above, the charging switches SWc1, SWc2 and SWc3 of the modules MO1, MO2 and MO3 having an small SOC are switched on. A charging current of 20 A flows to each of the modules MO1, MO2 and MO3 through the charging switches SWc1, SWc2 and SWc3 respectively. An excessive discharging current of 60 A exceeding a maximum discharging current may flow from the module MO4, possibly causing damage to the module MO4. Therefore, the modules are required to be controlled so that such a state illustrated in FIG. 15 is inhibited from occurring.

Figure 16:
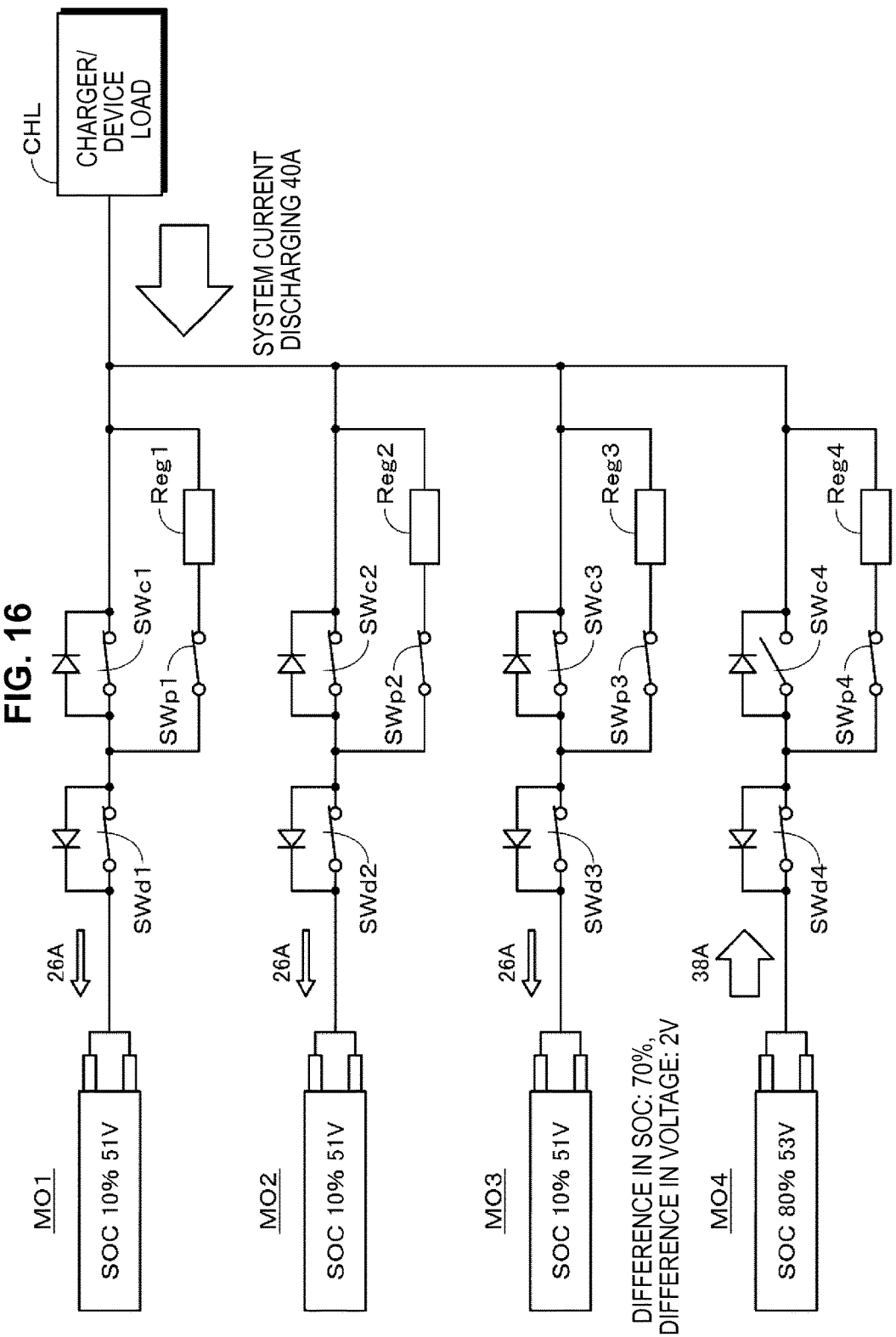
FIG. 16 is a block diagram for explaining an example of an action of an excessive discharging current flowing from one module and excessive charging currents flowing to three modules when the charging switches of three modules each having a small remaining capacity are on, in a power storage device.

In an example illustrated in FIG. 16, modules MO1, MO2 and MO3 each have an SOC of 10% and a voltage of 51 V, and a module MO4 has an SOC of 80% and a voltage of 53 V. The system current is set to be 40 A during charging. Furthermore, each module has a maximum charging current of 24 A and a maximum discharging current of 30 A.

It is assumed that when the difference in SOC is 70% and the difference in voltage is 2 V as described above, the charging switches SWc1, SWc2 and SWc3 of the modules MO1, MO2 and MO3 having a small SOC are switched on. A charging current of 26 A flows to each of the modules MO1, MO2 and MO3 through the charging switches SWc1, SWc2 and SWc3 respectively. A maximum discharging current of 38 A flows from the module MO4. Accordingly, an excessive discharging current may flow through the module MO4 while an excessive charging current flows to modules MO1, MO2 and MO3, possibly causing damage to the modules MO1 to MO4. Therefore, the modules are required to be controlled so that such a state illustrated in FIG. 16 is inhibited from occurring.

Figure 17:
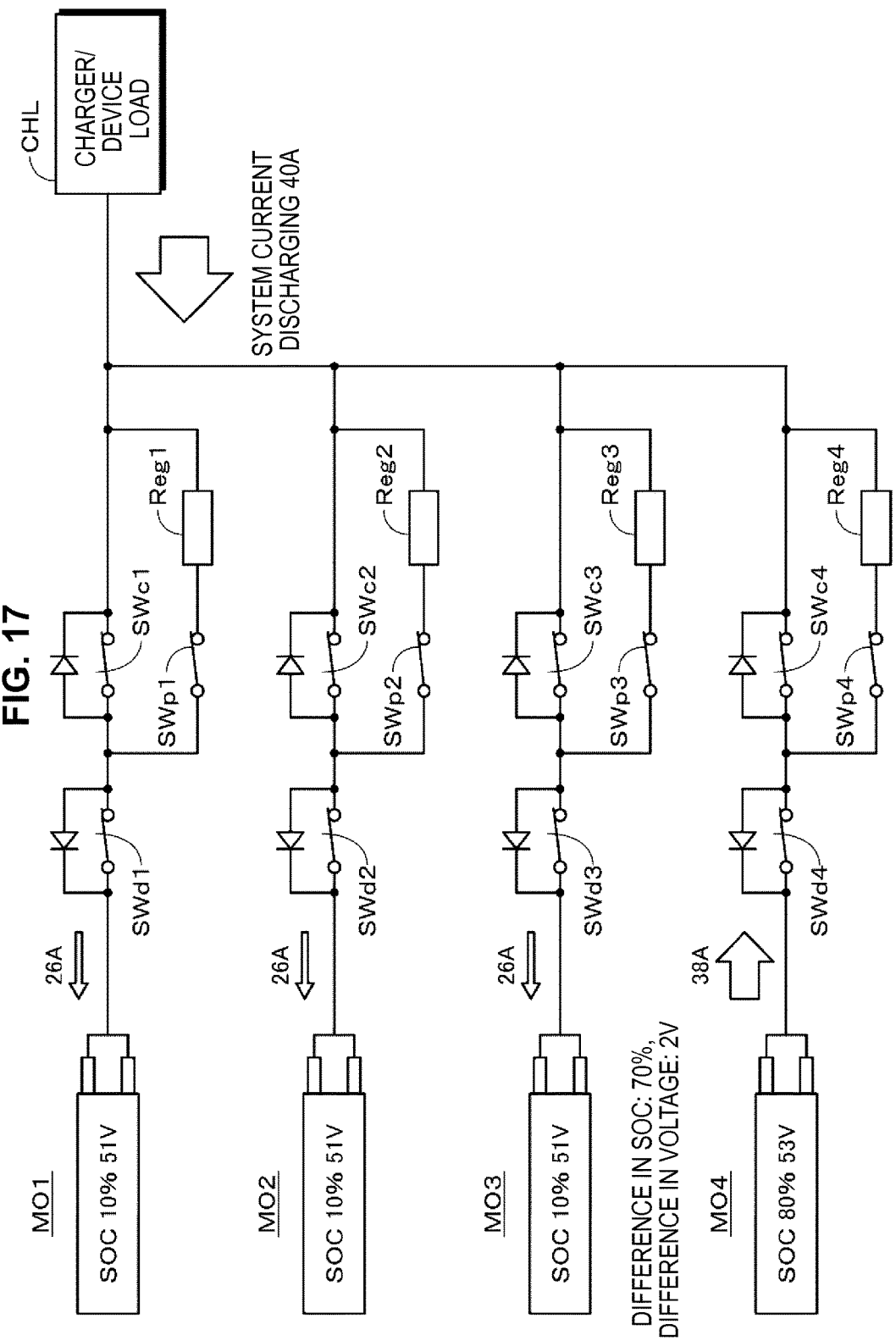
FIG. 17 is a block diagram for explaining an example of an action of an excessive discharging current flowing from one module and excessive charging currents flowing to three modules when the charging switches of all modules including the three modules each having a small remaining capacity are on, in a power storage device.

In an example illustrated in FIG. 17, modules MO1, MO2 and MO3 each have an SOC of 10% and a voltage of 51 V, and a module MO4 has an SOC of 80% and a voltage of 53 V. The system current is set to be 40 A during charging. Furthermore, it is assumed that each module has a maximum charging current of 24 A and a maximum discharging current of 30 A.

It is assumed that when the difference in SOC is 70% and the difference in voltage is 2 V as described above, the charging switches SWc1 to SWc4 of all modules MO1 to MO4 are switched on. A charging current of 26 A flows to each of the modules MO1, MO2 and MO3 through the charging switches SWc1, SWc2 and SWc3 respectively. A maximum discharging current of 38 A flows from the module MO4. Accordingly, an excessive discharging current may flow through the module MO4 while an excessive charging current flows to modules MO1, MO2 and MO3, possibly causing damage to the modules MO1 to MO4. Therefore, the modules are required to be controlled so that such a state illustrated in FIG. 17 is inhibited from occurring.

Figure 18:
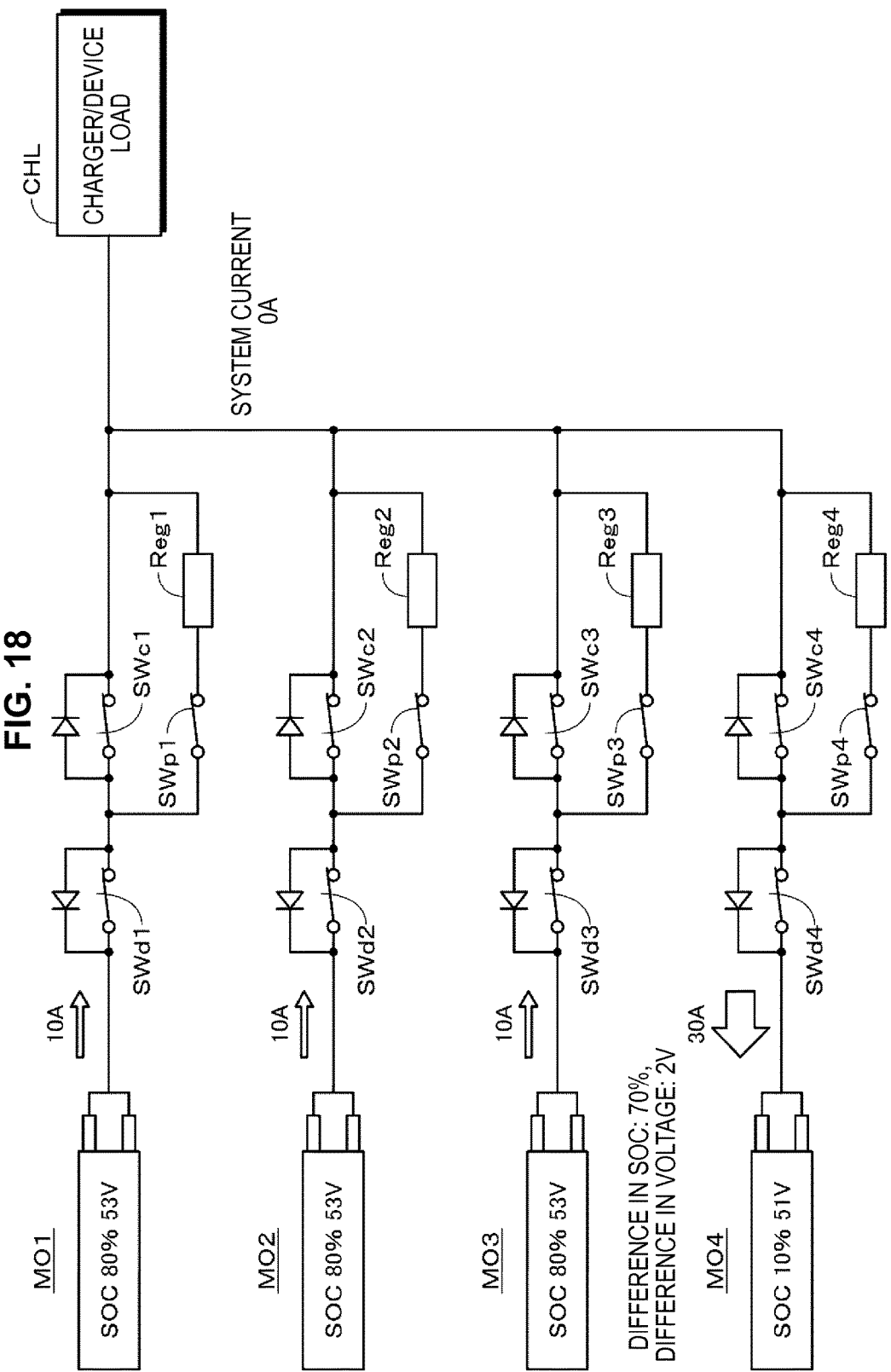
FIG. 18 is a block diagram for explaining an example of an action of an excessive charging current flowing to one module when the charging switches of all modules are on without a load, in a power storage device.

In an example illustrated in FIG. 18, modules MO1, MO2 and MO3 each have an SOC of 80% and a voltage of 53 V, and a module MO4 has an SOC of 10% and a voltage of 51 V. The system current is set to be 0 A (no load). Furthermore, each module is assumed to have a maximum charging current of 24 A and a maximum discharging current of 30 A.

It is assumed that when the difference in SOC is 70% and the difference in voltage is 2 V as described above, the discharging switches SWd1 to SWd4, the charging switches SWc1 to SWc4, and the pre-charging switches SWp1 to SWp4 of all modules MO1 to MO4 are switched on. A discharging current of 10 A flows from the modules MO1, MO2 and MO3 through the discharging switches SWd1, SWd2 and SWd3 respectively. A charging current of 30 A that is a value exceeding a maximum charging current of 24 A flows to the module MO4. Therefore, an excessive charging current can flow to the module MO4, possibly causing damage to the module MO4. Therefore, the modules are required to be controlled so that such a state illustrated in FIG. 18 is inhibited from occurring.

"Outline of Control"

The control according to the present disclosure is schematically as described below.

Each module particularly has a configuration illustrated in FIG. 2, and schematically has a configuration illustrated in FIG. 5 (or FIG. 8). Furthermore, as illustrated in FIG. 3 or FIG. 4, a plurality of modules is connected in parallel, and charging and discharging of the modules are controlled by a higher-level controller.

As described above with reference to FIG. 9, when a hot swap of modules is performed, communication is established so that charging control is initiated. When a plurality of modules is connected via a bus bar, all the modules are constantly controlled to be in a dischargeable state. When a difference in voltage among all modules is small, charging switches of the modules are all switched on to control the modules to be in a chargeable state. This control enables the power storage device to be constantly in a dischargeable state when at least one module has a remaining capacity. Since charging is only enabled when a difference in voltage among the modules is small, an abnormally large discharging or charging current can be inhibited from flowing through one module. The charging current of a system is almost uniformly distributed into all modules.

Even when modules having a low voltage are incorporated, charging switches of modules having a voltage near that of a module having the highest voltage are switched on so that the modules become in a chargeable state, by counting the number of modules having a voltage nearest to that of the module having the highest voltage and previously calculating a charging current per module when the system initiates charging. At the same time, a module having a voltage not being near that of the module having the highest voltage is maintained in a charging-prohibited state by switching off its charging switch. This control can inhibit an abnormally large discharging or charging current from flowing through one module.

When one or more modules become in an overcurrent charging or discharging state after their charging switches have been switched to be in an on state in the above-described control, charging switches of all modules are switched to be in an off state.

By providing a pre-charging function that supplies a small charging current, and switching on the pre-charging switch, a small charging current is allowed to constantly flow through the current limiting unit Reg in each of all modules. This function enables a small charging current to flow in each module even when a difference in voltage between modules is large. Accordingly, all modules are uniformly charged after a certain extended time has elapsed, and come to have an approximately identical voltage. When all modules come to have approximately identical voltages, all modules are switched to be in a chargeable state.

Furthermore, when any one module comes to have a remaining capacity of approximately 90% or more, the charging switch of the module is controlled to be switched into an off state so that only the pre-charging switch directly connected to the current limiting unit Reg is switched into an on state. This control can inhibit a large charging current from flowing through one module. While the system is charged, the charging current of a module having a remaining capacity of approximately 90% or more decreases, and a large charging current flows through another module having a remaining capacity of less than approximately 90%.

When a battery in the battery unit is in an overvoltage charging state, or when a module is in an overcurrent charging state, the charging switch is switched into a non-chargeable state. At the same time, the pre-charging switch is switched into an off state. When a battery is in an overvoltage discharging state or a module is in an overcurrent discharging state, the discharging switch is controlled to be non-dischargeable. The protection function of the single cell and module has a priority to the above-described control.

Furthermore, the control method according to the present disclosure will be described. According to the present disclosure, a first control method is called control method A; a second control method is called control method B; and a third control method is called control method C. First, the first control method A will be described. As examples, control methods A-1, A-2, A-3 and A-4 will be described.

"First Control Method A"

Functions common in control method A will be described below.

Always switch on discharging switches of all modules.

Always switch on pre-charging switches of all modules. Connect a resistor to the pre-charging switch in series, and permit a small charging current through the resistor to flow. The resistor has a resistance value of, for example, 10Ω.

It is noted that as described herein, "always" is not particularly limiting, and, for example, one hour can be defined.

"Control Method A-1"

Figure 19:
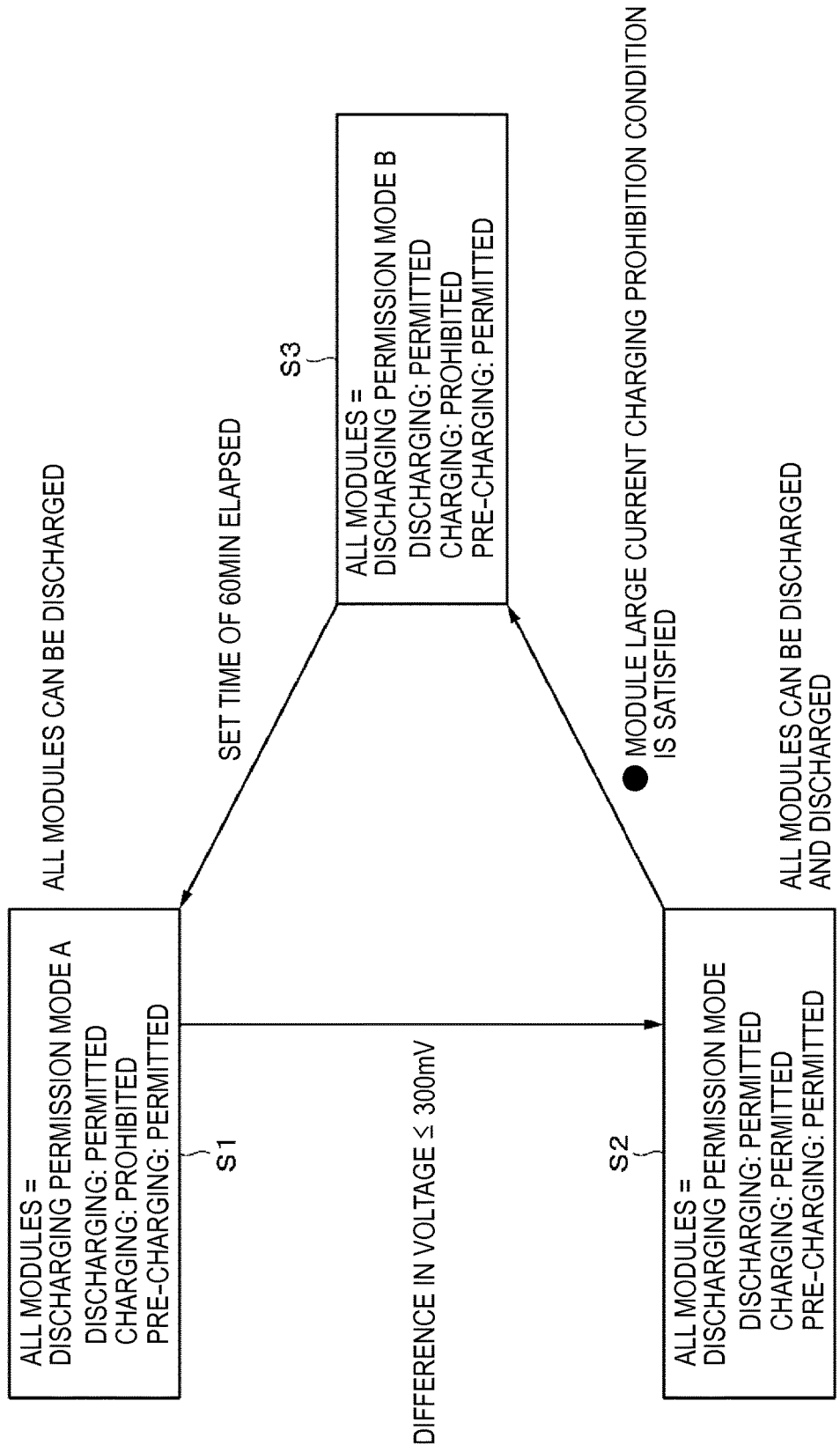
FIG. 19 is a flow chart for explaining a process flow of control method A-1 in the first embodiment of the present disclosure.

A flow of control by control method A-1 is illustrated in FIG. 19. All modules in the system synchronize with each other to perform state transition of FIG. 19. The same applies to control methods A-2, A-3 and A-4 below. In step S1, discharging switches and pre-charging switches are switched on, and charging switches are switched off, in all modules. In step S2, charging switches are switched on. A condition for shifting the charging switches from off to on is when a difference in voltage between the highest voltage module and the lowest voltage module is a predetermined judgment voltage value SVA or less. In the following description, for example, (SVA=300 mV) is defined. In step S2, all modules can be charged and discharged.

When the below-described condition for prohibiting large current charging of a module is satisfied in step S2, the control proceeds to step S3 to switch off the charging switches of all modules. After the state of step S3 has continued for a predetermined time, for example, for 60 minutes, the control returns from step S3 to step S1.

Condition for Prohibiting Large Current Charging of Module:

The current values of charging and discharging for all modules are measured, and the measured current values (measured charging current values and measured discharging current values) are used. The measured charging current values are compared to a maximum charging current value SMMAXCC (for example, 24 A) for one module. The measured discharging current values are compared to a maximum discharging current value SMMAXDC (for example, 30 A) for one module.

When one of the relationship (measured charging current value>maximum charging current value) and the relationship (measured discharging current value>maximum discharging current current) is met in one or more modules, the condition for prohibiting large current charging is satisfied.

Control method A1 has an advantage that the number of modules in which charging switches are switched on is large, thereby reducing a likelihood that an excessive charging current is caused while the charging switches are switched on. On the other hand, when a difference in voltage among modules is large, a charging current is small, thereby reducing a difference in voltage. Thus, a time period before switching on the charging switches becomes longer (for example, tens of hours).

Table 1 below illustrates the combinations of various values and the aspects of control of charging and discharging switches in control method A-1. In the table, black solid circles indicate that the switches are switched on.

step S2, the control proceeds to step S3 to switch off the charging switches of all modules. After the state of step S3 has continued for a predetermined time, for example, for 60 minutes, the control returns from step S3 to step S1.

TABLE 1

| | Charging and discharging control A-1 | | | | | | | | | | | | |
|---|---|---|---|---|---|---|---|---|---|---|---|---|---|
| | System set current | | System measured current value | | module Voltage | | | | module SOC | | | | Pre-charging SW |
| No. | Charging | Discharging | Charging | Discharging | 1 | 2 | 3 | 4 | 1 | 2 | 3 | 4 | All Ms |
| 1 | | 20 A | | 20 A | 52.6 V | 52.6 V | 52.6 V | 52.6 V | 50% | 50% | 50% | 50% | ● |
| 2 | 40 A | | 40 A | | 52.6 V | 52.6 V | 52.6 V | 52.6 V | 50% | 50% | 50% | 50% | ● |
| 3 | 40 A | | 40 A | | 52.6 V | 52.6 V | 52.6 V | 52.6 V | 70% | 50% | 50% | 50% | ● |
| 4 | | 20 A | | 20 A | 52.6 V | 52.6 V | 52.6 V | 52.6 V | 80% | 50% | 50% | 50% | ● |
| 5 | 40 A | | 2 A | | 52.6 V | 52.6 V | 52.6 V | 52.6 V | 80% | 50% | 50% | 50% | ● |

| | Module charging SW | | | | Module discharging SW | | | | Module current | | | | |
|---|---|---|---|---|---|---|---|---|---|---|---|---|---|
| No. | 1 | 2 | 3 | 4 | 1 | 2 | 3 | 4 | 1 | 2 | 3 | 4 | State |
| 1 | ● | ● | ● | ● | ● | ● | ● | ● | −5 A | −5 A | −5 A | −5 A | Difference in voltage ≤300 mV |
| 2 | ● | ● | ● | ● | ● | ● | ● | ● | 10 A | 10 A | 10 A | 10 A | Charging SWs of all modules on |
| 3 | ● | ● | ● | ● | ● | ● | ● | ● | 7 A | 11 A | 11 A | 11 A | Difference in voltage ≤300 mV Charging SWs of all modules on |
| 4 | | | | | ● | ● | ● | ● | −8 A | −4 A | −4 A | −4 A | Difference in voltage ≤300 mV |
| 5 | | | | | ● | ● | ● | ● | 0.5 A | 0.5 A | 0.5 A | 0.5 A | Charging SWs of all modules on |

"Control Method A-2"

Figure 20:
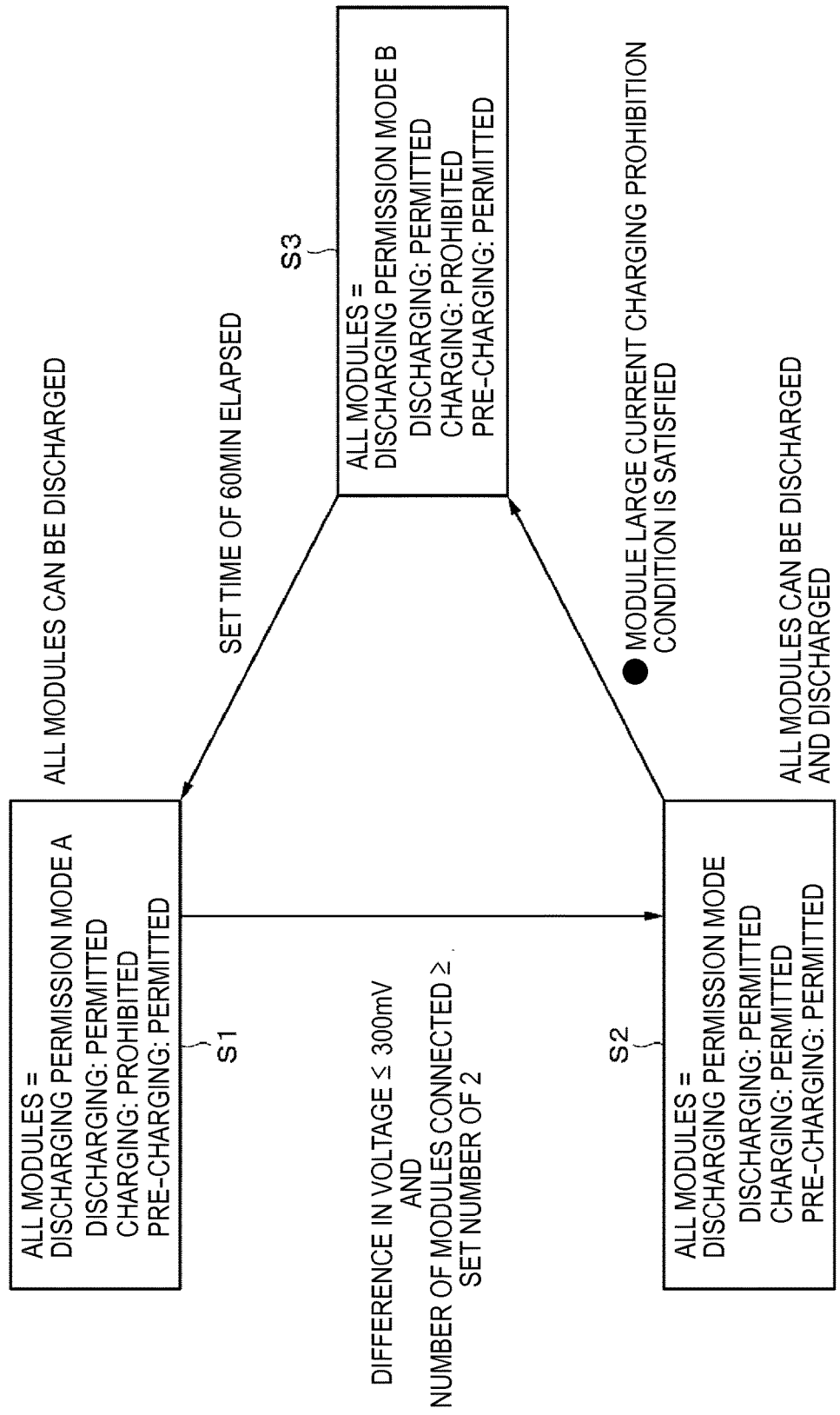
FIG. 20 is a flow chart for explaining a process flow of control method A-2 in the first embodiment of the present disclosure.

A flow of control by control method A-2 is illustrated in FIG. 20. The state for each of step S1, step S2 and step S3 is the same as that in control method A-1 described above.

Table 2 below illustrates the combinations of various values and the aspects of control of charging and discharging switches in control method A-2. In the table, black solid circles indicate that the switches are switched on.

TABLE 2

| | Charging and discharging control A-2 | | | | | | | | | | | |
|---|---|---|---|---|---|---|---|---|---|---|---|---|
| | System set current | | System measured current value | | module Voltage | | | | module SOC | | | |
| No. | Charging | Discharging | Charging | Discharging | 1 | 2 | 3 | 4 | 1 | 2 | 3 | 4 |
| 1 | 40 A | | 0.5 A | | 53.0 V | Not connected | Not connected | Not connected | 80% | — | — | — |
| 2 | 40 A | | 40 A | | 53.0 V | 53.0 V | Not connected | Not connected | 80% | 80% | — | — |

| | Pre-charging SW | Module charging SW | | | | Module discharging SW | | | | Module current | | | | |
|---|---|---|---|---|---|---|---|---|---|---|---|---|---|---|
| No. | All Ms | 1 | 2 | 3 | 4 | 1 | 2 | 3 | 4 | 1 | 2 | 3 | 4 | State |
| 1 | ● | — | — | — | — | ● | ● | ● | ● | 0.5 A | 0.0 A | 0.0 A | 0.0 A | One module connected Charging SWs off |
| 2 | ● | ● | ● | — | — | ● | ● | ● | ● | 20 A | 20 A | 0 A | 0 A | Two modules connected & Difference in voltage ≤300 mV Two charging SWs on |

A condition for transition from step S1 to step S2 (charging switches of all modules are switched on) is as below.

When a difference in voltage between the highest voltage module and the lowest voltage module is a predetermined judgment voltage value SVA (=300 mV) or less, and the number of modules is set to be two or more.

Similarly to control method A-1, when the condition for prohibiting large current charging of a module is satisfied in step S2, the control proceeds to step S3 to switch off the "Control Method A-3"

Figure 21:
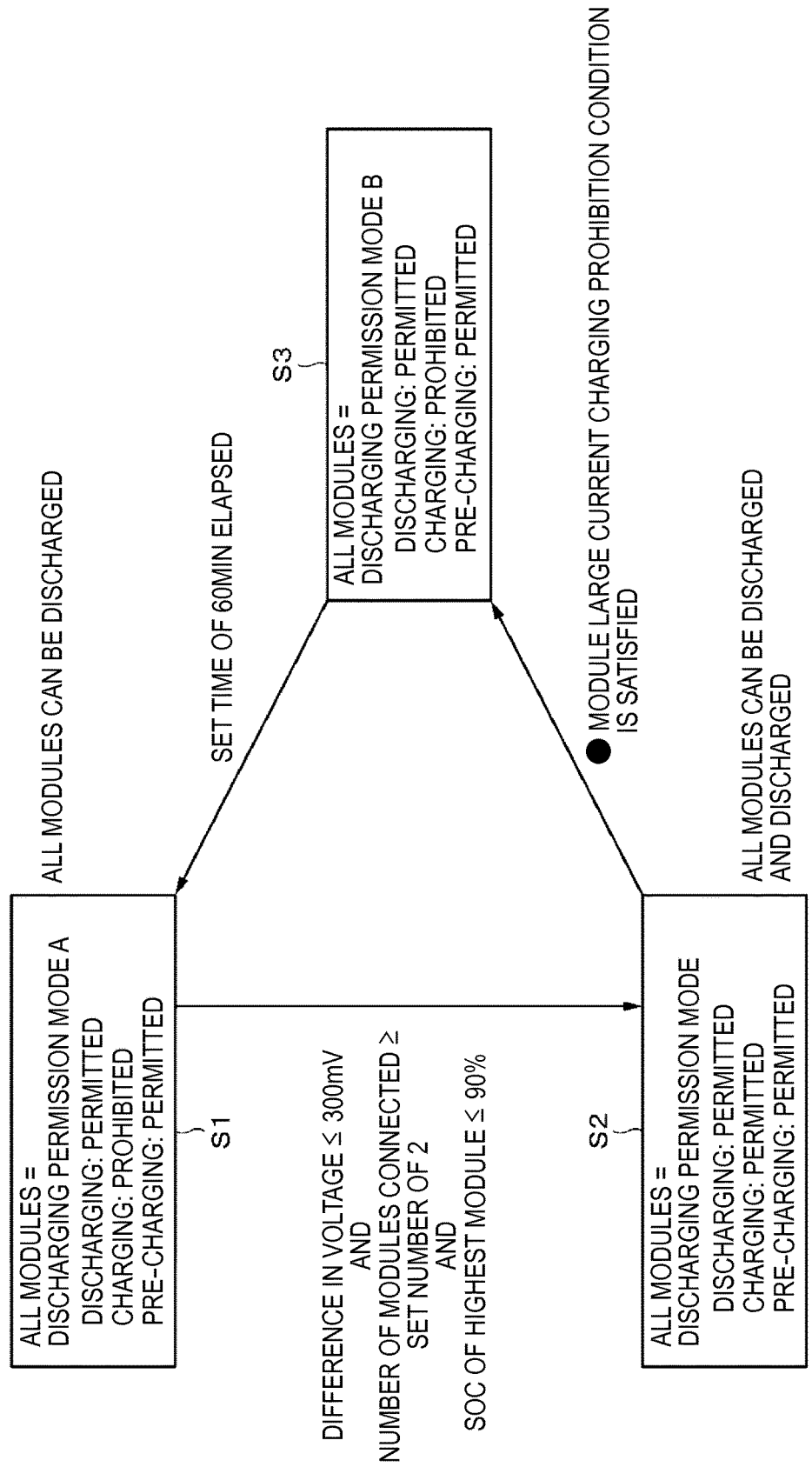
FIG. 21 is a flow chart for explaining a process flow of control method A-3 in the first embodiment of the present disclosure.

A flow of control by control method A-3 is illustrated in FIG. 21. The state for each of step S1, step S2 and step S3 is the same as that in control method A-1 described above. A condition for transition from step S1 to step S2 (charging switches of all modules are switched on) is as below.

When a difference in voltage between the highest voltage module and the lowest voltage module is a predetermined judgment voltage value SVA (=300 mV) or less; the number of modules connected is set to be two or more; and the highest voltage module has an SOC of 90% or less.

Similarly to control method A-1, when the condition for prohibiting large current charging of a module is satisfied in step S2, the control proceeds to step S3 to switch off the charging switches of all modules. After the state of step S3 has continued for a predetermined time, for example, for 60 minutes, the control returns from step S3 to step S1. The addition of a condition that the SOC is 90% or less can inhibit on/off of the charging switches from frequently occurring around a fully charged state of a battery.

Table 3 below illustrates the combinations of various values in control method A-3.

in SOC between the highest voltage module and the lowest voltage module is 10% or less; and the number of modules is set to be two or more.

Similarly to control method A-1, when the condition for prohibiting large current charging of a module is satisfied in step S2, the control proceeds to step S3 to switch off the charging switches of all modules. After the state of step S3 has continued for a predetermined time, for example, for 60 minutes, the control returns from step S3 to step S1.

Table 4 below illustrates the combinations of various values in control method A-4.

TABLE 3

| | Charging and discharging control A-3 | | | | | | | | | | | |
|---|---|---|---|---|---|---|---|---|---|---|---|---|
| | System set current | | System measured current value | | module Voltage | | | | module SOC | | | |
| No. | Charging | Discharging | Charging | Discharging | 1 | 2 | 3 | 4 | 1 | 2 | 3 | 4 |
| 1 | 40 A | | 40 A | | 53.0 V | 53.0 V | 53.0 V | 53.0 V | 80% | 80% | 80% | 80% |
| 2 | 40 A | | 1.2 A | | 54.5 V | 54.5 V | 54.5 V | 54.5 V | 95% | 95% | 95% | 95% |

| | Pre-charging SW | Module charging SW | | | | Module discharging SW | | | | Module current | | | | |
|---|---|---|---|---|---|---|---|---|---|---|---|---|---|---|
| No. | All Ms | 1 | 2 | 3 | 4 | 1 | 2 | 3 | 4 | 1 | 2 | 3 | 4 | State |
| 1 | ● | ● | ● | ● | ● | ● | ● | ● | ● | 10 A | 10 A | 10 A | 10 A | SOC ≤90% Charging SWs on |
| 2 | ● | | | | | ● | ● | ● | ● | 0.3 A | 0.3 A | 0.3 A | 0.3 A | SOC >90% Charging SWs off |

"Control Method A-4"

Figure 22:
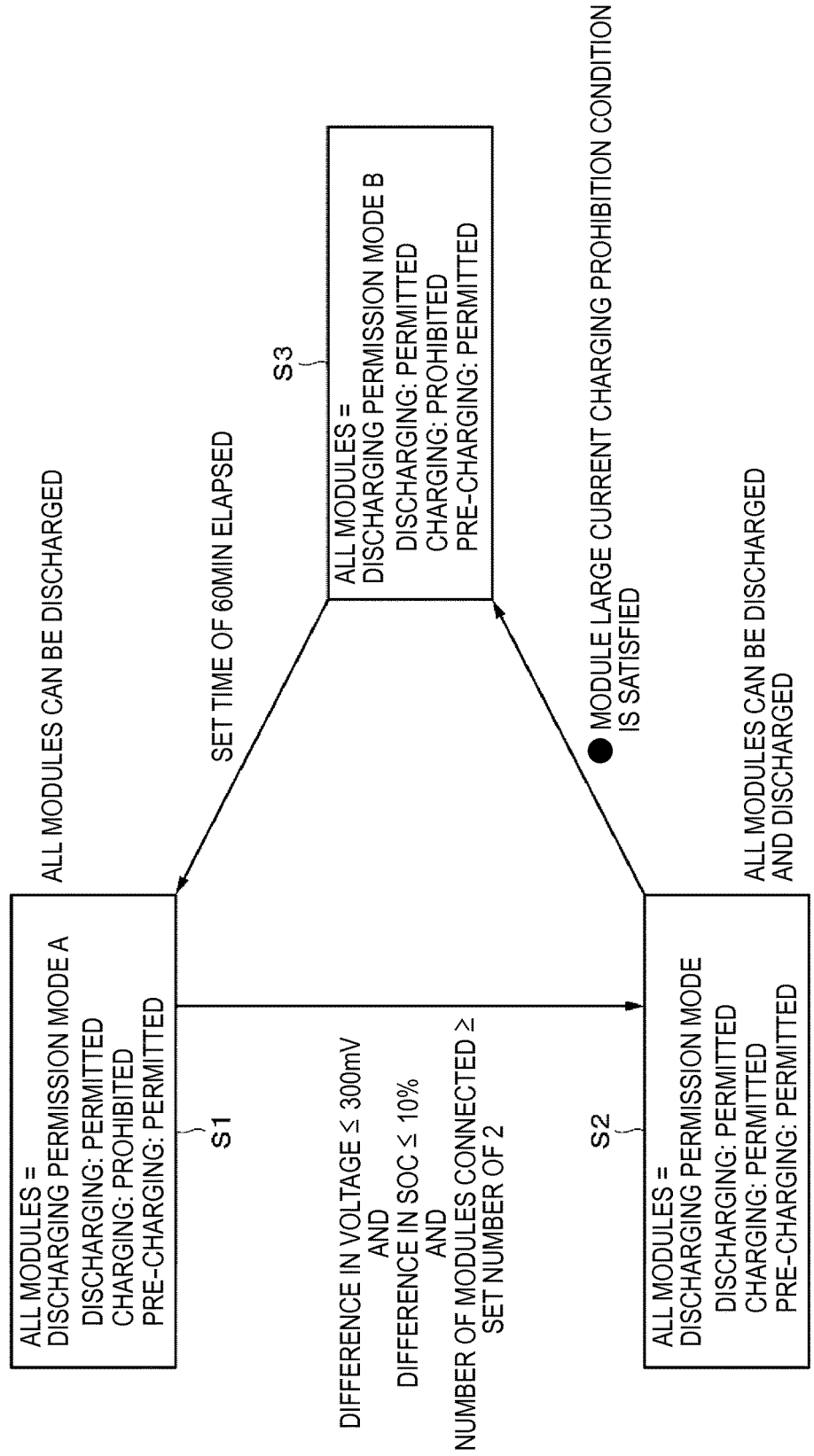
FIG. 22 is a flow chart for explaining a process flow of control method A-4 in the first embodiment of the present disclosure.

A flow of control by control method A-4 is illustrated in FIG. 22. The state for each of step S1, step S2 and step S3 is the same as that in control method A-1 described above.

TABLE 4

| | Charging and discharging control A-4 | | | | | | | | | | | |
|---|---|---|---|---|---|---|---|---|---|---|---|---|
| | System set current | | System measured current value | | module Voltage | | | | module SOC | | | |
| No. | Charging | Discharging | Charging | Discharging | 1 | 2 | 3 | 4 | 1 | 2 | 3 | 4 |
| 1 | 40 A | | 40 A | | 52.7 V | 52.6 V | 52.6 V | 52.6 V | 60% | 50% | 50% | 50% |
| 2 | 40 A | | 2 A | | 52.7 V | 52.6 V | 52.6 V | 52.6 V | 70% | 50% | 50% | 50% |

| | Pre-charging SW | Module charging SW | | | | Module discharging SW | | | | Module current | | | | |
|---|---|---|---|---|---|---|---|---|---|---|---|---|---|---|
| No. | All Ms | 1 | 2 | 3 | 4 | 1 | 2 | 3 | 4 | 1 | 2 | 3 | 4 | State |
| 1 | ● | ● | ● | ● | ● | ● | ● | ● | ● | 7 A | 11 A | 11 A | 11 A | Difference in SOC ≤10% All modules charging |
| 2 | ● | | | | | ● | ● | ● | ● | 0.5 A | 0.5 A | 0.5 A | 0.5 A | Difference in SOC >10% Charging SWs of all modules off |

A condition for transition from step S1 to step S2 (charging switches of all modules are switched on) is as below.

When a difference in voltage between the highest voltage module and the lowest voltage module is a predetermined judgment voltage value SVA (=300 mV) or less; a difference "Variation of Control Method A-3"

Figure 23:
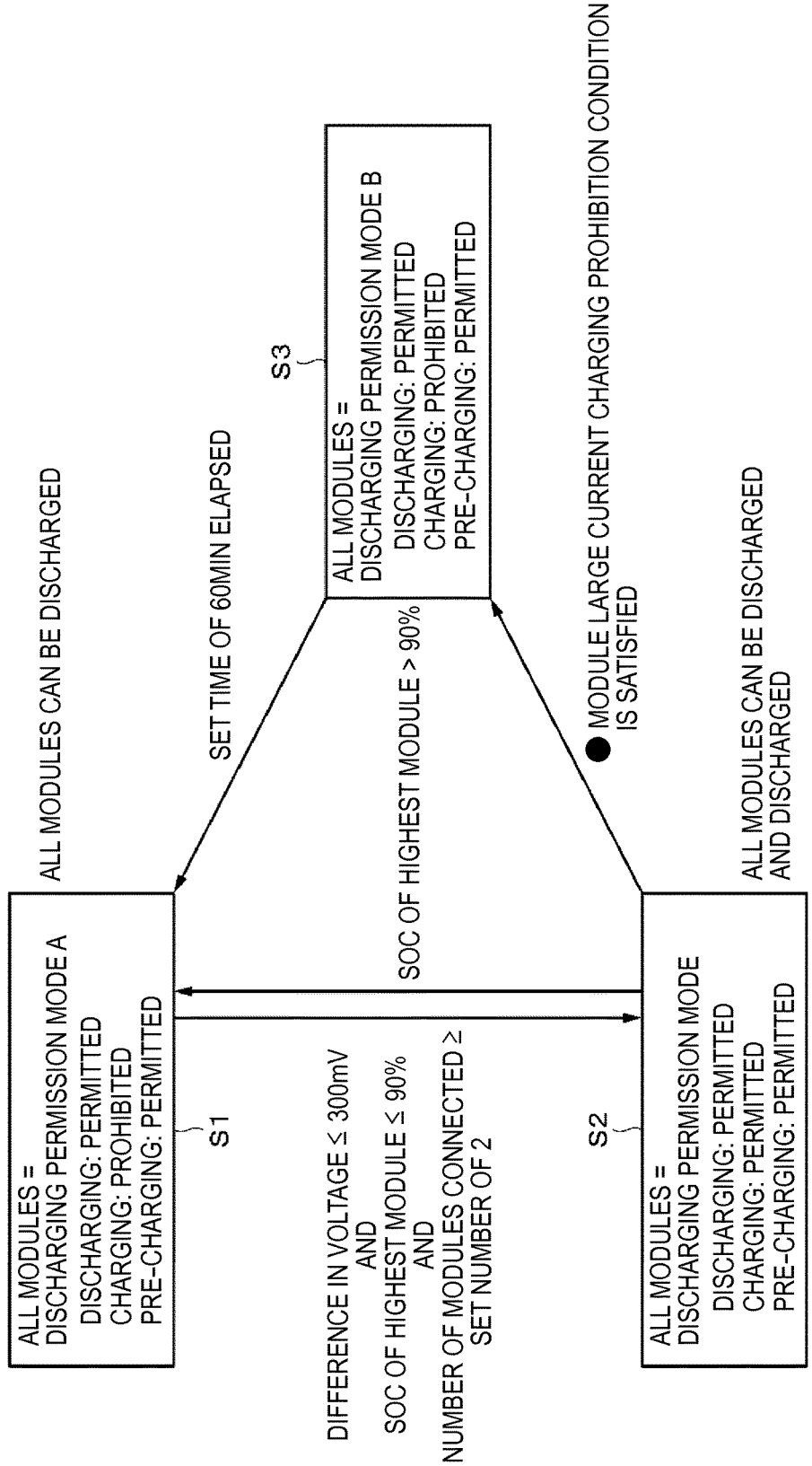
FIG. 23 is a flow chart for explaining a process flow of a variation of control method A-3 in the first embodiment of the present disclosure.

A flow of control by a variation of control method A-3 is illustrated in FIG. 23. In the variation, transition from step S2 to step S1 is permitted. The condition for the transition is when the largest voltage module comes to have an SOC of more than 90%.

"Second Control Method B"
"Control Method B-1"

Figure 24:
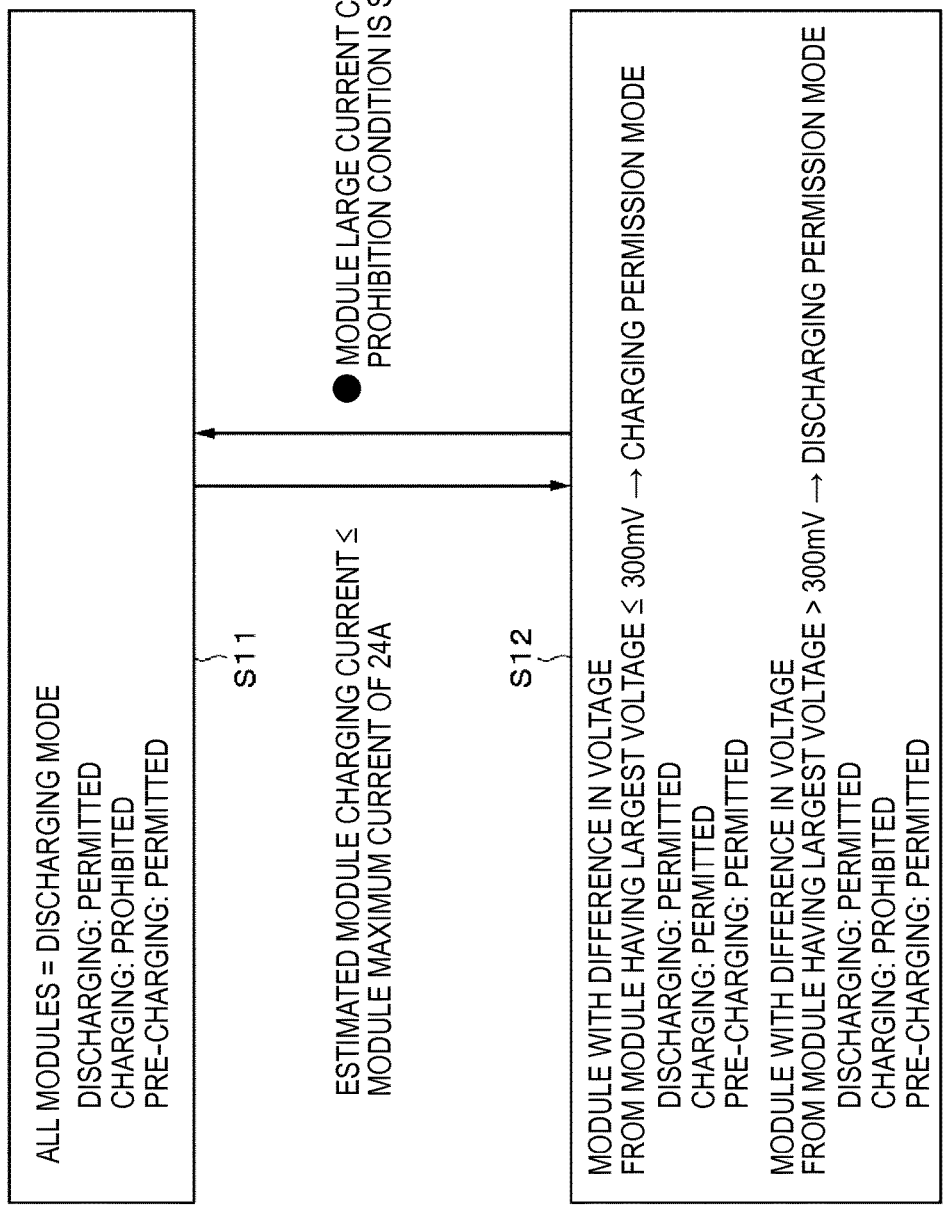
FIG. 24 is a flow chart for explaining a process flow of control method B-1 in the first embodiment of the present disclosure.

A flow of control by control method B-1 is illustrated in FIG. 24. In step S11, all modules are in a discharging mode. An estimated module charging current is obtained in the following manner.

Difference in voltage: module voltage of largest voltage-voltage of relevant module Select charging-permitted modules satisfying a condition of difference in voltage≤SVA (for example, 300 mV).

Obtain the number PMN of selected charging-permitted modules.

> Estimated module charging current ECV=system maximum charging current SCA/number PMN of charging-permitted modules The estimated module charging current ECV is compared to a maximum charging current value SMMAXCC per module (for example, 24 A). When ECV≤SMMAXC is satisfied, the processing proceeds to step S12 to permit charging of the charging-permitted modules. A module meeting "difference in voltage>SVA" is not permitted to be charged, and becomes in a discharging permission mode.

When the above-described condition for prohibiting large current charging of a module is satisfied, the charging switches of all modules are switched off. Although a process in this case is omitted in FIG. 24, the control returns to step S11 under the condition of continuation for 60 minutes.

Such control method B-1 has an advantage that when a module having a large difference in voltage is incorporated, a module having a close voltage can be charged with a large current.

Table 5 below illustrates the combinations of various values and the aspects of control of charging and discharging switches in control method B-1. In the table, black solid circles indicate that the switches are switched on.

"Control Method B-2"

Figure 25:
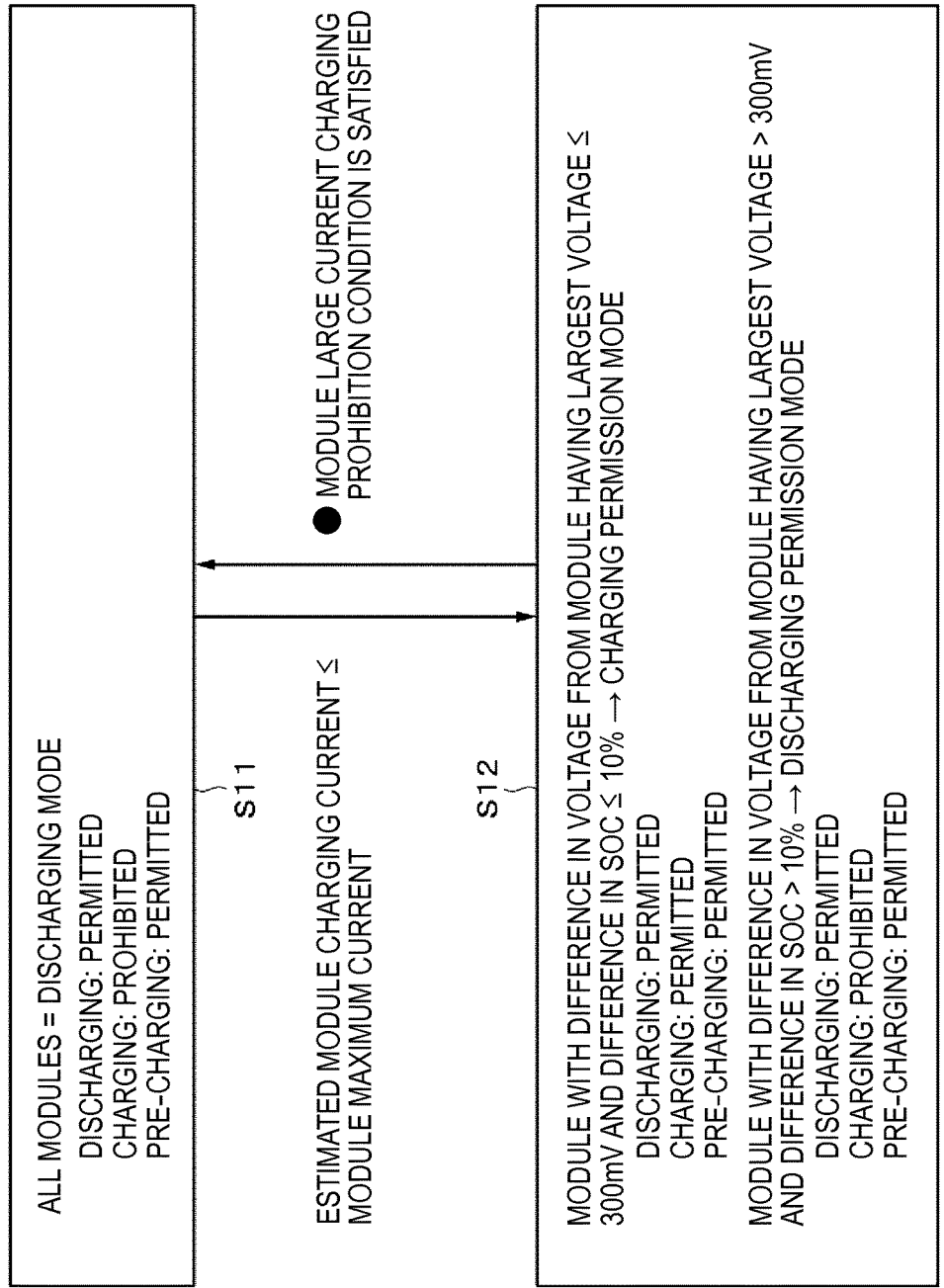
FIG. 25 is a flow chart for explaining a process flow of control method B-2 in the first embodiment of the present disclosure.

A flow of processing by control method B-2 is illustrated in FIG. 25. In step S11, all modules are in a discharging mode, and an estimated module charging current ECV is obtained in the following manner.

Difference in voltage: module voltage of largest voltage-voltage of relevant module Select charging-permitted modules satisfying a condition of difference in voltage≤SVA (for example, 300 mV), and difference in SOC≤set value SSA (for example, 10%).

Obtain the number PMN of selected charging-permitted modules.

> Estimated module charging current ECV=system maximum charging current SCA/number PMN of charging-permitted modules The estimated module charging current ECV is compared to a maximum charging current value SMMAXCC per module (for example, 24 A). When ECV≤SMMAXC is satisfied, the processing proceeds to step S12 to permit charging of the above-described charging-permitted modules. A module meeting "difference in voltage>SVA" or "difference in SOC>10% is not permitted to be charged, and becomes in a discharging permission mode.

When the above-described condition for prohibiting large current charging of a module is satisfied, the charging switches of all modules are switched off. Although a process in this case is omitted in FIG. 25, the control returns to step S11 under the condition of continuation for 60 minutes.

Such control method B-2 has an advantage that, similarly to control method B-1, when a module having a large

TABLE 5

Charging and discharging control B-1

| No. | System set current Charging | System set current Discharging | System measured current value Charging | System measured current value Discharging | module Voltage 1 | module Voltage 2 | module Voltage 3 | module Voltage 4 | module SOC 1 | module SOC 2 | module SOC 3 | module SOC 4 |
|---|---|---|---|---|---|---|---|---|---|---|---|---|
| 1 |  | 20 A |  | 20 A | 52.6 V | 52.6 V | 52.6 V | 52.6 V | 50% | 50% | 50% | 50% |
| 2 | 40 A |  | 40 A |  | 52.6 V | 52.6 V | 52.6 V | 52.6 V | 50% | 50% | 50% | 50% |
| 3 |  | 20 A |  | 20 A | 53.0 V | 53.0 V | 53.0 V | 53.0 V | 80% | 30% | 30% | 30% |
| 4 | 40 A |  | 40 A |  | 53.0 V | 53.0 V | 53.0 V | 53.0 V | 80% | 30% | 30% | 30% |
| 5 | 40 A |  | 40 A |  | 53.0 V | 53.0 V | 53.0 V | 53.0 V | 80% | 80% | 30% | 30% |
| 6 |  | 20 A |  | 20 A | 53.0 V | 53.0 V | 53.0 V | 53.0 V | 80% | 80% | 30% | 30% |
| 7 | 40 A |  | 40 A |  | 53.0 V | 53.0 V | 53.0 V | 53.0 V | 80% | 80% | 80% | 30% |
| 8 | 40 A |  | 40 A |  | 53.0 V | 53.0 V | 53.0 V | 53.0 V | 80% | 70% | 30% | 30% |
| 9 | 40 A |  | 0 A |  | 55.7 V | 55.7 V | 55.7 V | 55.7 V | 100% | 100% | 100% | 100% |
| 10 |  | 20 A |  | 20 A | 51.2 V | 40.0 V | 40.0 V | 40.0 V | 10% | 0% | 0% | 0% |

| No. | Pre-charging SW All Ms | Module charging SW 1 | Module charging SW 2 | Module charging SW 3 | Module charging SW 4 | Module discharging SW 1 | Module discharging SW 2 | Module discharging SW 3 | Module discharging SW 4 | Module current 1 | Module current 2 | Module current 3 | Module current 4 | State |
|---|---|---|---|---|---|---|---|---|---|---|---|---|---|---|
| 1 | ● |  |  |  |  | ● | ● | ● | ● | −5 A | −5 A | −5 A | −5 A | All modules discharging |
| 2 | ● | ● | ● | ● | ● |  |  |  |  | 10 A | 10 A | 10 A | 10 A | All modules charging |
| 3 | ● |  |  |  |  | ● | ● | ● | ● | −20 A | 0 A | 0 A | 0 A | Charging SWs of all |
| 4 | ● |  |  |  |  | ● | ● | ● | ● | 1 A | 1 A | 1 A | 1 A | modules off |
| 5 | ● | ● | ● |  |  | ● | ● | ● | ● | 19 A | 19 A | 1 A | 1 A | Two charging SWs on |
| 6 | ● | ● | ● |  |  | ● | ● | ● | ● | 7 A | 7 A | 3 A | 3 A |  |
| 7 | ● | ● | ● | ● |  | ● | ● | ● | ● | 13 A | 13 A | 13 A | 1 A | Three charging SWs on |
| 8 | ● | ● | ● |  |  | ● | ● | ● | ● | 17 A | 21 A | 1 A | 1 A | Two charging SWs on |
| 9 | ● | ● | ● | ● | ● | ● | ● | ● | ● | 0 A | 0 A | 0 A | 0 A | Four modules charging 0 A due to fully charged |
| 10 | ● |  |  |  |  | ● |  |  |  | −20 A | 0 A | 0 A | 0 A | Discharging of modules having SOC of 0 prohibited | difference in voltage or SOC is incorporated, a module having a close voltage or SOC can be charged with a large current.

Table 6 below illustrates the combinations of various values and the aspects of control of charging and discharging switches in control method B-2. In the table, black solid circles indicate that the switches are switched on.

value MHC and a measured lowest current value MLC is a predetermined defined value SCB (for example, 30 mA) or less.

Alternatively, all modules are in a discharging state, and a difference in measured current value between a measured highest current

TABLE 6

Charging and discharging control B-2

| | System set current | | System measured current value | | module Voltage | | | | module SOC | | | |
|---|---|---|---|---|---|---|---|---|---|---|---|---|
| No. | Charging | Discharging | Charging | Discharging | 1 | 2 | 3 | 4 | 1 | 2 | 3 | 4 |
| 1 | 40 A | | 2.1 A | | 52.7 V | 52.6 V | 52.0 V | 52.0 V | 70% | 50% | 30% | 30% |
| 2 | 40 A | | 40 A | | 52.7 V | 52.7 V | 52.0 V | 52.0 V | 60% | 50% | 30% | 30% |

| | Pre-charging SW | Module charging SW | | | | Module discharging SW | | | | Module current | | | | |
|---|---|---|---|---|---|---|---|---|---|---|---|---|---|---|
| No. | All Ms | 1 | 2 | 3 | 4 | 1 | 2 | 3 | 4 | 1 | 2 | 3 | 4 | State |
| 1 | ● | | | | | ● | ● | ● | ● | 0.5 A | 0.5 A | 0.6 A | 0.6 A | All modules charging off |
| 2 | ● | | ● | ● | | ● | ● | ● | ● | 19 A | 20 A | 0.6 A | 0.6 A | Two modules charging |

"Third Control Method C"

Figure 26:
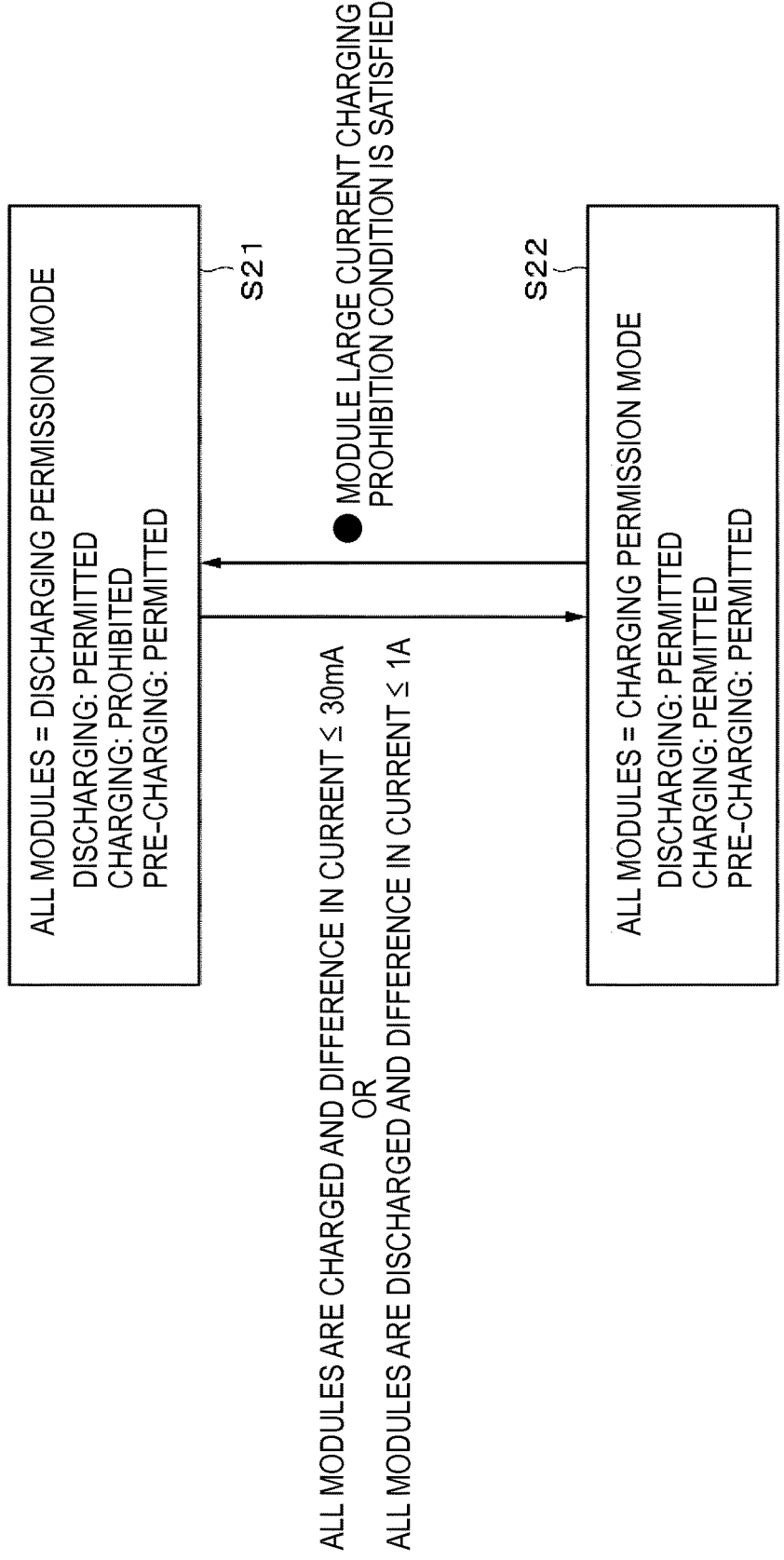
FIG. 26 is a flow chart for explaining a process flow of control method C in the first embodiment of the present disclosure.

A flow of processing by control method C is illustrated in FIG. 26. In step S21, discharging switches and pre-charging switches of all modules are always switched on. A resistor is connected in series to the pre-charging switch to permit a small charging current through the resistor to flow. The resistor has a resistance value of, for example, 10Ω.

A condition for transition from step S21 to step S22 (a state in which the charging switches are on) is as below.

All modules are in a charging state, and a difference in measured current value between a measured highest current value MHC and a measured lowest current value MLC is a predetermined defined value SCB (for example, 1 A) or less.

When the above-described condition for prohibiting large current charging of a module is satisfied, the charging switches of all modules are switched off. Although a process in this case is omitted in FIG. 26, the control returns to step S21 under the condition of continuation for 60 minutes.

Table 7 below illustrates the combinations of various values and the aspects of control of charging and discharging switches in control method C. In the table, black solid circles indicate that the switches are switched on.

TABLE 7

Charging and discharging control C

| | System set current | | System measured current value | | module Voltage | | | | module SOC | | | | Pre-charging SW |
|---|---|---|---|---|---|---|---|---|---|---|---|---|---|
| No. | Charging | Discharging | Charging | Discharging | 1 | 2 | 3 | 4 | 1 | 2 | 3 | 4 | All Ms |
| 1 | | 20 A | | 20 A | 52.6 V | 52.6 V | 52.6 V | 52.6 V | 50% | 50% | 50% | 50% | ● |
| 2 | 40 A | | 40 A | | 52.6 V | 52.6 V | 52.6 V | 52.6 V | 50% | 50% | 50% | 50% | ● |
| 3 | | 21 A | | 21 A | 52.7 V | 52.6 V | 52.6 V | 52.6 V | 70% | 50% | 50% | 50% | ● |
| 4 | | 18 A | | 18 A | 53.0 V | 52.6 V | 52.6 V | 52.6 V | 80% | 50% | 50% | 50% | ● |
| 5 | 40 A | | 2.0 A | | 52.7 V | 52.6 V | 52.6 V | 52.6 V | 70% | 50% | 50% | 50% | ● |
| 6 | 40 A | | 40 A | | 52.7 V | 52.6 V | 52.6 V | 52.6 V | 70% | 50% | 50% | 50% | ● |
| 7 | 40 A | | 1.9 A | | 53.3 V | 52.6 V | 52.6 V | 52.6 V | 90% | 50% | 50% | 50% | ● |
| 8 | 40 A | | 1.9 A | | 53.3 V | 52.6 V | 52.6 V | 52.6 V | 90% | 50% | 50% | 50% | ● |

| | Module charging SW | | | | Module discharging SW | | | | Module current | | | | |
|---|---|---|---|---|---|---|---|---|---|---|---|---|---|
| No. | 1 | 2 | 3 | 4 | 1 | 2 | 3 | 4 | 1 | 2 | 3 | 4 | State |
| 1 | ● | ● | ● | ● | ● | ● | ● | ● | −5 A | −5 A | −5 A | −5 A | All modules discharging |
| 2 | ● | ● | ● | ● | ● | ● | ● | ● | 10 A | 10 A | 10 A | 10 A | All modules charging |
| 3 | | ● | ● | ● | ● | ● | ● | ● | −6.0 A | −5.0 A | −5.0 A | −5.0 A | Charging SWs of all modules on |
| 4 | | | | | ● | ● | ● | ● | −6.0 A | −4.0 A | −4.0 A | −4.0 A | Charging SWs of all modules off |
| 5 | | | | | ● | ● | ● | ● | 0.490 A | 0.500 A | 0.500 A | 0.500 A | Temporarily ΔI = 10 mA |
| 6 | ● | ● | ● | ● | ● | ● | ● | ● | 10 A | 10 A | 10 A | 10 A | Charging SWs of all modules on |
| 7 | | | | | ● | ● | ● | ● | 0.430 A | 0.500 A | 0.500 A | 0.500 A | Temporarily ΔI = 70 mA |
| 8 | | | | | ● | ● | ● | ● | 0.430 A | 0.500 A | 0.500 A | 0.500 A | Charging SWs of all modules off |

Furthermore, Table 8 below illustrates the combinations of inappropriate (NG) examples caused by absence of the control according to the present disclosure. In the table, black solid circles indicate that the switches are switched on.

TABLE 8

Charging and discharging control NG examples

| | System set current | | System measured current value | | module Voltage | | | | module SOC | | | | Pre-charging SW |
|---|---|---|---|---|---|---|---|---|---|---|---|---|---|
| No. | Charging | Discharging | Charging | Discharging | 1 | 2 | 3 | 4 | 1 | 2 | 3 | 4 | All Ms |
| 1 | | 0 A | | 0 A | 51.0 V | 51.0 V | 51.0 V | 53.0 V | 10% | 10% | 10% | 80% | ● |
| 2 | 40 A | | 40 A | | 51.0 V | 51.0 V | 51.0 V | 53.0 V | 10% | 10% | 10% | 80% | ● |
| 3 | 40 A | | 40 A | | 51.0 V | 51.0 V | 51.0 V | 53.0 V | 10% | 10% | 10% | 80% | ● |
| 4 | | 0 A | | 0 A | 53.0 V | 53.0 V | 53.0 V | 51.0 V | 80% | 80% | 80% | 10% | ● |

| | Module charging SW | | | | Module discharging SW | | | | Module current | | | | |
|---|---|---|---|---|---|---|---|---|---|---|---|---|---|
| No. | 1 | 2 | 3 | 4 | 1 | 2 | 3 | 4 | 1 | 2 | 3 | 4 | State |
| 1 | ● | ● | ● | | ● | ● | ● | ● | 20 A | 20 A | 20 A | −60 A | Charging SWs of three modules with small SOC on System current 8 Excessive current discharging |
| 2 | ● | ● | ● | | ● | ● | ● | ● | 26 A | 26 A | 26 A | −38 A | Charging SWs of three modules with small SOC on Charging proceeded Excessive current charging Excessive current discharging |
| 3 | ● | ● | ● | ● | ● | ● | ● | ● | 26 A | 26 A | 26 A | −38 A | Charging SWs of all modules on Charging proceeded Excessive current charging Excessive current discharging |
| 4 | ● | ● | ● | ● | ● | ● | ● | ● | −10 A | −10 A | −10 A | 30 A | Charging SWs of all modules on System current: 0 Excessive current discharging |

"Mounting Method of Controller"

As described with reference to FIG. 2, the module MO includes the power storage unit 2 (the battery unit BAT) and the controller 3 (the module controller MOCNT). The power storage unit 2 is configured to house many battery cells in a metal sheath case. A positive terminal and negative terminal for connection are derived from the sheath case. The controller 3 is provided with the charging switch and discharging switch both switching on and off a relatively large current, and generates a relatively large amount of heat. Therefore, a countermeasure to the heat generated by the controller 3 is desirably deployed.

Figure 27:
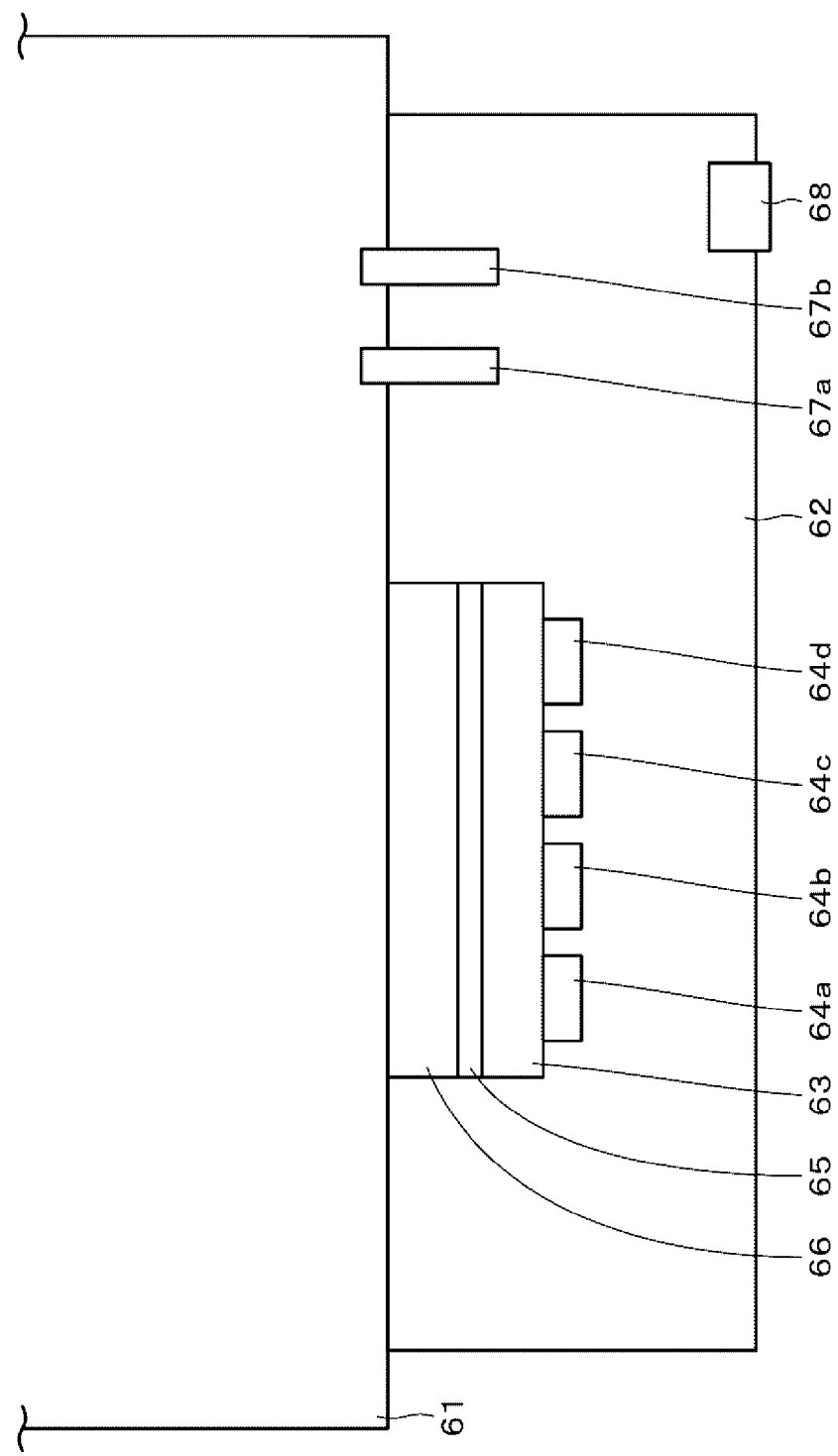
FIG. 27 is a schematic line diagram for explaining an example of a mounting method of a switch box including a controller according to the first embodiment of the present disclosure.

FIG. 27 illustrates a configuration in which a switch box 62 housing the controller 3 is attached to a back surface of a sheath case 61 of the power storage unit 2 to release heat generated in the switch box 62 through the sheath case 61. A case of the switch box 62 is made of resin.

In the switch box 62, FETs 64a, 64b, 64c and 64d constituting the charging and discharging switches are disposed. The heat generated by these FETs 64a to 64d is released through a heat sink 63. Furthermore, a heat transfer sheet 65 as an insulating material and a heat sink 66 are laminated to the heat sink 63 so that the heat generated in FETs 64a to 64d is transferred to the sheath case 61. The sheath case 61 includes metal having good thermal and electric conductivity, and can effectively release the transferred heat generated in FETs 64a to 64d. It is noted that reference numerals 67a and 67b indicate short bars, and reference numeral 68 indicates a switch.

Figure 28:
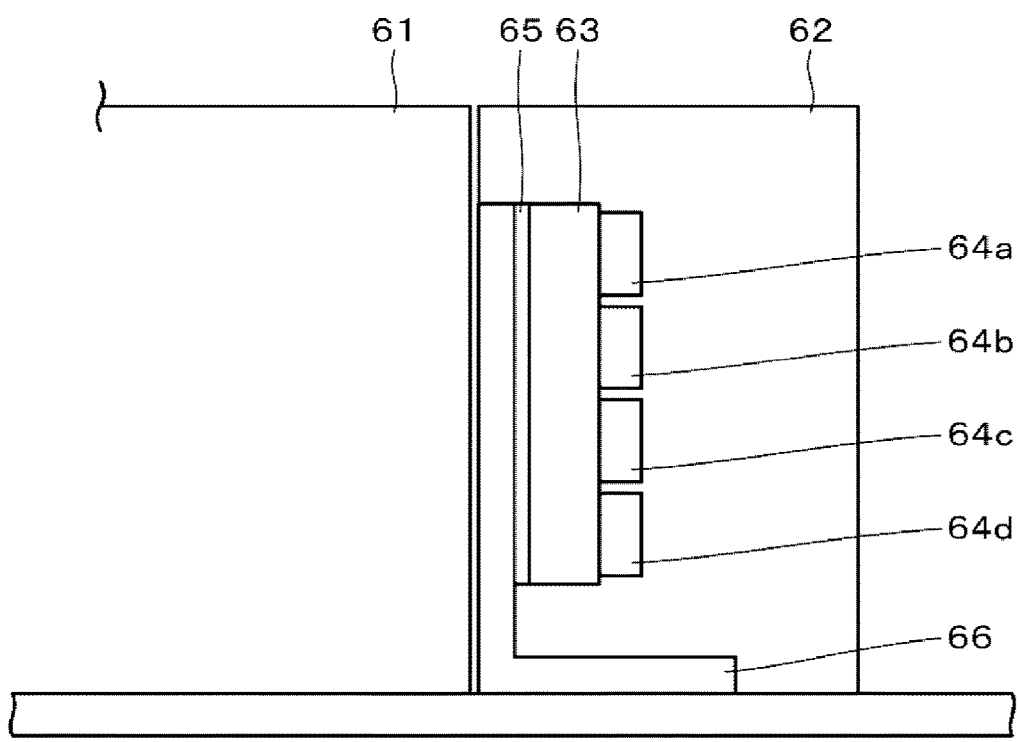
FIG. 28 is a schematic line diagram for explaining an example of the mounting method of a switch box including a controller according to the first embodiment of the present disclosure.

It is noted that as illustrated in FIG. 28, the heat sink 66 may be in intimate contact with a back surface and a bottom surface of the sheath case 61 of the power storage unit 2.

Figure 29:
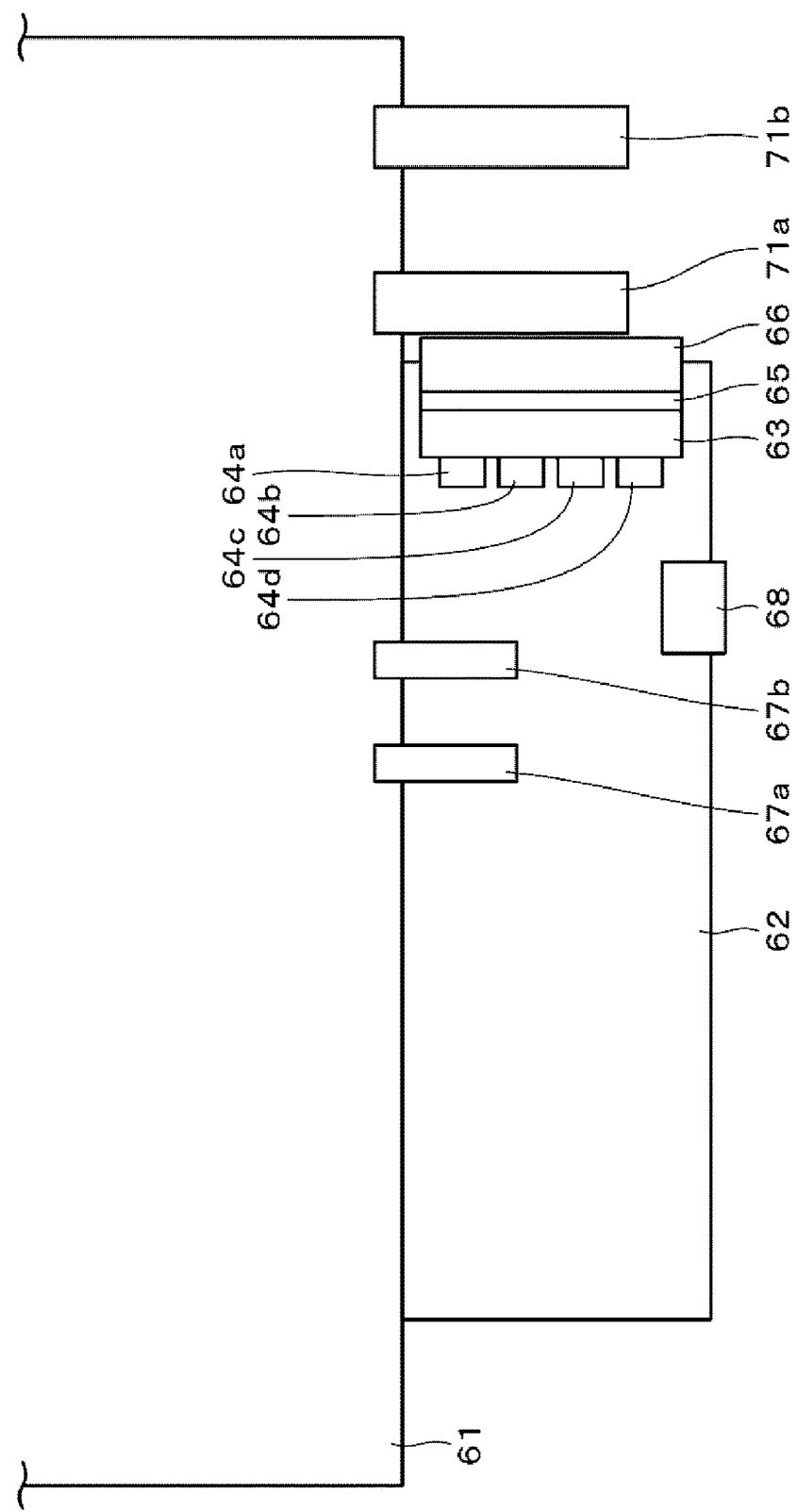
FIG. 29 is a schematic line diagram for explaining another example of the mounting method of a switch box including a controller according to the first embodiment of the present disclosure.

As illustrated in FIG. 29, bus bars 71a and 71b constituted by conductive materials, for example, copper plates, are disposed for connecting a plurality of power storage modules in parallel. For example, the external terminals B− on the negative sides of the plurality of power storage modules are commonly connected through the bus bar 71a, and the external terminals B+ on the positive sides of the plurality of power storage modules are commonly connected through the bus bar 71b. The heat sink 66 is brought into intimate contact with one of the bus bars, for example, with the bus bar 71a.

The insulating heat transfer sheet 65 and the heat sink 63 are laminated to the heat sink 66. The heat generated in FETs 64a to FET 64d is transferred to the bus bar 71a through the heat sink 63, the heat transfer sheet 65 and the heat sink 66. The bus bars 71a and 71b are relatively long plates for connecting the plurality of modules that are vertically stacked. Therefore, the bus bar 71a can release the heat generated in FETs 64a to FET 64d.

2. Second Embodiment

"Outline of Power Storage Device"

Figure 30:
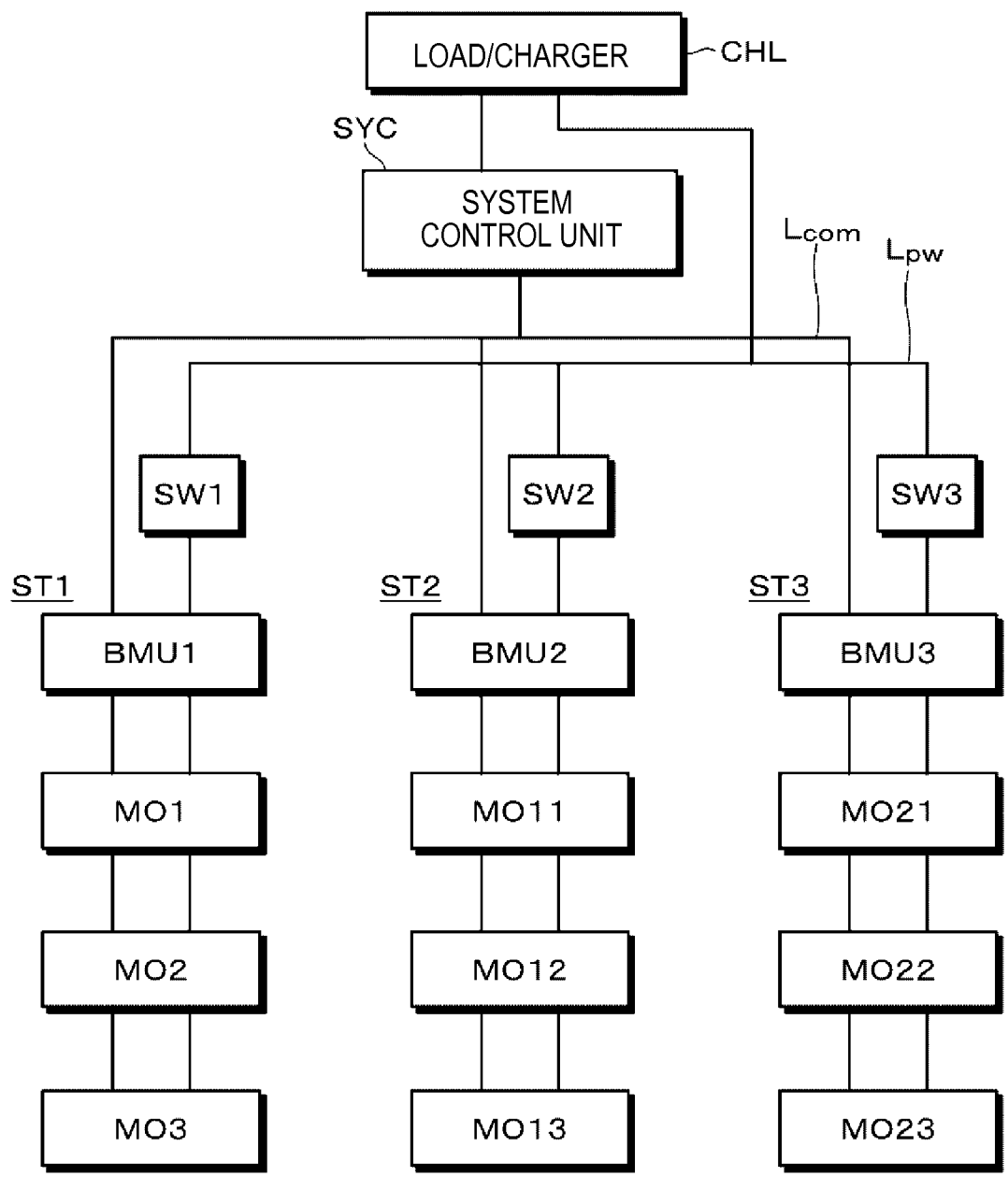
FIG. 30 is a block diagram illustrating a system configuration according to a second embodiment of the present disclosure.

In a second embodiment, a plurality of power storage devices is used to constitute a power storage system. Each power storage device contains a plurality of modules and a controller. FIG. 30 illustrates an example of a power storage system including three power storage devices. In each of the power storage devices, N modules, for example, three modules MOD1 to MOD3 are connected in series. The number of connected modules and the connection form (in series or in parallel) may be appropriately changed.

A common controller Battery Management Unit (BMU: battery management system) 1 is disposed to three modules MOD1 to MOD3. A power storage device constituted by three modules MOD1 to MOD3 and a controller BMU1 is referred to as a string ST1. A string ST2 is constituted by a controller BMU2 and three modules MOD11 to MOD13, and string ST3 is constituted by a controller BMU3 and three modules MOD21 to MOD23. These three strings ST1 to ST3 are connected in parallel to constitute the power storage system. It is noted that controllers BMU1 to BMU3 correspond to the controller CNT in the first embodiment.

A power line Lpw connecting output power terminals of strings ST1 to ST3 in parallel is disposed, and power is extracted outside through the power line Lpw and switches SW1 to SW3. The switches SW1 to SW3 have a similar configuration to, for example, the series circuit of the charging switch SWc and the discharging switch SWd in FIG. 2. During a hot swap, charging and discharging are controlled by switches SW1 to SW3. A load or a charger CHL is externally connected. Based on an assumption that one module MOD has an output voltage of, for example, 51.2 V, N=1 to N=16 produce an output voltage of (approximately 50 V to approximately 800 V).

Output controllers ICNTs of the strings ST1 to ST3 are connected with each other through a communication line Lcom. As the communication line Lcom, a CAN, an I2C, an RS485, or the like is used. The communication line Lcom is connected to a system control unit SYC. The system control unit SYC communicates with the controllers BMU1 to BMU3 of the strings ST1 to ST3 to control the strings ST1 to ST3. Furthermore, the system control unit SYC is connected to an unillustrated external controller.

The controllers BMU1 to BMU3 disposed to the strings ST1 to ST3 respectively each have the following function.
Monitors the states of modules to protect batteries.
Includes a separate circuit breaker for each of charging and discharging.
Has a main power source switch that switches on or off the power source of a body.

The system control unit SYC is a higher-level system of the controllers BMUs. The system control unit monitors the states of the strings STs to control the controllers BMUs.

The load/charger CHL charges and discharges batteries for each module. The load/charger CHL is not limiting, and a power conditioner, UPS, inverter, or the like may be connected.

Once the above-described power storage system is started up, it is required to continue to be activated as long as possible. For this reason, a large-scale power storage system includes a plurality of strings connected in parallel to have redundancy. Even when a certain string fails, another normal string connected in parallel needs to continue to supply power. When replacing the failed string, a hot swap of strings (an operation of replacing a failed string without stopping the whole system) becomes necessary.

When a new string is added in place of the failed string, a problem is caused on the balance in voltage between the existing string group and the added string. A current flows from a high voltage string to a low voltage string. Accordingly, when a string is added without control, any large difference in voltage urges an excessive current to flow through the added string, resulting in a hazardous state.

Figure 31:
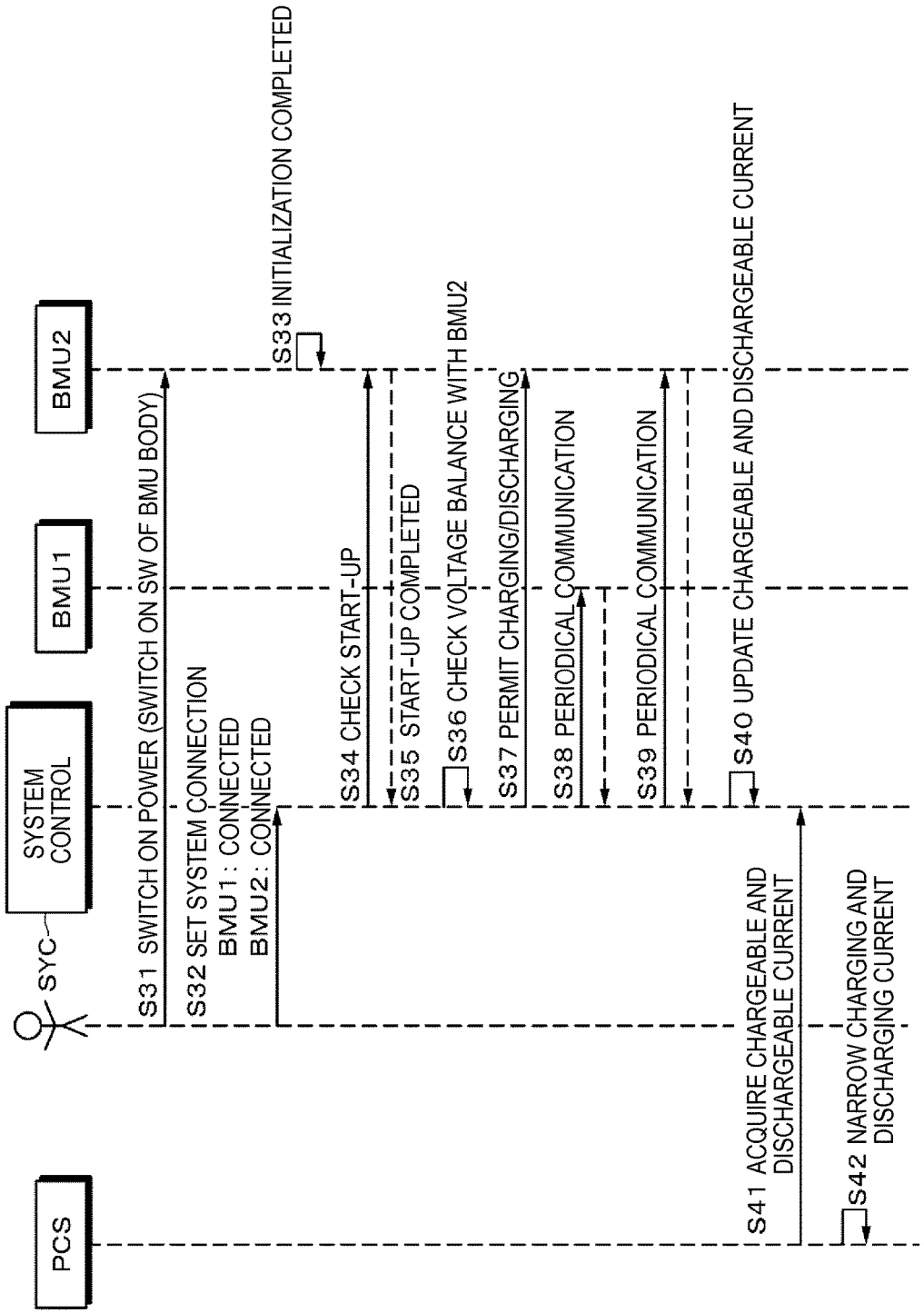
FIG. 31 is a sequence diagram illustrating a process when a string is added in the second embodiment of the present disclosure.

With reference to FIG. 31, processing for adding one string to a power storage system operating with one string will be described. That is, a power storage system includes an external computer PCS, a system control unit SYS, a controller BMU1, and a plurality of modules (omitted in the diagram). It is assumed that a string including a controller BMU2 and a plurality of modules is added to this power storage system.

This system includes only one string. Therefore, when the upper limit of the current value per string is 50 A, the upper limit of the current value in the whole system comes to be 50 A in an initial state.

Step S31: An operator switches on the power source of the controller BMU2 in a state where the controller BMU2 is connected. Then, the controller BMU2 is started up and proceeds to an initiation process.

Step S32: An operator changes a connection configuration setting to the system control unit SYS. In this case, the controllers BMU1 and BMU2 are set to be connected.

Step S33: The initiation of the controller BMU2 is completed. The controller BMU2 waits in a state where circuit breakers for charging and discharging are switched off, until a permission of charging and discharging is instructed from the system control unit SYS.

Step S34: The system control unit SYS performs initial communication with the newly added controller BMU2 to check whether the initiation has been completed.

Step S35: The system control unit SYS confirms that the start-up has been completed.

Step S36: The system control unit SYS communicates with the already operating controllers BMU1 and BMU2 to confirm the voltages of the strings, and determines whether to permit charging and discharging to the controller BMU2.

Step S37: When the balance in voltage between the controllers BMU1 and BMU2 is small, and it is determined that charging and discharging of the controller BMU2 is permitted, the system control unit SYS communicates with the controller BMU2 to instruct that charging and discharging be permitted.

Steps S38 and S39: The system control unit SYS communicates with the controllers BMU1 and BMU2 to acquire the states thereof, and confirms that the strings have normally operated.

Step S40: The system control unit SYS recognizes from the communication result of steps S38 and S39 that the string has been added. Since the addition of the string increases the upper limit of the chargeable and dischargeable current in the system, the chargeable and dischargeable current is internally recalculated.

For example, when charging with 50 A is allowed per string, 50 A×2=100 A is calculated as a chargeable and dischargeable current.

Step S41: The external controller PCS communicates with the system control unit SYS to acquire the chargeable and dischargeable current value.

Step S42: The external controller PCS changes the value of a current to flow through strings based on the current value acquired in step S41. As a result of adding the string, the value of the current for two strings becomes the upper limit.

As described above in step S37, when the difference in voltage between the controllers BMU1 (string ST1) and BMU2 (string ST2) is small, it is determined that charging and discharging of the controller BMU2 may be permitted. That is, when the difference in potential between an already operating string group and a newly added string falls within a certain value, charging and discharging of the added string is permitted, so that the string can be added without stopping a system. When this is not performed, an excessive current flows from a high voltage string to a low voltage string. Accordingly, an overcurrent is caused, thereby leading a battery into a hazardous state.

A determination method of charging permission of an added string by the system control unit SYS will be indicated below.

The system control unit SYS monitors a usually operating string, and constantly calculates a system voltage value.

When adding a string, the system control unit SYS calculates a difference in voltage between a system voltage and a voltage value of the added string, and permits charging and discharging when a difference in potential falls within a certain value.

The system voltage is calculated as below.

(1) The system control unit SYS acquires information on presently operating controllers BMUs, and calculates an average value for the voltages of usually operating strings.

(2) The voltage of the string having a voltage closest to the voltage calculated in (1), among the usually operating strings, is set to be a system voltage. However, there is another method in which the average value calculated in (1) is directly defined to be a system voltage value.

(3) A string having a voltage that falls within "±(number of modules in series)×(threshold) V" from the system voltage is determined to have a small difference in potential between the strings, and the system control unit SYS permits charging and discharging to its controller BMU.

As an example, when a string includes 16 modules connected in series, and threshold=0.5 V, (16×0.5=8 V) is obtained. Accordingly, when the difference in voltage falls within the range of ±8 V, the difference in voltage is determined to be small, thereby permitting charging and discharging to an added string. When the usually operating strings are charged and discharged leading to a reduced difference in potential from the added string, charging and discharging of the added string is permitted.

According to the second embodiment, a string can be added without stopping the system. The power storage system constituted by a plurality of strings can be safely started up. Especially even when the number of modules in series increases leading to high voltage, a string can be safely added.

"Example of Secondary Battery"

In the second embodiment according to the present disclosure, an example of the secondary battery used is a lithium ion secondary battery including a positive electrode active material and a carbon material including graphite as a negative electrode active material, which contains the positive electrode active material having an olivine structure as a positive electrode material.

A preferred positive electrode active material having an olivine structure is a lithium iron phosphate compound ($LiFePO_4$) or a lithium iron composite phosphate compound containing an exotic atom ($LiFe_xM_{1-x}O_4$: M is one or more metals, and x is 0<x<1). As described herein, a "main body" means 50% or more of a total mass of a positive electrode active material in a positive active material layer. When M is two or more, the Ms are selected so that a sum of numerical subscripts of the Ms becomes 1-x.

Examples of the M may include transition elements, group IIA elements, group IIIA elements, group IIIB elements, and group IVB elements. In particular, at least one of cobalt (Co), nickel, manganese (Mn), iron, aluminum, vanadium (V), and titanium (Ti) is preferably contained.

The positive electrode active material may include, on the surface of the lithium iron phosphate compound or lithium iron composite phosphate compound, a coating layer containing, for example, a metal oxide (for example, selected from Ni, Mn, Li, and the like) or phosphate compound (for example, lithium phosphate) each having a different composition from that of the lithium iron phosphate compound or lithium iron composite phosphate compound.

Examples of the positive electrode material capable of occluding and liberating lithium (Li) to be used may include lithium composite oxides such as lithium cobalt ($LiCoO_2$), lithium nickelate ($LiNiO_2$) and lithium manganate ($LiMnO_2$) each having a layered rock-salt structure, and lithium manganate ($LiMn_{2O4}$) having a spinel structure.

The graphite in the present disclosure is not particularly limited, and graphite materials used in the industry may be widely used. Examples of the negative electrode material to be used may include lithium titanate, silicon (Si)-based materials, and tin (Sn)-based materials.

The manufacturing method of the electrode of the battery according to the present disclosure is not particularly limited, and a method used in the industry may be widely used.

The battery configuration in the present disclosure is not particularly limited, and a known configuration may be widely used.

The electrolytic solution used in the present disclosure is not particularly limited, and an electrolytic solution, which may be liquid or gel, used in the industry may be widely used.

Figure 32:
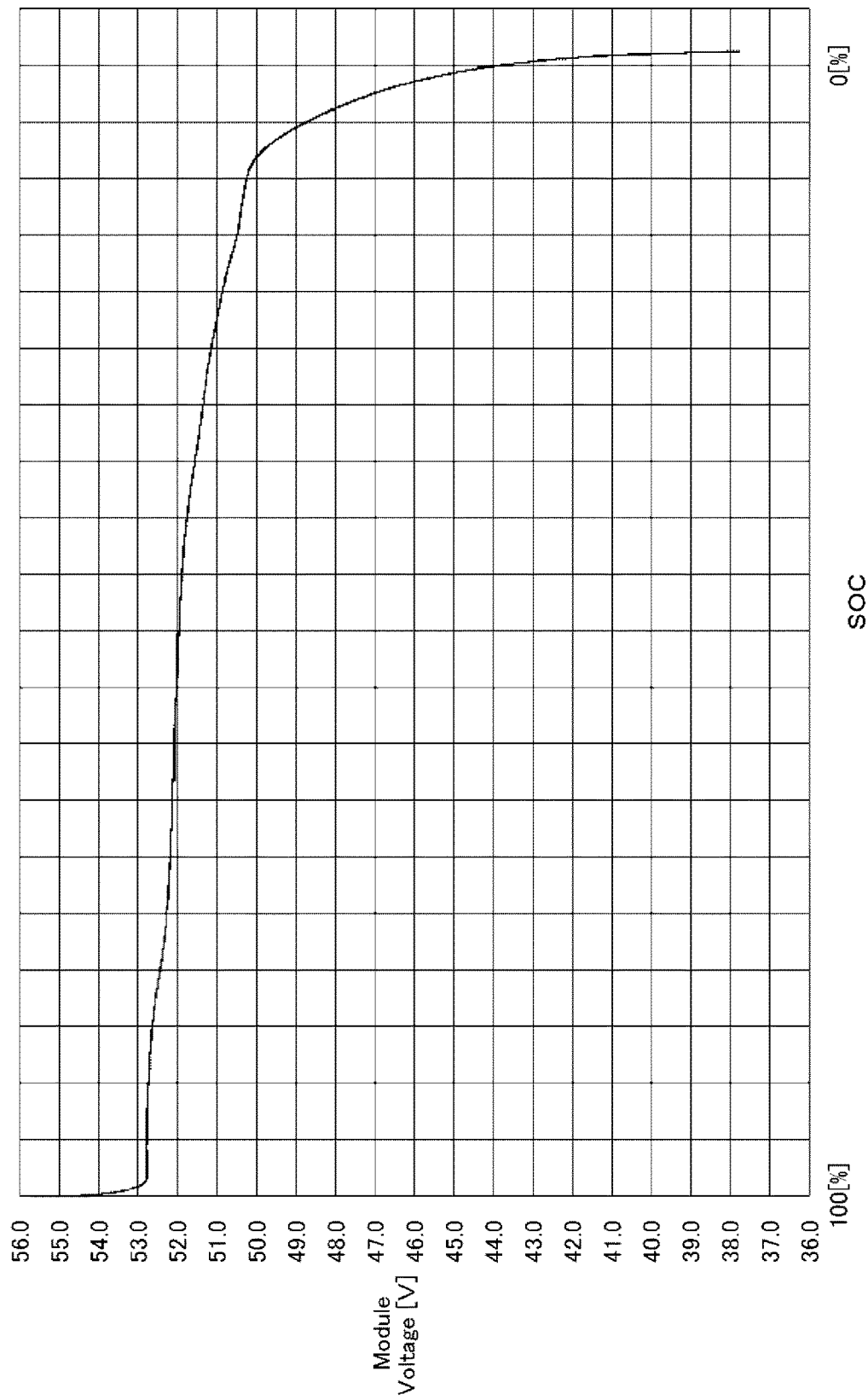
FIG. 32 is a graph illustrating discharging properties of a module suitably used in the second embodiment of the present disclosure.
Figure 33:
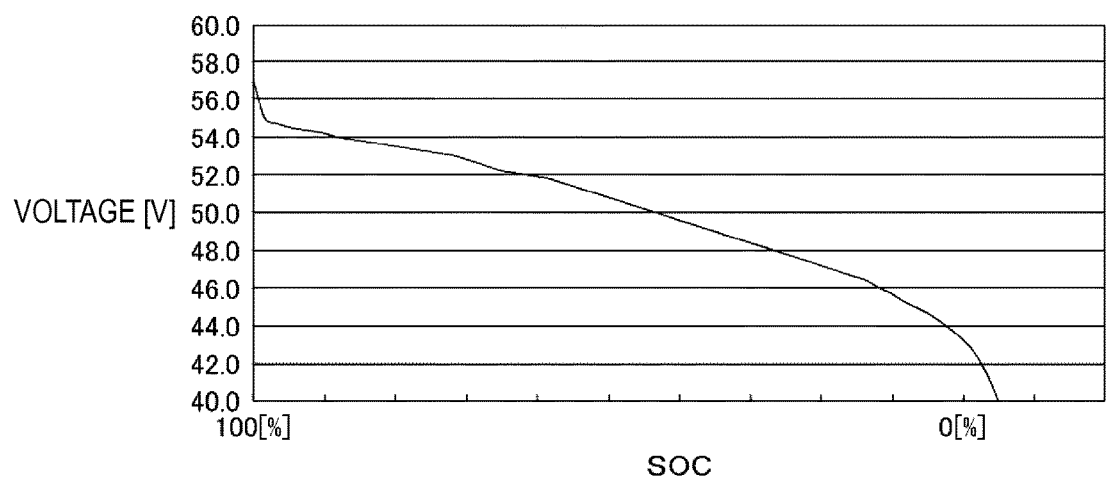
FIG. 33 is a graph illustrating discharging properties of a comparative example of the module.

FIG. 32 illustrates an example of charging and discharging characteristics of a module including a secondary battery that contains, as a positive electrode material, a positive electrode active material having an olivine structure. FIG. 33 illustrates, as a comparative example, an example of charging and discharging characteristics of a module including a secondary battery that contains, as a positive electrode material, nickel cobalt manganese (NCM). In the module including a secondary battery that contains, as a positive electrode material, a positive electrode active material having an olivine structure, the decrease in voltage is small even when discharging proceeds. It is desired that the SOC be in a range of 20% to 80%, and the difference in voltage be within 0.2 V/cell. On the other hand, for the module including a secondary battery that contains NCM, the decrease rate of voltage is large as discharging proceeds.

As described above, when a string is added in the power storage system, the difference in voltage between the average value for the voltages of operating strings and the voltage of a string to be added needs to fall within a threshold. Therefore, in the module illustrated in FIG. 33 in which the voltage significantly changes depending on the discharging state, the difference in voltage is infrequently determined to be less than the threshold depending on the SOC, possibly inhibiting a hot swap from being smoothly performed. In the module including a secondary battery that contains a positive electrode active material having an olivine structure illustrated in FIG. 32, the change in voltage is small depending on the discharging state, allowing a string to be smoothly added. For example, a string can be replaced for a shorter time.

In other words, although threshold=0.5 V is defined in the above-described example, a smaller threshold, for example, 0.1 V, can be defined so that the difference in voltage when adding a string is reduced. This can further reduce the risk of an excessive current flowing through the added string.

3. Application Example

"Power Storage Device in House as Application Example"

Figure 34:
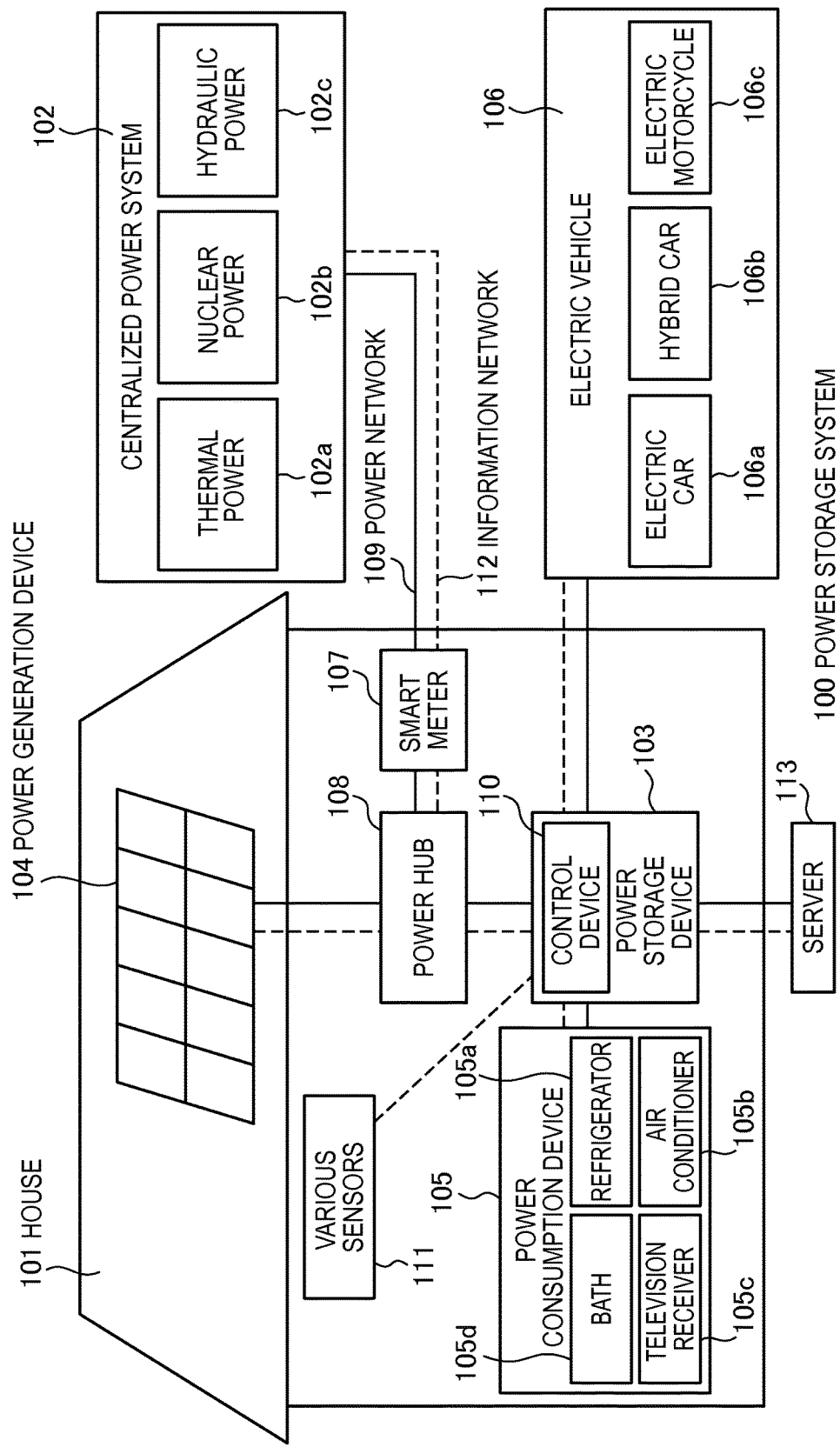
FIG. 34 is a block diagram of a first example of an application example of the power storage device according to the present disclosure.

An example in which the present disclosure is applied to a power storage device for houses will be described with reference to FIG. 34. For example, in a power storage device 100 for a house 101, power is supplied to an electric storage device 103 from a centralized power system 102 such as thermal power 102a, nuclear power 102b, and hydraulic power 102c through a power network 109, an information network 112, a smart meter 107, a power hub 108, etc. Together with this, power is supplied to the electric storage device 103 from an independent power source such as a domestic power generation device 104. The power supplied to the electric storage device 103 is stored. The power used in the house 101 is supplied using the electric storage device 103. The same power storage device can be used not only in the house 101 but also in buildings.

The power storage device 103 includes a plurality of modules connected in parallel as described above. Therefore, according to the present disclosure, the power storage device 103 can be replaced through a hot swap, without causing deterioration or failure of the power storage device due to an excessive current.

The house 101 is provided with the domestic power generation device 104, a power consumption device 105, the electric storage device 103, a control device 110 controlling each device, the smart meter 107, and sensors 111 acquiring various kinds of information. The devices are connected through the power network 109 and the information network 112. A solar cell, a fuel cell, etc. are used as the domestic power generation device 104, and generated power is supplied to the power consumption device 105 and/or the electric storage device 103. The power consumption device 105 is a refrigerator 105a, an air conditioner 105b, a television receiver 105c, a bath 105d, etc. Moreover, the power consumption device 105 includes an electric vehicle 106. The electric vehicle 106 is an electric car 106a, a hybrid car 106b, and an electric motorcycle 106c.

The electric storage device 103 is constituted by secondary batteries or a capacitor. For example, the electric storage device 103 is constituted by lithium ion secondary batteries. The electric storage unit 2 of the present disclosure described above is applied to the electric storage device 103. The lithium ion secondary battery may be a stationary type or may be one used in the electric vehicle 106. The smart meter 107 has a function of measuring a use amount of commercial power and transmitting the measured use amount to an electric power company. The power network 109 may be of one of direct current power supply, alternating current power supply, and noncontact power supply or of the combination of a plurality of them.

The various sensors 111 are a human sensor, an illumination sensor, an object detection sensor, a power consumption sensor, a vibration sensor, a contact sensor, a temperature sensor, an infrared sensor, etc., for example. The information acquired by the various sensors 111 is transmitted to the control device 110. Weather conditions, human conditions, etc. are grasped based on the information from the sensors 111, and it is possible to automatically control the electric consumption device 105 so that energy consumption is minimum. Moreover, the control device 110 can transmit information about the house 101 to an external electric power company, etc. through an internet.

The power hub 108 performs processing of branch of a power line, direct current-alternating current conversion, etc. As a communication system of the information network 112 connected to the control device 110, there are a method of using a communication interface such as a universal asynchronous receiver-transmitter (UART (transmission and reception circuit for asynchronous serial communication)) and a method of using a sensor network by a wireless communication standard such as Bluetooth (registered trademark), ZigBee (registered trademark), and Wi-Fi (registered trademark). The Bluetooth system is applied to multimedia communication, and the communication of one-to-many connection is possible. The ZigBee uses a physical layer of institute of electrical and electronics engineers (IEEE) 802.15.4. The IEEE802.15.4 is a name of a short distance wireless network standard referred to as personal area network (PAN) or Wireless (W) PAN.

The control device 110 is connected to an external server 113. The server 113 may be managed by any of the house 101, an electric power company, and a service provider. The information transmitted and received by the server 113 is power consumption information, life pattern information, power rates, weather information, natural disaster information, and information about power transaction, for example. Such information may be transmitted and received by a domestic electric consumption device (a television receiver, for example), and may be transmitted and received by a device outside home (a cellular phone, etc., for example). Such information may be displayed on a device having a display function, e.g. a television receiver, a cellular phone, personal digital assistants (PDA), etc.

The control device 110 controlling each unit is constituted by a CPU, a RAM, a ROM, etc., and stored in the electric storage device 103 in this example. As the function of the control device 110, for example, there can be applied the function of each unit, such as the sub-micro control unit 25, of the power storage unit 2, and the function of the main-micro control unit 30. The control device 110 is connected to the electric storage device 103, the domestic power generation device 104, the power consumption device 105, the various sensors 111, and the server 113 through the information network 112, and has a function of adjusting a use amount of commercial power and a power generation amount. In addition, the control device 110 may have a function of performing power transaction in the power market, etc.

As illustrated above, not only power from the centralized power system 102 such as the thermal power 102a, the nuclear power 102b, and the hydraulic power 102c but also power generated by the domestic power generation device 104 (solar power generation, wind power generation) can be stored in the electric storage device 103. Therefore, even when power generated by the domestic power generation device 104 is varied, it is possible to perform control of keeping electric energy transmitted to the outside constant or discharging only a required amount. For example, it is also possible to adopt a use in which power obtained by solar power generation is stored in the electric storage device 103 and, at the same time, midnight power that is cheaper in cost during night is stored in the electric storage device 103 so that the power stored by the electric storage device 103 is discharged and used in the daytime period when the cost is high.

Note that although this example describes the case in which the control device 110 is stored in the electric storage device 103, the control device 110 may be stored in the smart meter 107 or may be constituted individually. Moreover, the power storage device 100 may be used for a plurality of households in an apartment house, or may be used for a plurality of detached houses.

"Power Storage Device in Vehicle as Application Example"

Figure 35:
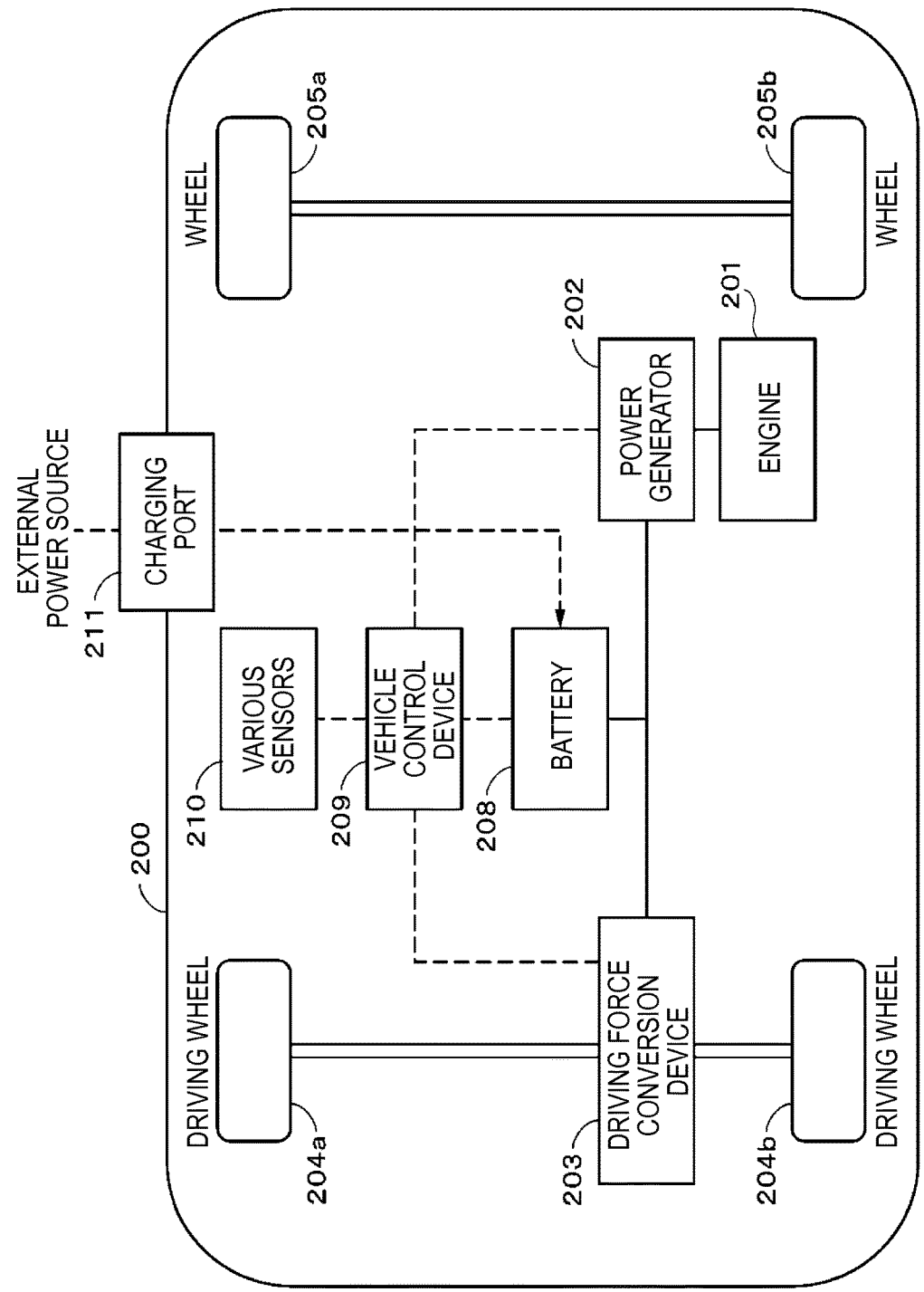
FIG. 35 is a block diagram of a second example of an application example of the power storage device according to the present disclosure.

An example in which the present disclosure is applied to the power storage device for vehicles will be described with reference to FIG. 35. FIG. 35 schematically illustrates an example of a configuration of a hybrid vehicle adopting a series hybrid system to which the present disclosure is applied. The series hybrid system is a car traveling by a driving force conversion device using power generated by a power generator driven by an engine or such power stored temporarily in a battery.

On this hybrid vehicle 200, an engine 201, a power generator 202, a driving force conversion device 203, a driving wheel 204a, a driving wheel 204b, a wheel 205a, a wheel 205b, a battery 208, a vehicle control device 209, various sensors 210, and a charging port 211 are mounted. The electric storage unit 2 may be applied to the battery 208.

The power storage device 103 includes a plurality of modules connected in parallel as described above. Therefore, according to the present disclosure, the power storage device 103 can be replaced through a hot swap, without causing deterioration or failure of the power storage device due to an excessive current.

The hybrid vehicle 200 travels with the driving force conversion device 203 as a driving source. One example of the driving force conversion device 203 is a motor. The driving force conversion device 203 is driven by power of the battery 208, and the rotation force of the driving force conversion device 203 is transmitted to the driving wheels 204a and 204b. Note that with the use of direct current-alternating current (DC-AC) or inverse conversion (AC-DC conversion) at necessary parts, the driving force conversion device 203 can be also applied to an alternating current motor and a direct current motor. The various sensors 210 control engine speed through the vehicle control device 209 and controls opening of a throttle valve not illustrated (throttle opening). The various sensors 210 include a speed sensor, an acceleration sensor, an engine speed sensor, etc.

The rotation force of the engine 201 is transmitted to the power generator 202, and power generated by the power generator 202 using the rotation force can be stored in the battery 208.

When the speed of the hybrid vehicle is reduced by a braking mechanism not illustrated, the resistance at the time of reduction of speed is added to the driving force conversion device 203 as rotation force, and regenerative electric power generated by the driving force conversion device 203 using the rotation force is stored in the battery 208.

The battery 208 is connected to an external power source of the hybrid vehicle, and thus receives power supply from the external power source with the charging port 211 as an input port and can also store the received power.

Although not illustrated, there may be provided an information processing device performing information processing regarding vehicle control based on information about the secondary batteries. Such an information processing device includes an information processing device performing battery remaining amount display based on information about a battery remaining amount.

As the function of the vehicle control device 209, the function of the main-micro control unit 30 or the like can be applied.

The above has described, as an example, the series hybrid car traveling by a motor using power generated by the power generator driven by the engine or such power temporarily stored in the battery. However, the present disclosure can be also applied effectively to a parallel hybrid car having output of both an engine and a motor as a driving source and using three systems of travel only by the engine, travel only by the motor, and travel by the engine and the motor while switching them appropriately. Moreover, the present disclosure can be also applied effectively to a so-called electric vehicle, which travels by drive by only a driving motor without an engine.

Additionally, the present disclosure may also be configured as below.

(1) A power storage device including:

a plurality of modules each including secondary batteries, a charging switch that controls charging to the secondary batteries, a discharging switch that controls discharging of the secondary batteries, and a voltage measuring unit that measures a voltage of the module; and a switch control unit that controls one or both of the charging switch and the discharging switch, wherein the modules are connected in parallel, wherein the switch control unit maintains an on state of the discharging switch for at least one of the modules for a predetermined period, and controls the charging switch of the module in which a maximum module charging current estimated based on the voltage of the module is a predetermined value or less, to be in an on state.

(2)

The power storage device according to (1), wherein the switch control unit switches the charging switches of the plurality of modules into an on state, when among the voltages of the plurality of modules, a difference in voltage between a highest voltage among the voltages of the modules and a lowest voltage among the voltages of the modules is smaller than a predetermined value.

(3) The power storage device according to any of (1) and (2), wherein the switch control unit switches the charging switches of the plurality of modules into an on state, when the number of modules to be connected among the plurality of modules is a predetermined number or more.

(4)

The power storage device according to any of (1), (2), and (3), wherein the switch control unit switches the charging switches of the plurality of modules into an on state, when the plurality of modules have a remaining capacity being larger than a predetermined value.

(5)

The power storage device according to any of (1), (2), and (3), wherein the switch control unit switches the charging switches of the plurality of modules into an on state, when a difference in remaining capacity among the plurality of modules is smaller than a predetermined value.

(6)

The power storage device according to (1), wherein the switch control unit selects a first module in which the voltage of the module is the highest, among the plurality of modules, counts the number of second modules in which a difference in module voltage from the first module is a certain value or less, among the plurality of modules, divides a system charging current by the number of second modules to obtain an estimated module charging current, and switches on the charging switches of the first and second modules, when the estimated module charging current is smaller than a maximum charging current of the module.

(7)

The power storage device according to (1), wherein the switch control unit selects a first module in which the voltage of the module is the highest, among the plurality of modules, selects a third module having a remaining capacity being the highest, among the plurality of modules, counts the number of fourth modules in which a difference in module voltage from the first module is a certain value or less, and a difference in remaining capacity from the third module is a certain value or less, among the plurality of modules, divides a system charging current by the number of fourth modules to obtain an estimated module charging current, and switches on the charging switches of the fourth modules, when the estimated module charging current is smaller than a maximum charging current of the module.

(8)

The power storage device according to (1), wherein the switch control unit switches on the charging switches of all the modules, when all the modules are in a discharging state, and a difference between a current value of the module of a highest current and a current value of the module of a lowest current is smaller than a predetermined value, or all the modules are in a charging state, and a difference between a current value of the module of a highest current and a current value of the module of a lowest current is smaller than a predetermined value.

(9)

The power storage device according to any of (1) to (8), wherein the switch control unit switches the charging switches of all the modules into an off state, when at least one of the modules has a charging current being larger than a maximum charging current value of the module, or at least one of the modules has a discharging current being larger than a maximum discharging current value of the module.

(10)

The power storage device according to any of (1) to (8), wherein the switch control unit switches the charge switches of all the modules into an off state, when a condition for switching the module charging switches into an on state become unsatisfied.

(11)

The power storage device according to any of (1) to (8), wherein the switch control unit switches the charging switches of all the modules into an off state, when a state of charge (SOC) value of the module of a highest remaining capacity is a predetermined value or more.

(12)

The power storage device according to any of (9) to (11), wherein when the charging switches of the modules is switched into an off state, counting time is started, and the off state of the charging switches of the modules is maintained until a predetermined time elapses.

(12)

The power storage device according to any of (9) to (11), wherein when switching the charging switches of the modules into an off state, the switch control unit starts counting time, and maintains the off state of the charging switches of the modules until a predetermined time elapses.

(13)

The power storage device according to any of (1) to (12), wherein a pre-charging switch and a current limiting unit are connected in series between a positive side terminal of the secondary batteries of the module and an external positive terminal or between a negative side terminal of the secondary batteries of the module and an external negative terminal, and the pre-charging switch constantly maintains an on state.

(14)

The power storage device according to any of (1) to (13), wherein the charging switch and the pre-charging switch are switched into an off state, when a voltage of each secondary battery of the module is a predetermined overvoltage charging value or more, or when a charging current of the module is a predetermined overcurrent charging value or more, and wherein the discharging switch is switched into an off state, when a voltage of each secondary battery of the module is a predetermined overvoltage discharging value or less, or when a discharging current of the module is a predetermined overcurrent discharging value or more.

(15)

A control method of a power storage device, the power storage device including a plurality of modules, connected in parallel, each including secondary batteries, a charging switch that controls charging to the secondary batteries, a discharging switch that controls discharging of the secondary batteries, and a voltage measuring unit that measures a voltage of the module; and a switch control unit that controls one or both of the charging switch and the discharging switch, the control method including, by the switch control unit:

maintaining an on state of the discharging switch for at least one of the modules for a predetermined period, and controlling the charging switch of the module in which a maximum module charging current estimated based on the voltage of the module is a predetermined value or less, to be in an on state.

(16)

A power storage system, including:

modules each including a plurality of secondary batteries, a voltage measuring unit that measures voltages of the secondary batteries, and a control unit that outputs measured data of the voltage measuring unit;

power storage devices each including a controller that connects the plurality of modules to output power outside and controls the plurality of modules; and a system control unit that connects the plurality of power storage devices in parallel to output power of the plurality of power storage devices outside, communicates with the controller for each of the plurality of power storage devices to determine whether a difference in voltage between the operating power storage devices and the power storage device to be added is small, and permits charging or discharging of the power storage device to be added when the difference in voltage is small.

(17)

The power storage system according to (16), wherein the difference in voltage is determined to be small when a voltage of the power storage device to be added falls within ±(N×threshold) (N is the number of modules connected) to a system voltage that is obtained from an average value for voltages of the plurality of power storage devices connected in parallel.

(18)

The power storage system according to any of (16) and (17), wherein the secondary batteries contained in the module have a change in voltage being small relative to a change in state of change (SOC).

(19)

The power storage system according to any of (16), (17), and (18), wherein the secondary batteries contained in the module include a positive electrode active material having an olivine structure.

4. Variation

Although the embodiments of the present disclosure have been specifically described, the present disclosure is not limited to the above-described embodiments, which can be variously modified based on the technical ideas according to the present disclosure. For example, the configurations, methods, processes, shapes, materials and numerical values described in the above embodiments are merely examples, and the configurations, methods, processes, shapes, materials and numerical values different from these may be used as necessary. For example, the above-described voltage values, current values, and SOC values are examples, and other values may be adopted. Also, the configurations, methods, processes, shapes, materials and numerical values described in the above embodiments can be combined with each other as long as the gist of the present disclosure is not departed.

REFERENCE SIGNS LIST

MO, MO1, MO2, MO3 . . . module
CNT . . . controller
BAT . . . battery unit
MCNT . . . module controller
SWd, SWd1 to SWd4 . . . discharging switch
SWc, SWc1 to SWc4 . . . charging switch
SWp, SWp1 to SWp4 . . . pre-charging switch
Reg, Reg1 to Reg4 . . . current limiting unit
CHL . . . charger/device load
BMU . . . controller
SYS . . . system control unit
ST . . . string

The invention claimed is:

1. A power storage device, comprising:
a plurality of modules, wherein the plurality of modules are connected in parallel, wherein each module of the plurality of modules includes a plurality of secondary batteries, a charging switch, a discharging switch, and a voltage measuring unit, wherein the charging switch is configured to control charge of the plurality of secondary batteries, the discharging switch is configured to control discharge of the plurality of secondary batteries, and the voltage measuring unit is configured to measure a voltage of a secondary battery of the plurality of secondary batteries; and
a switch control unit configured to:
control at least one of the charging switch or the discharging switch;
maintain a first state of the discharging switch for at least one module of the plurality of modules for a period; and
switch a first state of the charging switch to a second state of the charging switch for the at least one module of the plurality of modules based on a maximum module charging current, wherein the maximum module charging current is equal to or smaller than a first value, and wherein the maximum module charging current is estimated based on the voltage of the secondary battery.

2. The power storage device according to claim 1, wherein the switch control unit is further configured to switch to the first state of the charging switch of the at least one module of the plurality of modules, based on a difference between a highest voltage among voltages of the plurality of secondary batteries and a lowest voltage among the voltages of the plurality of secondary batteries that is smaller than a second value.

3. The power storage device according to claim 2, wherein the switch control unit is further configured to switch to the first state of the charging switch of the at least one module of the plurality of modules, based on a number of modules connected in parallel among the plurality of modules is equal to or larger than a first number.

4. The power storage device according to claim 3, wherein the switch control unit is further configured to switch to the first state of the charging switch of the at least one module of the plurality of modules, based on a state of charge (SOC) of the plurality of modules that is larger than a third value.

5. The power storage device according to claim 3, wherein the switch control unit is further configured to switch to the first state of the charging switch of the at least one module of the plurality of modules, based on a difference in a state of charge (SOC) of the plurality of modules that is smaller than a third value.

6. The power storage device according to claim 1,
wherein the switch control unit further configured to:
select a first module from the plurality of modules in which a voltage of the plurality of secondary batteries is highest,
count number of second modules of the plurality of modules in which a difference in the voltage of the plurality of secondary batteries from the first module is equal to or smaller than a second value,
divide a system charging current by the number of second modules to obtain an estimated module charging current, and
switch to the first state of the charging switch of the first module and the second modules, based on the estimated module charging current that is smaller than a maximum charging current.

7. The power storage device according to claim 1,
wherein the switch control unit is further configured to:
select a first module from the plurality of modules in which a voltage of the plurality of secondary batteries is highest,
select a third module from the plurality of modules having a state of charge (SOC) that is highest among the plurality of modules,
count number of fourth modules of the plurality of modules in which a first difference in the voltage of the plurality of secondary batteries from the first module is equal to or smaller than a second value, and a second difference in the state of charge (SOC) of the plurality of secondary batteries from the third module is equal to or smaller than a third value, among the plurality of modules,
divide a system charging current by the number of fourth modules to obtain an estimated module charging current, and
switch to the first state of the charging switch of the fourth modules, based on the estimated module charging current that is smaller than the maximum module charging current.

8. The power storage device according to claim 1,
wherein the switch control unit is further configured to switch to the first state of the charging switch in each module of the plurality of modules, based on
the plurality of modules are in a discharging state, and a difference between a highest current value of the plurality of modules and a lowest current value of the plurality of modules is smaller than a second value, or
the plurality of modules are in a charging state, and the difference is smaller than a third value.

9. The power storage device according to claim 1,
wherein the switch control unit is further configured to switch to the second state of the charging switch of each module, based on
at least one module of the plurality of modules has a charging current larger than a maximum charging current value, or
at least one module of the plurality of modules has a discharging current larger than a maximum discharging current value.

10. The power storage device according to claim 1, wherein the switch control unit is further configured to switch to the second state of the charging switch of each module, based on a condition for switching to the first state of the charging switch becomes unsatisfied.

11. The power storage device according to claim 1, wherein the switch control unit is further configured to switch to the second state of the charging switch of each module, based on a highest state of charge (SOC) value of the plurality of modules is equal to or larger than a second value.

12. The power storage device according to claim 10, wherein based on the switching to the second state of the charging switch of each module, the switch control unit is further configured to start counting time, and maintain the second state of the charging switch of each module until a first time elapses.

13. The power storage device according to claim 1, further comprising a pre-charging switch and a current limiting unit, wherein the pre-charging switch and the current limiting unit are connected in series between a positive side terminal of one of the plurality of secondary batteries and an external positive terminal or the pre-charging switch and the current limiting unit are between a negative side terminal of one of the plurality of secondary batteries and an external negative terminal, and wherein the switch control unit is further configured to maintain a first state of the pre-charging switch.

14. The power storage device according to claim 13,
wherein the switch control unit is further configured to:
switch to the second state of the charging switch and switch to a second state of the pre-charging switch, based on the voltage of the secondary battery that is equal to or larger than an overvoltage charging value, or based on a charging current of the plurality of secondary batteries that is equal to or larger than an overcurrent charging value, and
switch to a second state of the discharging switch, based on the voltage of the secondary battery that is equal to or smaller than an overvoltage discharging value, or based on a discharging current of the plurality of secondary batteries that is equal to or larger than an overcurrent discharging value.

15. A control method, comprising:
in a power storage device including a plurality of modules, wherein the plurality of modules are connected in parallel, each module of the plurality of modules includes a plurality of secondary batteries, a charging switch, a discharging switch, and a voltage measuring unit, wherein the charging switch is configured to control charge of the plurality of secondary batteries, the discharging switch is configured to control discharge of the plurality of secondary batteries, and the voltage measuring unit is configured to measure a voltage of a secondary battery of the plurality of secondary batteries:
controlling at least one of the charging switch or the discharging switch;
maintaining a first state of the discharging switch for at least one module of the plurality of modules for a period; and
controlling to switch a first state of the charging switch to a second state of the charging switch for the at least one module of the plurality of modules based on a maximum module charging current, wherein the maximum module charging current is equal to or smaller than a first value, wherein the maximum module charging current is estimated based on the voltage of the secondary battery.

* * * * *